(12) United States Patent
Furxhi et al.

(10) Patent No.: US 8,780,345 B2
(45) Date of Patent: Jul. 15, 2014

(54) SPATIALLY-SELECTIVE DISKS, SUBMILLIMETER IMAGING DEVICES, METHODS OF SUBMILLIMETER IMAGING, PROFILING SCANNERS, SPECTROMETRY DEVICES, AND METHODS OF SPECTROMETRY

(75) Inventors: Orges Furxhi, Memphis, TN (US); Eddie L. Jacobs, Memphis, TN (US)

(73) Assignee: The University of Memphis Research Foundation, Memphis, TN (US)

( * ) Notice: Subject to any disclaimer, the term of this patent is extended or adjusted under 35 U.S.C. 154(b) by 78 days.

(21) Appl. No.: 13/454,012

(22) Filed: Apr. 23, 2012

(65) Prior Publication Data

US 2013/0021613 A1    Jan. 24, 2013

Related U.S. Application Data

(60) Provisional application No. 61/478,275, filed on Apr. 22, 2011.

(51) Int. Cl.
*G01J 3/02* (2006.01)

(52) U.S. Cl.
CPC .................................... *G01J 3/0229* (2013.01)
USPC ........................................................ 356/310

(58) Field of Classification Search
CPC ..... G01J 3/02; G01J 3/0229; G02B 2207/129
USPC ..................................... 356/326, 72–73, 310
See application file for complete search history.

(56) References Cited

U.S. PATENT DOCUMENTS 2,413,080 A * 12/1946 Seeley .......................... 356/309
(Continued)

FOREIGN PATENT DOCUMENTS

| JP | 2008241352 A | 10/2006 |
|---|---|---|
| WO | 2012/145741 A2 | 10/2012 |

OTHER PUBLICATIONS

Jacobs et al., "A Bulk Semiconductor Imaging Device for Millimeter and Submillimeter Radiation," 16(5) IEEE Transactions on Electron Devices, pp. 419-424 (1969).

(Continued)

*Primary Examiner* — Kara E Geisel
(74) *Attorney, Agent, or Firm* — Edwards Wildman Palmer LLP; Peter F. Corless; Carolina E. Save

(57) ABSTRACT

One aspect of the invention provides a spatially-selective disk including a plurality of holes arranged such that a matrix having a plurality of rows, each row having elements corresponding to a fraction of a pixel in a viewing window projected onto the disk that is backed by a hole at a distinct rotational position of the disk, has linearly independent rows. Another aspect of the invention provides a spectrometry device including: a disk having one or more holes; a motor configured to rotate the disk; one or more beam-shaping optics arranged to map one or more spectral components of radiation of interest onto a plurality of locations on the disk; and a receiver positioned to capture the one or more spectral components passing through the one or more holes as the disk is rotated.

20 Claims, 40 Drawing Sheets

(56) References Cited

U.S. PATENT DOCUMENTS

| | | | |
|---|---|---|---|
| 2,880,355 A | | 3/1959 | Epsztein |
| 3,454,338 A | * | 7/1969 | Berny et al. ............... 356/330 |
| 3,720,469 A | | 3/1973 | Harwit |
| 3,922,092 A | * | 11/1975 | van den Bosch ............ 356/332 |
| 4,019,053 A | | 4/1977 | Levine |
| 4,531,076 A | | 7/1985 | Holder |
| 4,802,748 A | | 2/1989 | McCarthy |
| 4,917,478 A | | 4/1990 | Petran et al. |
| 5,000,570 A | * | 3/1991 | Neilson et al. ............... 356/308 |
| 5,067,805 A | | 11/1991 | Corle et al. |
| 5,202,692 A | | 4/1993 | Huguenin et al. |
| 5,483,335 A | | 1/1996 | Tobias |
| 5,587,832 A | | 12/1996 | Krause |
| 5,642,394 A | | 6/1997 | Rothschild |
| 5,663,639 A | | 9/1997 | Brown |
| 5,666,441 A | | 9/1997 | Rao et al. |
| 5,789,750 A | | 8/1998 | Nuss |
| 5,867,251 A | | 2/1999 | Webb |
| 5,923,466 A | | 7/1999 | Krause et al. |
| 6,144,679 A | | 11/2000 | Herman et al. |
| 6,359,582 B1 | | 3/2002 | MacAleese et al. |
| 6,469,624 B1 | | 10/2002 | Whan et al. |
| 6,587,246 B1 | | 7/2003 | Anderton et al. |
| 6,815,683 B2 | | 11/2004 | Federici et al. |
| 6,816,647 B1 | | 11/2004 | Rudd |
| 7,105,820 B2 | | 9/2006 | Federici et al. |
| 7,113,534 B2 | | 9/2006 | Unterrainer et al. |
| 7,152,007 B2 | | 12/2006 | Arnone et al. |
| 7,174,037 B2 | | 2/2007 | Arnone et al. |
| 7,310,442 B2 | | 12/2007 | Monachino et al. |
| 7,326,930 B2 | | 2/2008 | Crawely |
| 7,342,230 B2 | | 3/2008 | Adamski |
| 7,345,279 B2 | | 3/2008 | Mueller |
| 7,359,418 B2 | | 4/2008 | Edamura et al. |
| 7,386,024 B2 | | 6/2008 | Sekiguchi et al. |
| 7,417,475 B2 | | 8/2008 | Peschmann et al. |
| 7,439,511 B2 | | 10/2008 | Demers |
| 7,449,695 B2 | | 11/2008 | Zimdars |
| 7,460,248 B2 | | 12/2008 | Kurtz et al. |
| 7,609,196 B2 | | 10/2009 | Jeck et al. |
| 2004/0022436 A1 | | 2/2004 | Patti et al. |
| 2004/0065831 A1 | | 4/2004 | Federici et al. |
| 2005/0058242 A1 | | 3/2005 | Peschmann |
| 2005/0117700 A1 | | 6/2005 | Peschmann |
| 2005/0156110 A1 | | 7/2005 | Crawely |
| 2005/0242287 A1 | | 11/2005 | Hakimi |
| 2006/0054824 A1 | | 3/2006 | Federici et al. |
| 2006/0214107 A1 | | 9/2006 | Mueller |
| 2006/0257005 A1 | | 11/2006 | Bergeron et al. |
| 2007/0058037 A1 | | 3/2007 | Bergeron et al. |
| 2007/0228280 A1 | | 10/2007 | Mueller |
| 2007/0229937 A1 | | 10/2007 | Josef Moeller |
| 2007/0235652 A1 | | 10/2007 | Smith |
| 2007/0257194 A1 | | 11/2007 | Mueller |
| 2007/0263226 A1 | | 11/2007 | Kurtz et al. |
| 2008/0002744 A1 | | 1/2008 | Korenbilt |
| 2008/0069164 A1 | | 3/2008 | Edamura et al. |
| 2008/0159342 A1 | | 7/2008 | McCaughan |
| 2008/0179527 A1 | | 7/2008 | Demers |
| 2008/0211713 A1 | | 9/2008 | Jeck |
| 2008/0212742 A1 | | 9/2008 | Hughes |
| 2008/0217536 A1 | | 9/2008 | Sekiguchi |
| 2008/0219308 A1 | | 9/2008 | Yamanishi et al. |
| 2009/0140961 A1 | | 6/2009 | Geisow et al. |
| 2009/0246707 A1 | | 10/2009 | Li et al. |
| 2010/0140475 A1 | | 6/2010 | Hobden et al. |
| 2010/0253783 A1 | | 10/2010 | Furxhi et al. |
| 2013/0021613 A1 | | 1/2013 | Furxhi et al. |

OTHER PUBLICATIONS

Orges Furxhi and Eddie Jacobs, "Design and analysis of a spatially selective mirror for sub-millimeter wave imaging," 7309 Proc. of SPIE, pp. 73090K-1-73090K-10 (2009).

Orges Furxhi and Eddie Jacobs, "Comparison of Schemes for Active Sub-Millimeter Wave Imaging," 8188 Proc. of SPIE, pp. 81880M-1-81880M-12 (2011).

Slamani et al., "Image Processing Tools for the Enhancement of Concealed Weapon Detection," IEEE, pp. 518-522 (1999).

W3C, Scalable Vector Graphics (SVG), http://www.w3.org/Graphics/SVG/, (2010).

Mathews et al., "Vector Markup Language (VML)", http://www.w3.org/TR/NOTE-VML, (1998).

"Research Application Development," http://picomeric.com/pico_products/terahertz_research.asp, (2008).

"From the lab to the Shop Floor," http://picometric.com/pico_products/terahertz_tr4000.asp, (2008).

"T-Ray 4000 TD-THz System" www.picometrix.com, (2008).

"SIFIR-50" "Stabilized Integrated FIR (THz) Laser System," www.coherent.com (2007).

David K. Cheng, "Field and Wave Electromagnetics," The Addison-Wesley Publishing Company, pp. 390-397 (1989).

ThruVision Introduces T5000 Security Imaging System to "see" concealed items under clothing at extended ranges outdoors, ThruVision events, IDEAS, Pakistan, Stand D29, Hall 4, HOSDB, U.K., Stand F35 and SPIE, USA; http://www.thruvision.com/t5000.html, (2008).

"Camera 'looks' through clothing" http://newsvote.bbc.co.uk/mpappa/pagetools/print/ners.bbc.co.uk/1/h . . . Nov. 25, 2008.

Furxhi et al., "A sub-millimeter wave line imaging device," 7670 Proc. of SPIE, Passive Millimeter-Wave Technology XIII, pp. 76700L-76700L-12 (2010).

Furxhi et al., "A sub-milliter wave line scanning imager," 7837 Proc. of SPIE, Millimeter Wave and Terahertz Sensors and Technology III, pp. 78370D-78370D-11 (2010).

International Search Report for International Application No. PCT/US2012/034651 dated Nov. 29, 2012.

Written Opinion for International Application No. PCT/US2012/034651 dated Nov. 29, 2012.

Noor et al., "Compressive Sensing for a Sub-millimeter Wave Single Pixel Imager," 8022 Proc. of SPIE, pp. 80220K-1-80220K-8 (2011).

Furxhi et al., "Two-dimensional, real-time, sub-millimeter wave imaging using a spatially selective mask," 8022 Proc. of SPIE, pp. 80220J-1-80220-J10 (2011).

Jacobs et al., "Conversion of Millimeter-Wave Images Into Visible Displays" 58(2) Journal of the Optical Society of America, pp. 246-253 (1968).

Orges Furxhi and Eddie Jacobs, "Analysis of a Device for Single Pixel Terahertz Imaging," 6949 Proc. of SPIE, pp. 69490A-1-69490A-12 (2008).

Orges Furxhi and Eddie Jacobs, "Spatially Selective Mask for Single Pixel Video Rate Imaging," Imaging and Applied Optics Technical Digest (2011).

Sara Hoover, "Spin cycle," http://www.memphis.edu/magazine/issues/summer10/spincycle.php (2010).

Erica Horton, "Fellow's invention enhances possibilities of the naked eye," http://www.dailyhelmsman.com/2.14450/fellow-s-invention-enhances-possibilities-of-the-naked-eye-1.1844683 (2010).

Swift et al., "Hadamard transform imager and imaging spectrometer," 15(6) Applied Optics, pp. 1595-1609 (1976).

Chris Tillery "Detecting Concealed Weapons: Directions for the Future," 258, NIJ Journal, (2007).

Walter Barbirato & Luca Morassutto, "Fracarro, from the Disk of Nipkow to the Digital Convergence," IEEE, pp. 96-101, (2008).

* cited by examiner

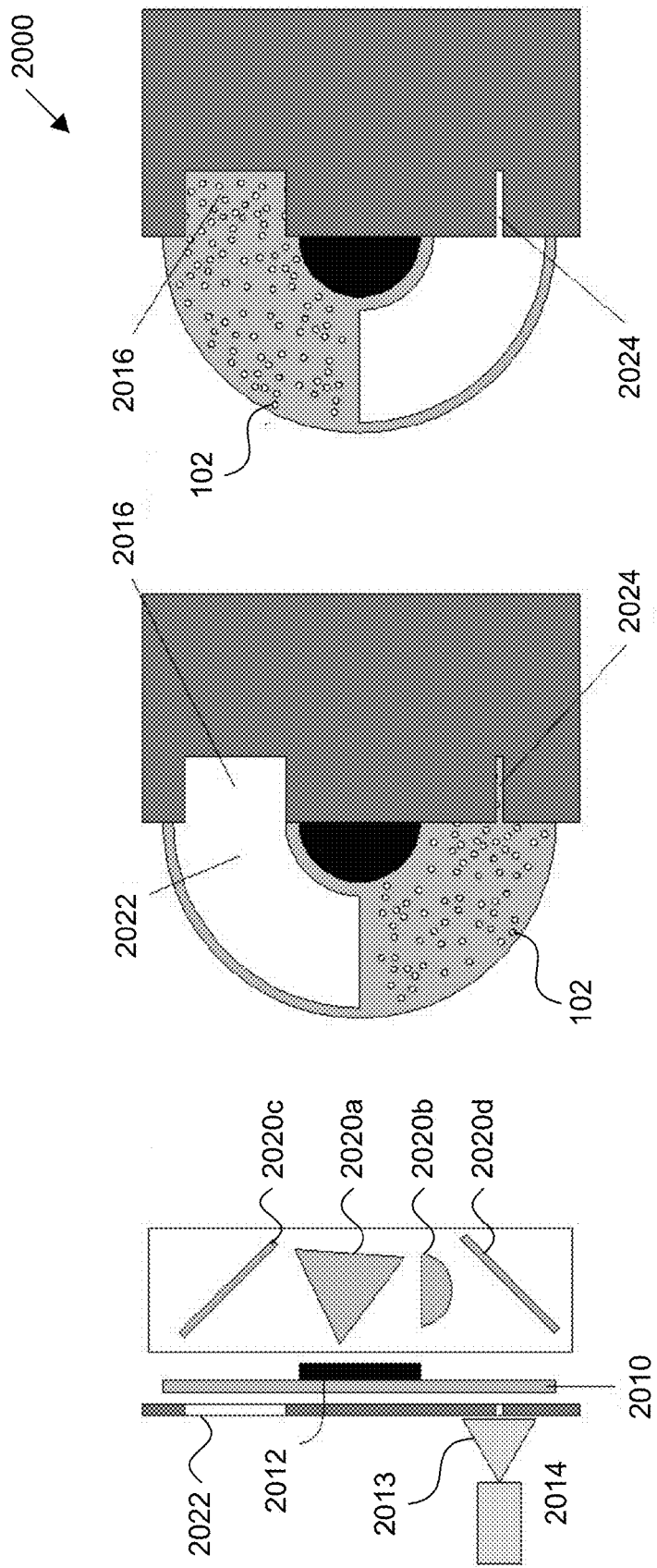

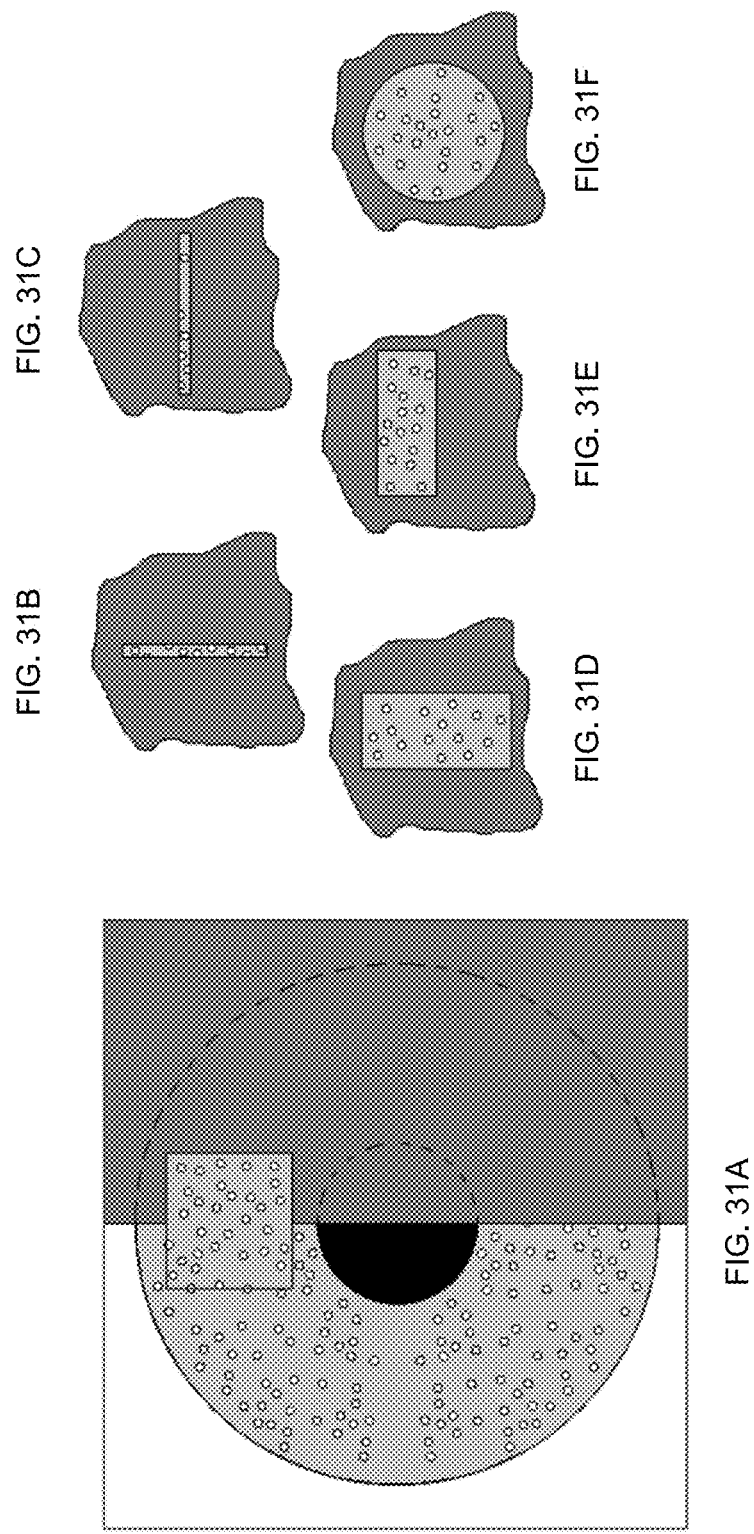

SPATIALLY-SELECTIVE DISKS, SUBMILLIMETER IMAGING DEVICES, METHODS OF SUBMILLIMETER IMAGING, PROFILING SCANNERS, SPECTROMETRY DEVICES, AND METHODS OF SPECTROMETRY

CROSS-REFERENCE TO RELATED APPLICATIONS

This application claims priority to U.S. Provisional Patent Application Ser. No. 61/478,275, filed Apr. 22, 2011. The entire content of this application is hereby incorporated by reference herein.

BACKGROUND

Focal plane arrays in the submillimeter wavelength are not yet commercially available. Accordingly, there is a need for systems and methods that facilitate for formation of images by utilizing existing single submillimeter detectors.

The complexity of developing such scanning systems for sub-millimeter waves is greater than it is for the scanning systems in other regimes, such as visible and infrared radiation. First, the wavelength is larger; therefore, the size and weight of these systems are greater. Second, the radiation is not as abundant. Current scanning systems for sub-millimeter waves are large in size and have image formation rates of less than one frame per second.

Likewise, similar challenges are presented in the field of spectrometry, in which there remains a continued need for spectrometry devices at reduced costs (on a per unit and/or per computation basis) that increase computational speed.

Accordingly, there is a need for submillimeter scanning systems and spectrometry devices that can overcome these challenges.

SUMMARY OF THE INVENTION

One aspect of the invention provides a spatially-selective disk including a plurality of holes arranged such that a matrix having a plurality of rows, each row having elements corresponding to a fraction of a pixel in a viewing window projected onto the disk that is backed by a hole at a distinct rotational position of the disk, has linearly independent rows.

This aspect of the invention can have a variety of embodiments. The disk can be absorptive. The disk can be reflective. The disk can be conductive.

The plurality of holes can have substantially equal diameters. The radius of the plurality of holes can be greater than or equal to about one wavelength of interest. The radius of the plurality of holes can be between about one wavelength of interest and about two wavelengths of interest.

The disk can have a substantially uniform thickness. The disk can have a thickness of greater than or equal to about one wavelength of interest. The disk can have a thickness of between about one wavelength of interest and about three wavelengths of interest. The disk can have a thickness of between about two wavelengths of interest and about three wavelengths of interest. The disk can have a thickness of about 2.7112 wavelengths of interest.

The holes can have a profile selected from the group consisting of: a circle, a triangle, and an n-gon.

Another aspect of the invention provides a submillimeter imaging device including: a disk having a plurality of holes; a motor configured to rotate the disk; and a submillimeter wave receiver positioned to capture waves passing through the one or more holes as the disk is rotated. The holes are arranged such that a matrix having a plurality of rows, each row having elements corresponding to a fraction of a pixel in a viewing window projected onto the disk that is backed by a hole at a distinct rotational position of the disk, has linearly independent rows.

This aspect of the invention can have a variety of embodiments. The submillimeter imaging device can further include a submillimeter wave source. The submillimeter imaging device can further include submillimeter optics configured to focus the submillimeter waves on the disk.

The submillimeter wave optics can include one or more reflective surfaces. The one or more reflective surfaces can include one or more curved reflective surfaces. The one or more reflective surfaces can include one or more flat reflective surfaces.

The submillimeter wave optics can include one or more refractive elements. The one or more refractive elements can be substantially transparent to submillimeter radiation. The one or more refractive elements can be fabricated from polymethylpentene (PMP).

The motor can rotate the spatially-selective structure at about 1,800 revolutions per minute. The submillimeter wave receiver can captures images at a rate of about 30 frames per second.

The submillimeter imaging device can further include a shield defining a viewing window on the disk. The shield can include a radiation-absorbing material. The shield can include a radiation-reflecting material.

The submillimeter imaging device can further include a storage device. The storage device can include memory. The storage device can include one or more disks.

The submillimeter imaging device can include one or more additional receivers positioned to capture waves of a different wavelength than the submillimeter wave receiver. The different wavelength can be a different range of submillimeter radiation than collected by the submillimeter wave receiver. The different wavelength can be selected from the group consisting of: far-infrared, long wave infrared, short wave infrared, visible light, and ultraviolet. The submillimeter imaging device can include a waveguide positioned to guide waves passing through the one or more holes as the disk is rotated to the submillimeter wave receiver and the one or more additional receivers. The submillimeter imaging device can further include an integrating sphere positioned to diffuse waves passing through the one or more holes as the disk is rotated for detection by the submillimeter wave receiver and the one or more additional receivers.

Another aspect of the invention can provide a method of submillimeter imaging. The method includes: providing a disk having a plurality of holes arranged such that a matrix having a plurality of rows, each row having elements corresponding to a fraction of a pixel in a viewing window projected onto the disk that is backed by a hole at a distinct rotational position of the disk, has linearly independent rows, a motor configured to rotate the disk, and a submillimeter wave receiver positioned to capture waves passing through the one or more holes as the disk is rotated; actuating the motor to rotate the disk; capturing a plurality of waves passing through the plurality of holes as the disk rotates; solving a system of equations wherein a magnitude of one of the plurality of reflections is equal to a sum of a product of the reflection in each of a plurality of pixels and the fraction of pixel area backed by the plurality of holes; and forming an image from the plurality of the pixels.

This aspect of the invention can have a variety of embodiments. The method can further include storing the image. The method can further include performing an image recognition method on the image.

The storing and forming steps can be performed on a computer. The computer can be a general-purpose computer that has been specially-programmed with software instructions for executing the storing and forming steps.

Another aspect of the invention provides a profiling scanner including: a proximal end; a distal end; a first submillimeter imaging device; and a second submillimeter imaging device. The first submillimeter imaging device includes: a first disk having a plurality of holes arranged such that a matrix having a plurality of rows, each row having elements corresponding to a fraction of a pixel in a viewing window projected onto the disk that is backed by a hole at a distinct rotational position of the disk, has linearly independent rows; a first motor configured to rotate the first disk; and a first submillimeter wave receiver positioned to capture waves passing through the one or more holes as the first disk is rotated. The second submillimeter imaging device includes: a second disk having a plurality of holes arranged such that a matrix having a plurality of rows, each row having elements corresponding to a fraction of a pixel in a viewing window projected onto the disk that is backed by a hole at a distinct rotational position of the disk, has linearly independent rows; a second motor configured to rotate the second disk; and a second submillimeter wave receiver positioned to capture waves passing through the one or more holes as the second disk is rotated.

This aspect of the invention can have a variety of embodiments. The profiling scanner can further include a moving walkway configured to carry an individual from the proximal end to the distal end.

The profiling scanner can further include a storage device. The storage device can include memory. The storage device can include one or more disks.

The profiling scanner can further include a display device. The display device can be selected from the group consisting of: a cathode ray tube (CRT), a plasma display, a liquid crystal display (LCD), an organic light-emitting diode display (OLED), a light-emitting diode (LED) display, an electroluminescent display (ELD), a surface-conduction electron-emitter display (SED), a field emission display (FED), a nano-emissive display (NED), an electrophoretic display, a bichromal ball display, an interferometric modulator display, and a bistable nematic liquid crystal display.

Another aspect of the invention provides a spectrometry device including: a disk having one or more holes; a motor configured to rotate the disk; one or more beam-shaping optics arranged to map one or more spectral components of radiation of interest onto a plurality of locations on the disk; and a receiver positioned to capture the one or more spectral components passing through the one or more holes as the disk is rotated.

This aspect of the invention can have a variety of embodiments. The one or more beam-shaping optics can be selected from the group consisting of: prisms and cylinders. The spectrometry device can further include a shield defining a viewing window on the disk. The shield can include a radiation-absorbing material. The shield can include a radiation-reflecting material.

The spectrometry device can include a storage device. The storage device can include memory. The storage device can include one or more disks.

The spectrometry device can include a processing device configured to reconstruct the one or more spectral components captured by the receiver to determine the spectral content of the radiation. The processing device can be a computer. The computer can be a general-purpose computer that has been specially-programmed with software.

Another aspect of the invention provides a method of spectrometry. The method includes: providing a disk having one or more holes, a motor configured to rotate the disk, one or more beam-shaping optics arranged to map one or more spectral components of radiation of interest onto a plurality of locations on the disk, and a receiver positioned to capture the plurality spectral components passing through the one or more holes as the disk is rotated; actuating the motor to rotate the disk; capturing a plurality of spectral components passing through the plurality of holes as the disk rotates; and computing a spectrum by solving a system of equations wherein a magnitude of one of the plurality of spectral components is equal to a sum of a product of the spectral component in each of a plurality of pixels and the fraction of pixel area backed by the plurality of holes.

This aspect of the invention can have a variety of embodiments. The method can further include displaying the spectrum. The spectrum can be displayed on a display device selected from the group consisting of: a cathode ray tube (CRT), a plasma display, a liquid crystal display (LCD), an organic light-emitting diode display (OLED), a light-emitting diode (LED) display, an electroluminescent display (ELD), a surface-conduction electron-emitter display (SED), a field emission display (FED), a nano-emissive display (NED), an electrophoretic display, a bichromal ball display, an interferometric modulator display, and a bistable nematic liquid crystal display.

The computing step can be performed on a computer. The computer can be a general-purpose computer that has been specially-programmed with software instructions for executing the storing and forming steps.

Another aspect of the invention provides a spectrometry device including: a disk having a plurality of holes and a contiguous aperture substantially opposite the plurality of hole; a motor configured to rotate the disk; a mask defining an imaging window and a spectrometry window; one or more beam-shaping optics arranged to map one or more spectral components of radiation of interest received through the imaging window and the holes and aperture of the disk onto a plurality of locations on the disk; and a receiver positioned to capture the one or more spectral components passing through the plurality of holes and the aperture of the disk and the spectrometry window as the disk is rotated.

This aspect of the invention can have a variety of embodiments. The one or more beam-shaping optics can be selected from the group consisting of: prisms, cylinders, and mirrors. The mask can include a radiation-absorbing material. The mask can include a radiation-reflecting material.

The spectrometry device can further include a storage device. The storage device can include memory. The storage device can includes one or more disks.

The spectrometry device can include a processing device configured to reconstruct the one or more spectral components captured by the receiver to determine the spectral content of the radiation. The processing device can be a computer. The computer can be a general-purpose computer that has been specially-programmed with software.

The aperture can be internal to the disk. The aperture can be external to the disk.

Another aspect of the invention provides a method of spectrometry. The method includes: providing: a disk having a plurality of holes and a contiguous aperture substantially opposite the plurality of hole, a motor configured to rotate the disk, a mask defining an imaging window and a spectrometry window, one or more beam-shaping optics arranged to map one or more spectral components of radiation of interest received through the imaging window and the holes and aperture of the disk onto a plurality of locations on the disk, and a receiver positioned to capture the one or more spectral components passing through the plurality of holes and the aperture of the disk and the spectrometry window as the disk is rotated; actuating the motor to rotate the disk; capturing a plurality of spectral components passing through the plurality of holes as the disk rotates; and computing a spectrum by solving a system of equations wherein a magnitude of one of the plurality of spectral components is equal to a sum of a product of the spectral component in each of a plurality of pixels and the fraction of pixel area backed by the plurality of holes.

This aspect of the invention can have a variety of embodiments. The method can further include displaying the spectrum. The spectrum can be displayed on a display device selected from the group consisting of: a cathode ray tube (CRT), a plasma display, a liquid crystal display (LCD), an organic light-emitting diode display (OLED), a light-emitting diode (LED) display, an electroluminescent display (ELD), a surface-conduction electron-emitter display (SED), a field emission display (FED), a nano-emissive display (NED), an electrophoretic display, a bichromal ball display, an interferometric modulator display, and a bistable nematic liquid crystal display.

The computing step can be performed on a computer. The computer can be a general-purpose computer that has been specially-programmed with software instructions for executing the storing and forming steps.

The aperture can be internal to the disk. The aperture can be external to the disk.

Another aspect of the invention provides a submillimeter imaging device including: a mask defining a slit-shaped viewing window; a disk having a plurality of holes arranged such that a matrix having a plurality of rows, each row having elements corresponding to a fraction of a pixel in the viewing window projected onto the disk that is backed by a hole at a distinct rotational position of the disk, has linearly independent rows; a motor configured to rotate the disk; a submillimeter wave receiver positioned to capture waves passing through the one or more holes as the disk is rotated; and one or more submillimeter optical elements actuatable to vary a portion of a region of interest projected onto the viewing window such that a two-dimensional image of a region of interest can be reconstructed by capturing a plurality of one-dimensional images.

This aspect of the invention can have a variety of embodiments. The slit-shaped view window can be oriented radially with respect to a rotational axis of the disk.

Another embodiment of the invention provides a method of submillimeter imaging, the method comprising: providing a submillimeter imaging device as described above; actuating the motor to rotate the disk; for each of a plurality of actuation positions of the submillimeter optical elements: capturing a plurality of waves passing through the plurality of holes as the disk rotates, solving a system of equations wherein a magnitude of one of the plurality of reflections is equal to a sum of a product of the reflection in each of a plurality of pixels and the fraction of pixel area backed by the plurality of holes, and forming a one-dimensional image from the plurality of the pixels; and concatenating the one-dimensional images to form a two-dimensional image.

Another embodiment of the invention provides a profiling scanner including: a proximal end; a distal end; a first submillimeter imaging device as described above positioned at the proximal end; and a second submillimeter imaging device as described above positioned at the distal end.

FIGURES

For a fuller understanding of the nature and desired objects of the present invention, reference is made to the following detailed description taken in conjunction with the accompanying drawing figures wherein:

FIGS. 20A-20C depict the structure and operation of an imaging spectrometer according to an embodiment of the invention;

Figure 22A:
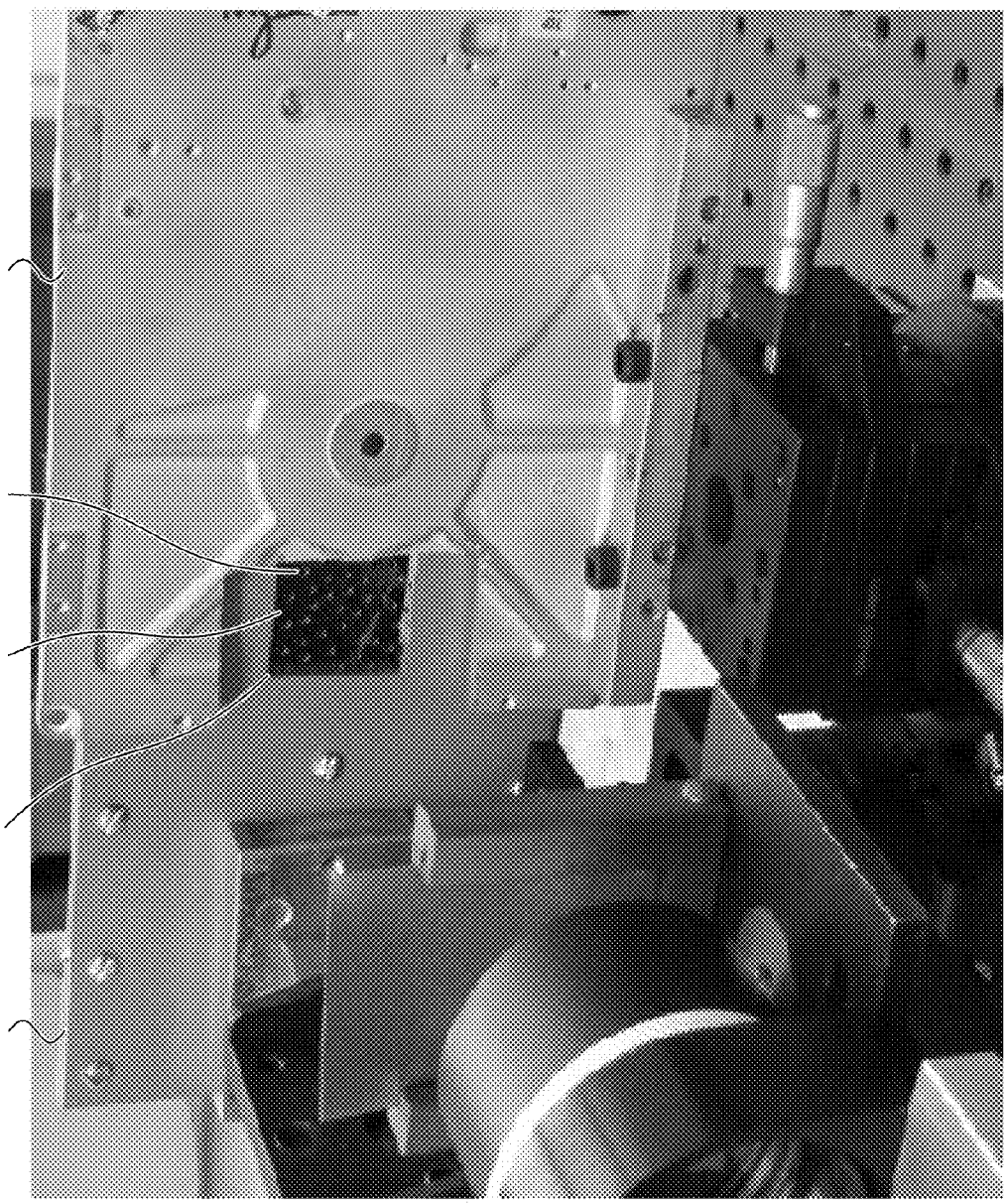
Figure 22B:
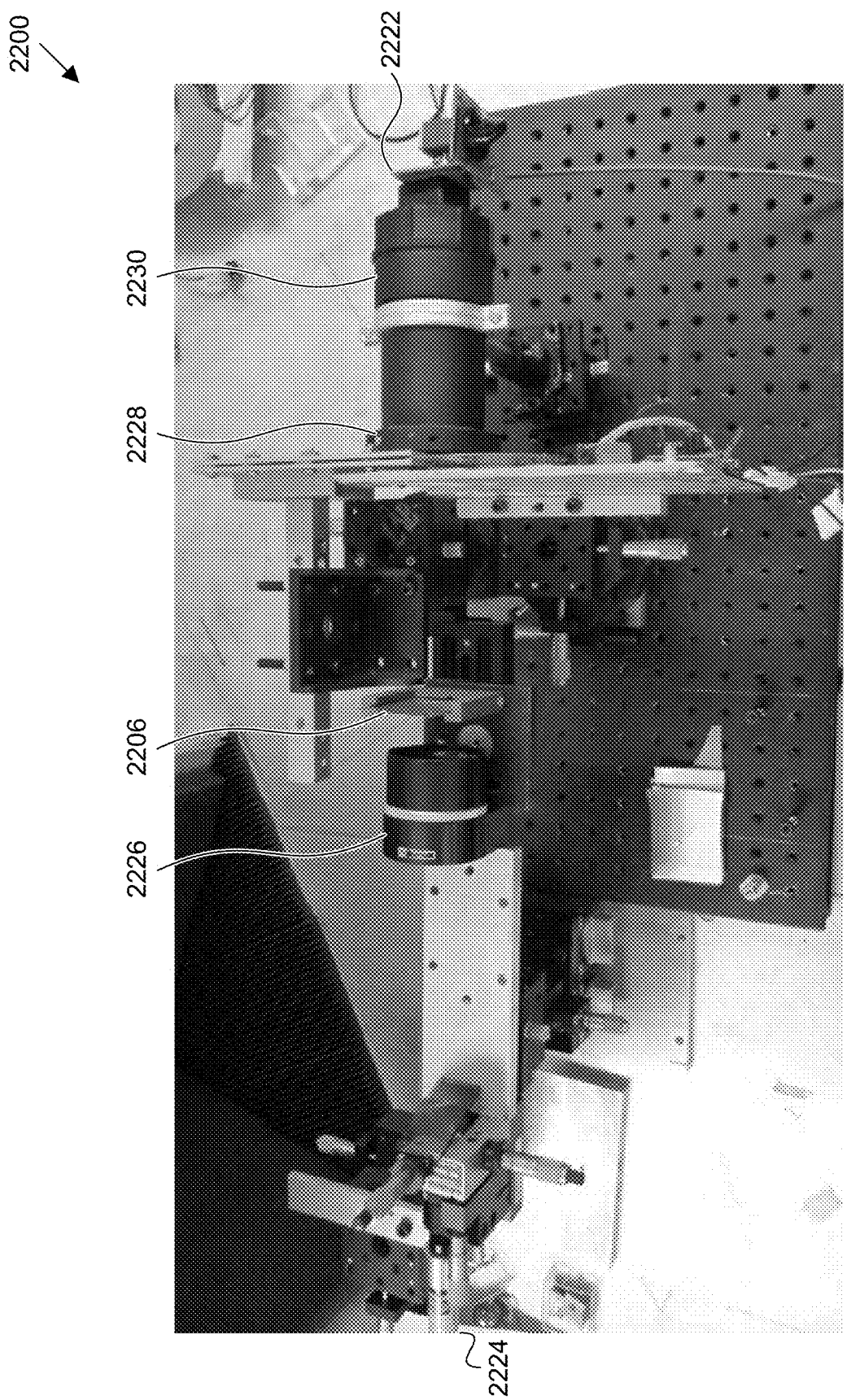
Figure 22C:
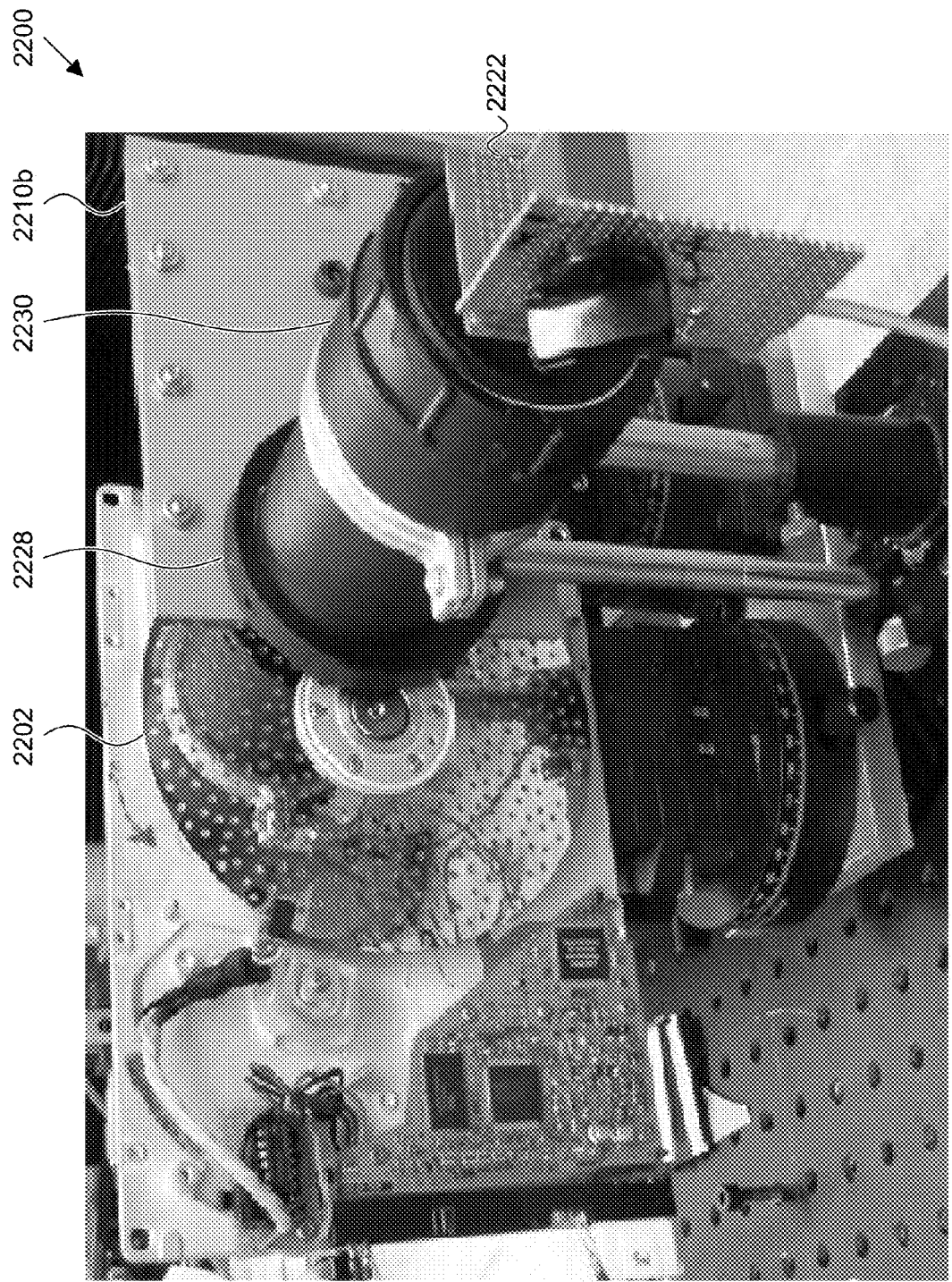
Figure 23A:
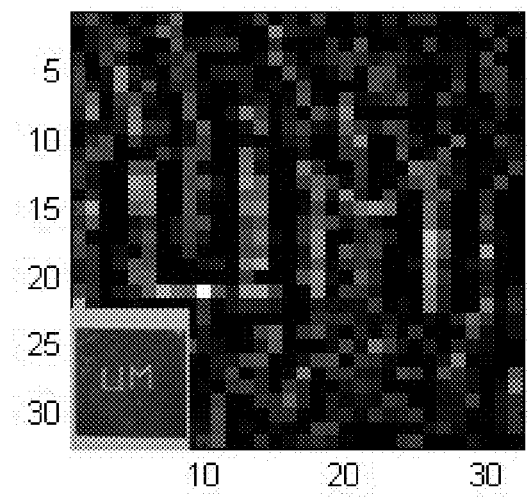
Figure 23B:
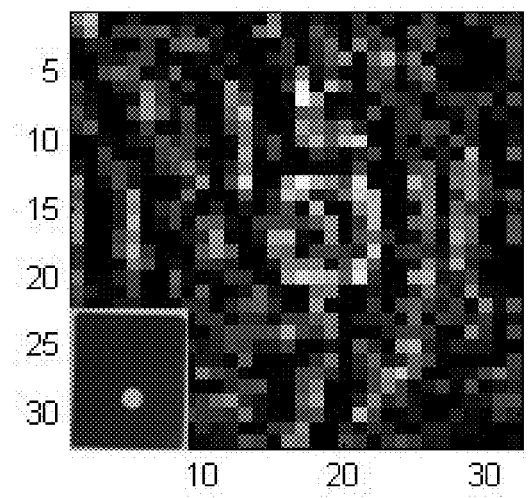
Figure 23C:
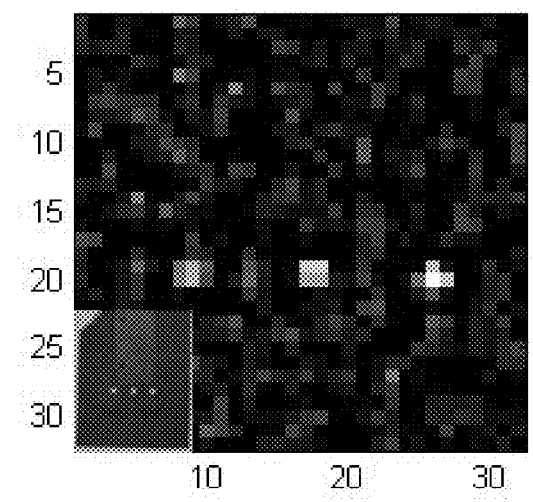
Figure 24A:
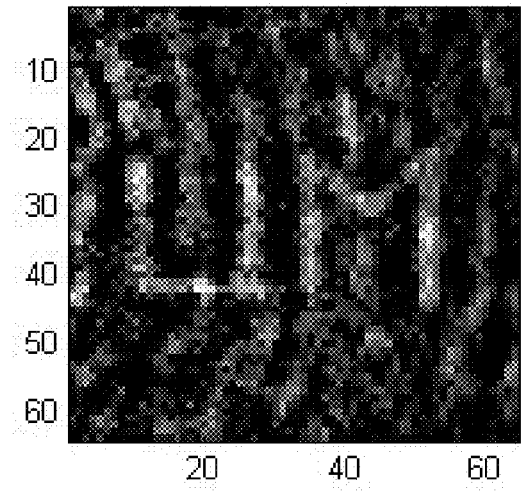
Figure 24B:
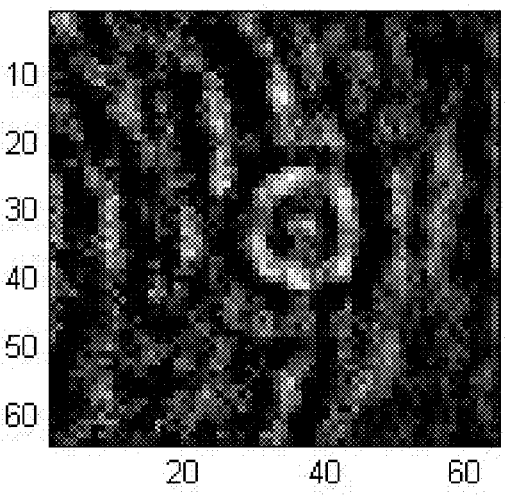
Figure 24C:
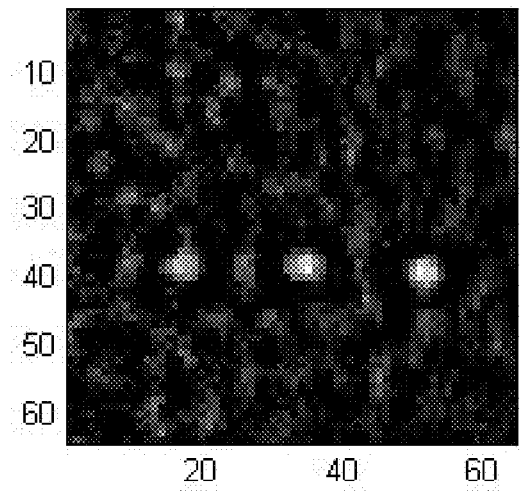
Figure 25:
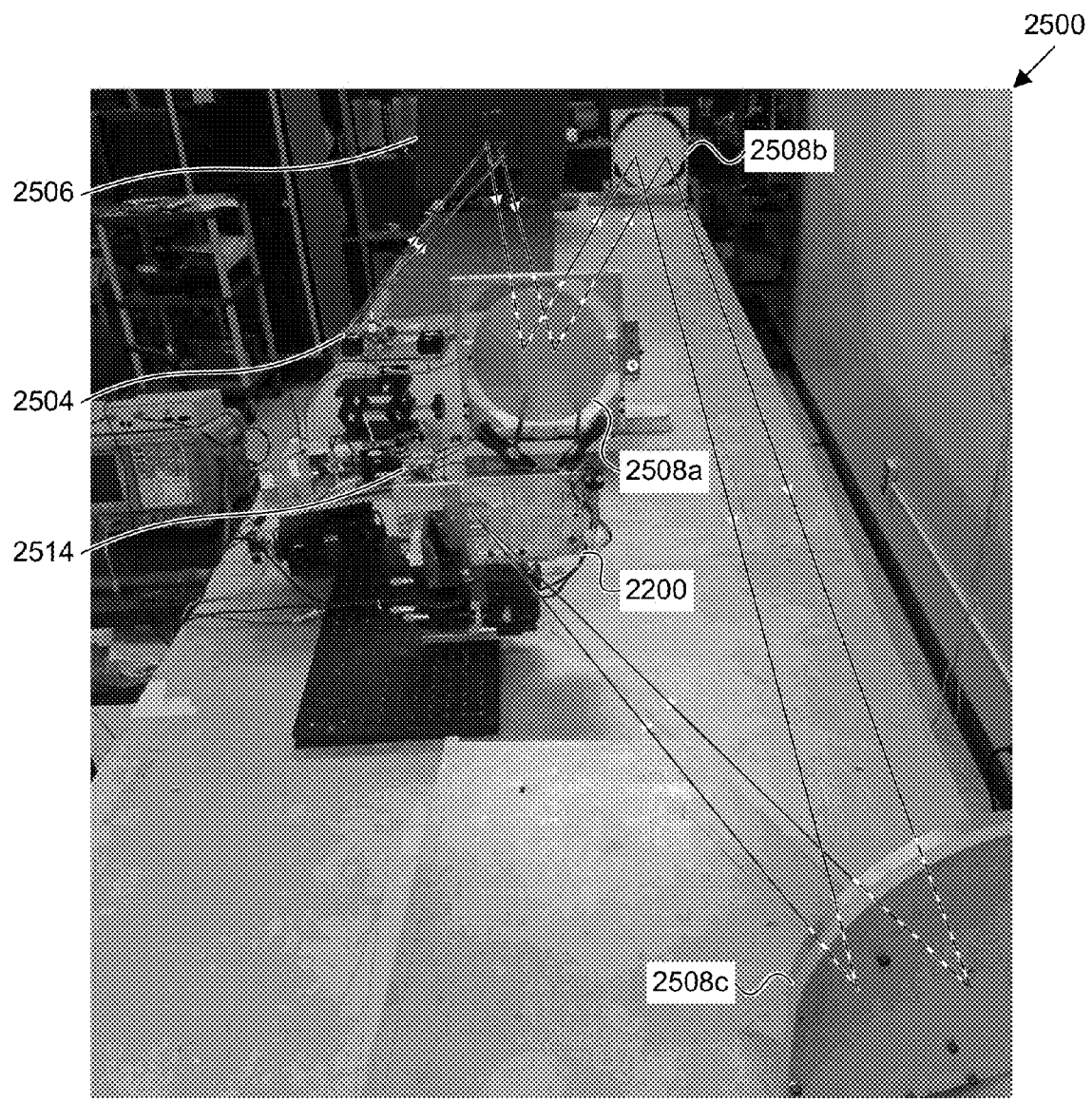
Figure 26A:
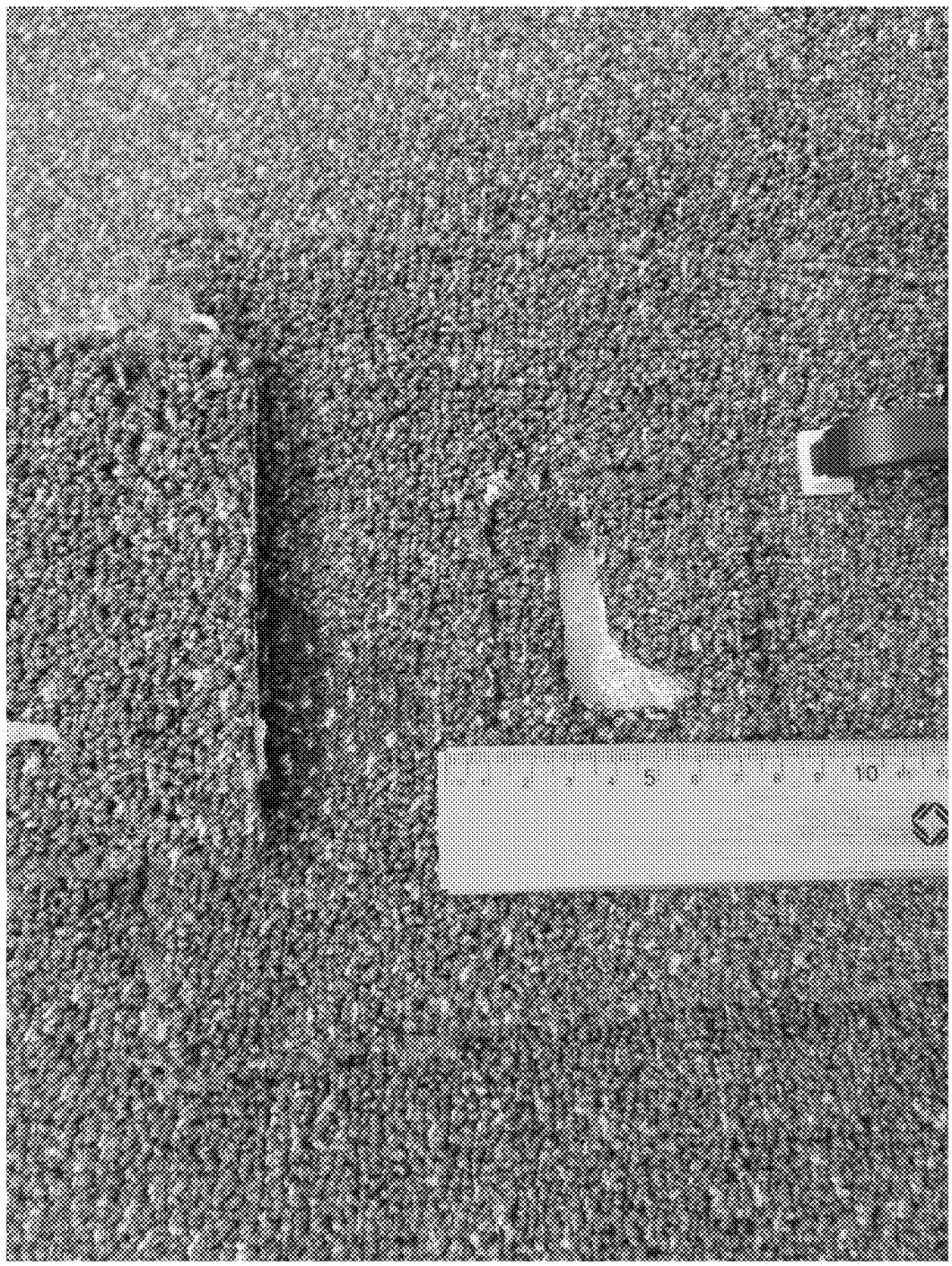
Figure 26C:
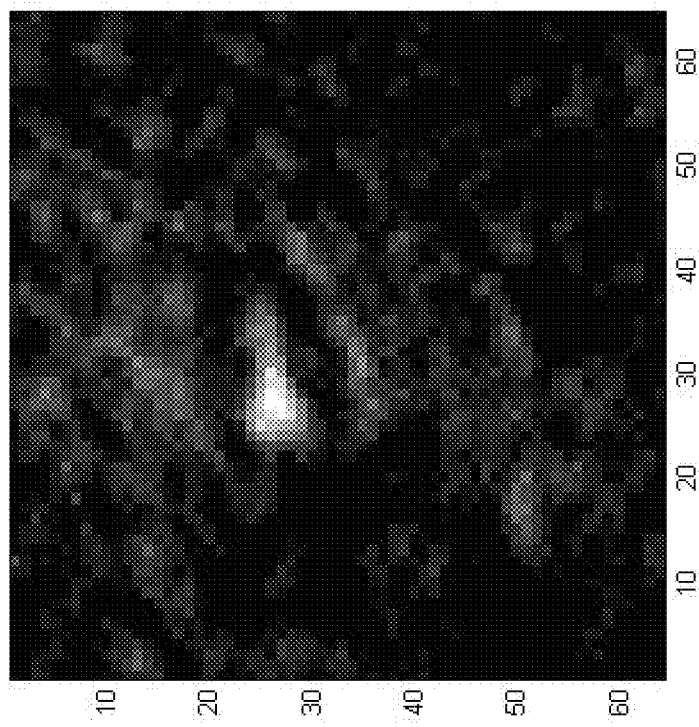
Figure 26B:
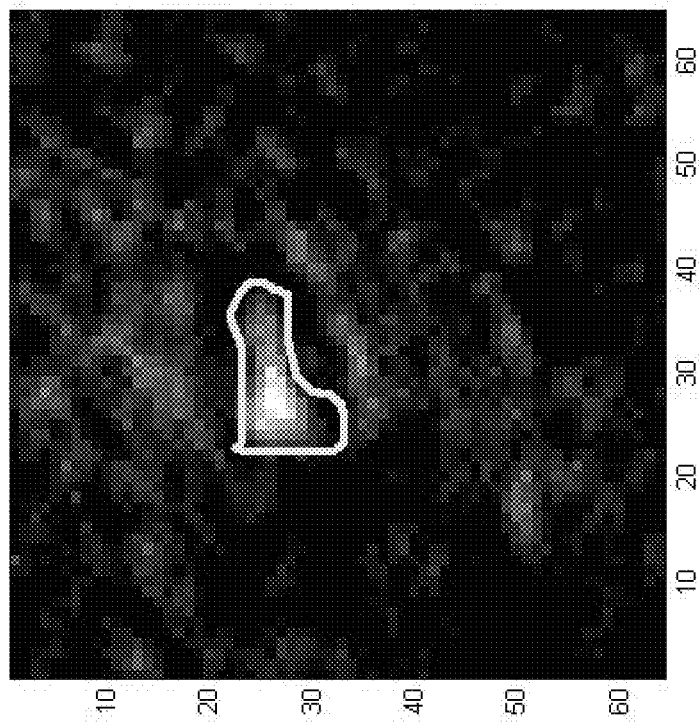
Figure 27A:
Figure 28:
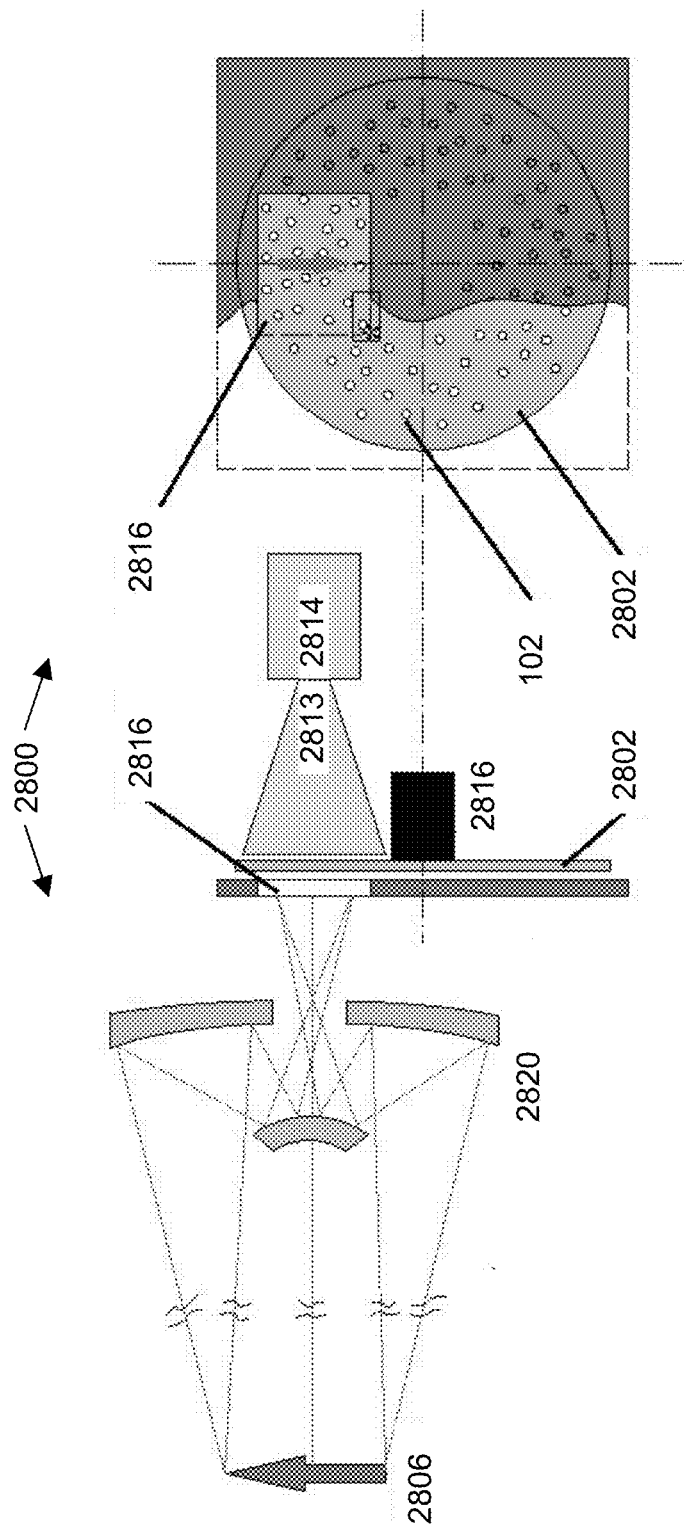
Figure 29:
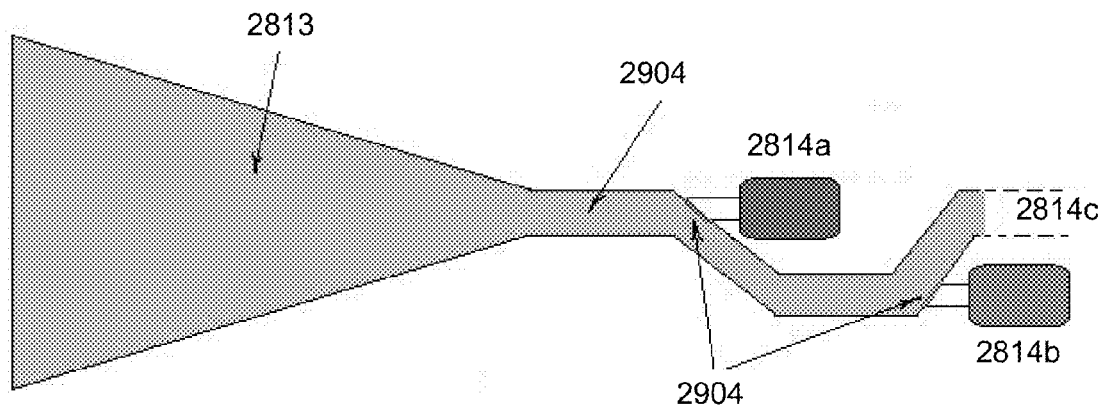
Figure 30:
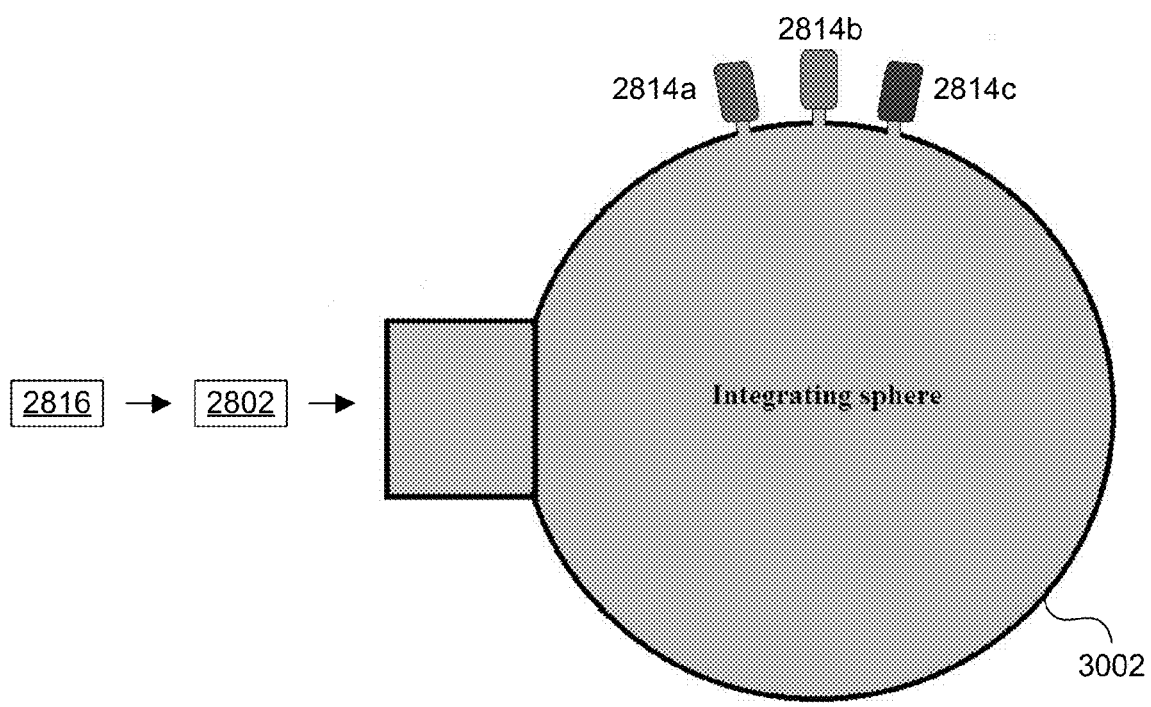
Figure 33A:
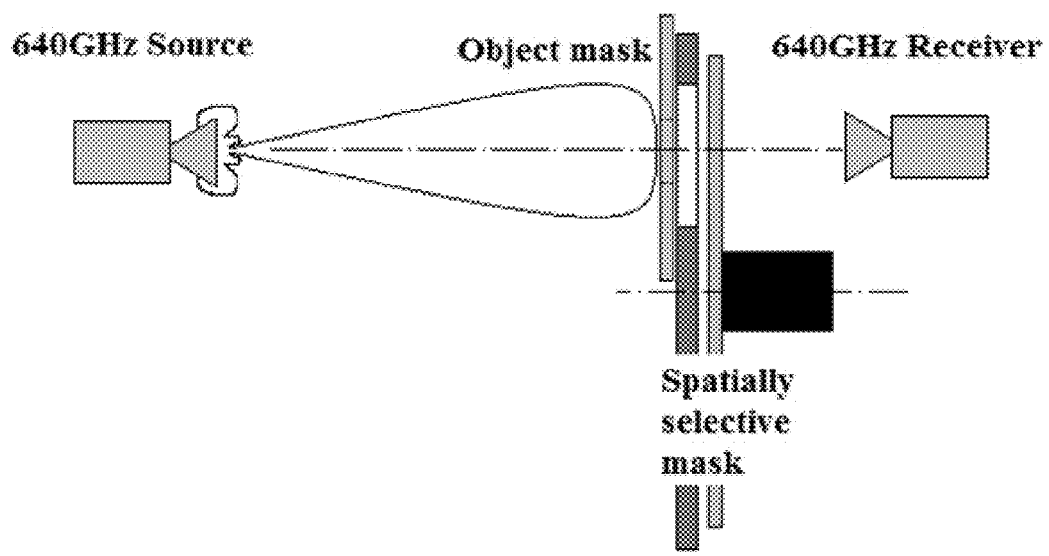
Figure 33B:
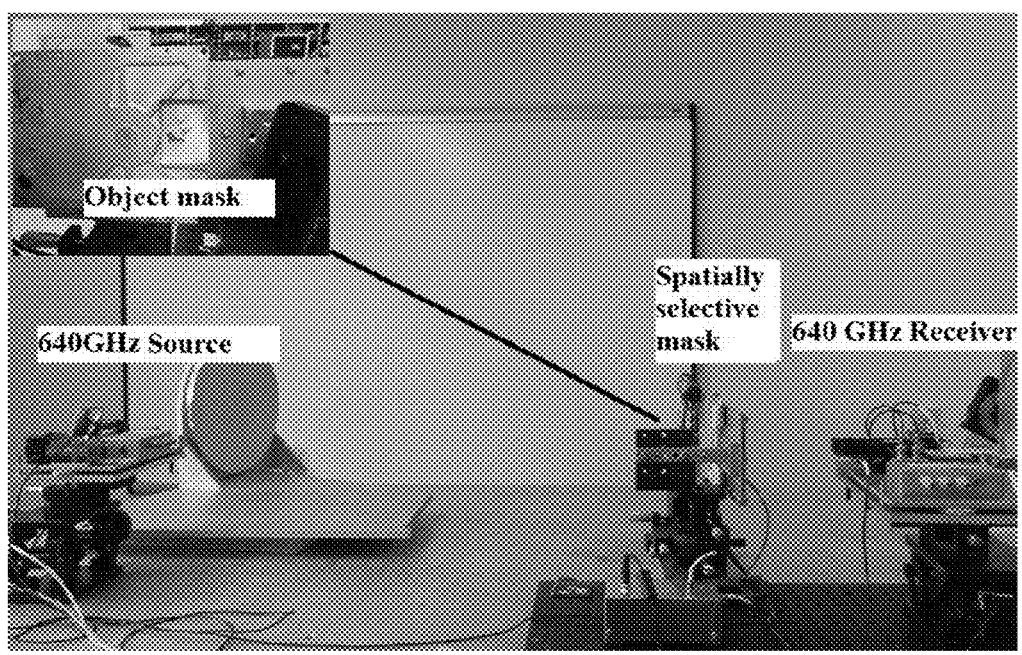
Figure 34A:
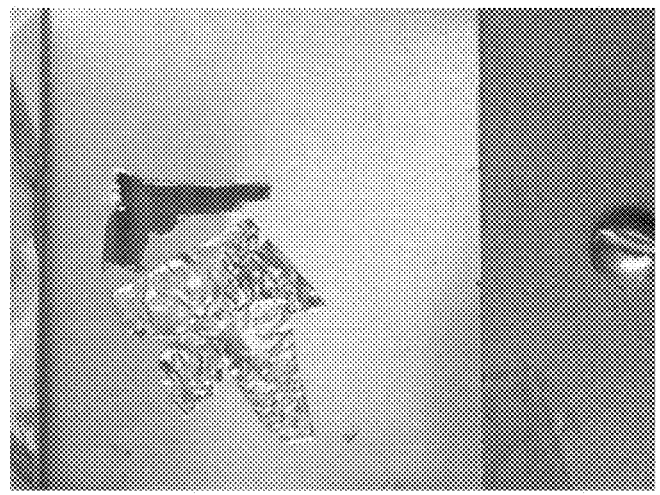
Figure 34B:
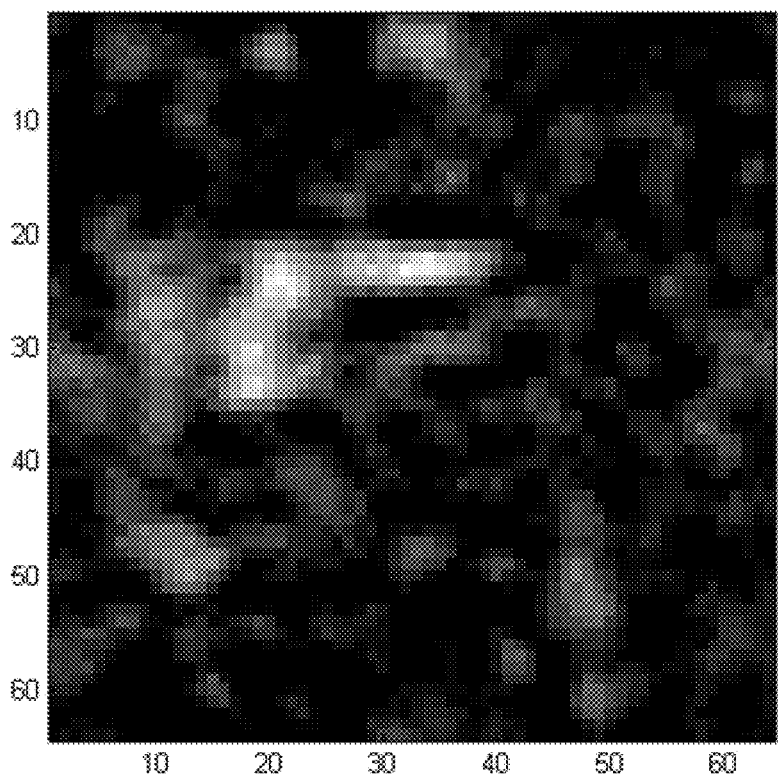

FIGS. 22A-22C provide a grouping of photographs depicting another imaging system according to an embodiment of the invention;

FIGS. 23A-23C provide 32×32 pixel reconstructed images created by the device of FIGS. 22A-22C of the targets depicted in inset photographs;

FIGS. 24A-24C provide 64×64 pixel reconstructed images created by the device of FIGS. 22A-22C of the targets depicted in inset photographs in FIGS. 23A-23C;

FIG. 25 depicts an imaging system incorporating a spatially-selective device according to another embodiment of the invention;

FIG. 26A depicts a mask in the outline of a handgun; FIG. 26B is a 64×64 pixel reconstructed image of the handgun outline with visualization contours; FIG. 26C is a 64×64 pixel reconstructed image of the handgun outline without visualization contours;

FIG. 27A depicts a mask in the outline of the letter 'M'; FIG. 26B is a 64×64 pixel reconstructed image of the 'M' outline with visualization contours; FIG. 26C is a 64×64 pixel reconstructed image of the 'M' outline without visualization contours;

FIG. 28 depicts a multi-mode imaging device according to an embodiment of the invention;

FIG. 29 depicts a multi-mode matched horn receiver coupled with a plurality of receivers according to an embodiment of the invention;

FIG. 30 depicts an integrating sphere coupled with a plurality of receivers according to an embodiment of the invention;

FIGS. 31A-31F depict various imaging window geometries according to embodiments of the invention;

FIGS. 32A-E depict various pixel geometries according to embodiments of the invention;

FIGS. 33A and 33B are a schematic and photograph, respectively, of a spatially-selective device according to an embodiment of the invention;

FIGS. 34A and 34B depict an imaged mask and a corresponding reconstructed image, respectively.

DEFINITIONS

The instant invention is most clearly understood with reference to the following definitions:

As used in the specification and claims, the singular form "a," "an," and "the" include plural references unless the context clearly dictates otherwise.

The term "far infrared" (also known as "FIR") is generally used to describe the region of the electromagnetic spectrum between about 120 terahertz ($1.2 \times 10^{14}$ Hz) to about 400 terahertz ($4 \times 10^{14}$ Hz), which corresponds to wavelength ranges between about 2,500 nanometers and about 750 nanometers.

The term "long wavelength infrared" (also known as "LWIR" or "IR-C") is generally used to describe the region of the electromagnetic spectrum between about 20 terahertz ($2 \times 10^{13}$ Hz) to about 37.5 terahertz ($3.75 \times 10^{13}$ Hz), which corresponds to wavelength ranges between about 15 micrometers and about 8 micrometers.

The term "short wavelength infrared" (also known as "SWIR" or "IR-B") is generally used to describe the region of the electromagnetic spectrum between about 100 terahertz ($1 \times 10^{14}$ Hz) to about 214 terahertz ($2.14 \times 10^{14}$ Hz), which corresponds to wavelength ranges between about 3 micrometers and about 1.4 micrometers.

The term "submillimeter radiation" (also known as "terahertz radiation", "terahertz waves", "terahertz light", "T-rays", "T-light", "T-lux", and "THz") is generally used to describe the region of the electromagnetic spectrum between about 300 gigahertz ($3 \times 10^{11}$ Hz) and about 3 terahertz ($3 \times 10^{12}$ Hz), which corresponds to wavelength ranges between about 1 millimeter and about 100 micrometers.

The term "ultraviolet" is generally used to describe the region of the electromagnetic spectrum between about $7.5 \times 10^{14}$ Hz to about $3 \times 10^{16}$ Hz), which corresponds to wavelength ranges between about 400 nanometers and about 10 nanometers.

The term "visible light" is generally used to describe the region of the electromagnetic spectrum between about 400 terahertz ($4 \times 10^{14}$ Hz) to about 790 terahertz ($7.9 \times 10^{14}$ Hz), which corresponds to wavelength ranges between about 760 nanometers and about 380 nanometers.

DESCRIPTION OF THE INVENTION

Spatially-selective disks are described along with systems and methods utilizing spatially-selective disks. The spatially-selective disks can be used to image targets using electromagnetic energy of a various wavelengths referred to herein as the "wavelength(s) of interest." Some embodiments of the invention provide an image forming device that can be packaged into a handheld box and is capable of scanning and forming images at video rates.

Spatially-Selective Disks

Figure 1:
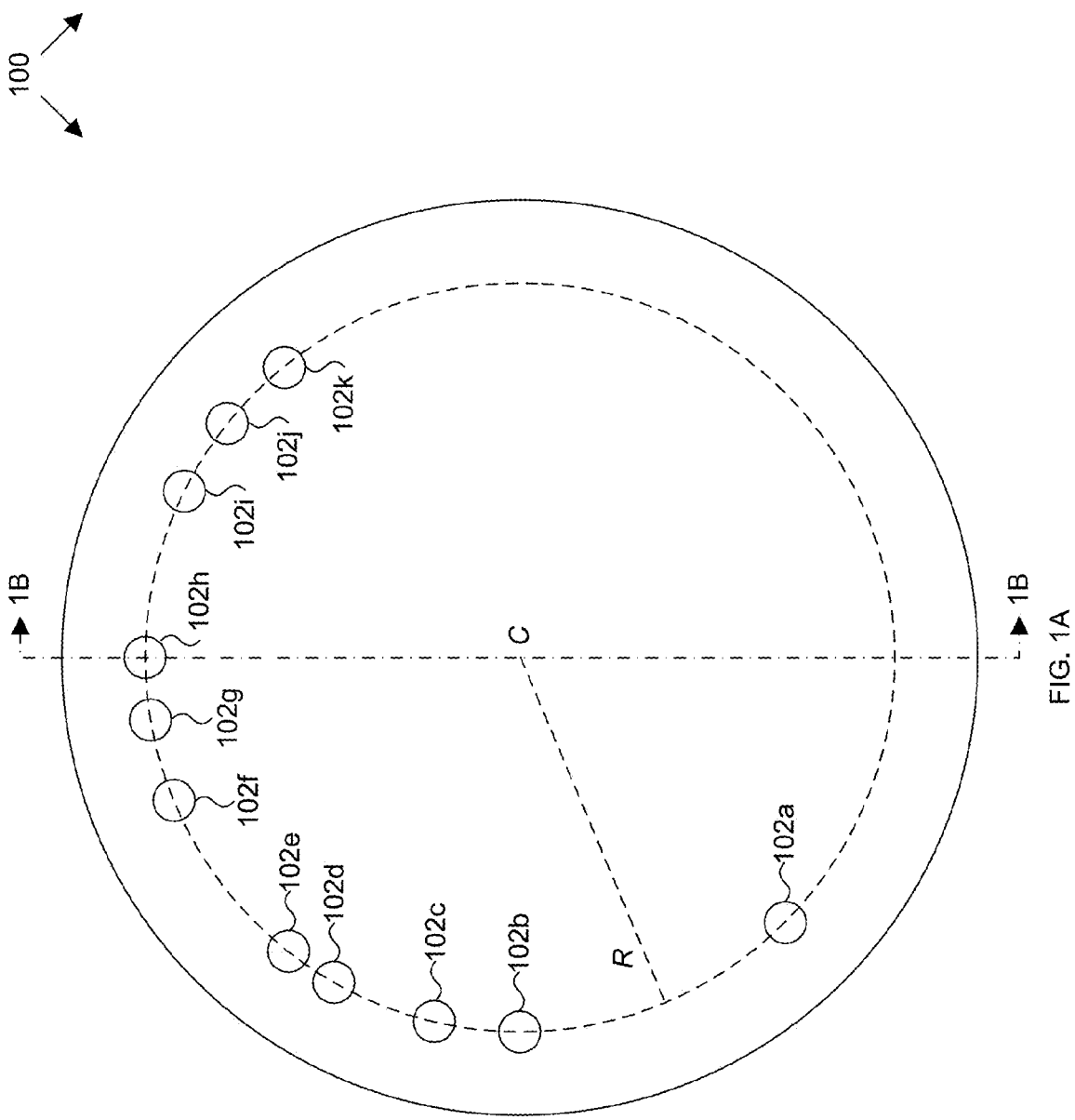
FIGS. 1A and 1B depict an embodiment of a one-dimensional spatially-selective disk according to an embodiment of the invention.

Referring now to FIG. 1, an embodiment of a one-dimensional spatially-selective disk 100 is provided. The disk 100 includes a plurality of holes 102 arranged on a substantially constant radius R from the center C of the disk 100. The holes can be positioned randomly or pseudorandomly along radius R. That is, the radial distance R between the centers of holes 102 can be random or pseudorandom. The holes 102 can also be positioned in a non-random pattern. The pattern however should produce linearly independent measurements as described herein.

Holes 102 can be cylindrical, i.e., a ruled surface spanned by a one-parameter family of parallel family of parallel lines. For example, holes 102 can have a profile selected from the group consisting of: a square, a rectangle, a triangle, a circle, an oval, a polygon, a parallelogram, a rhombus, an annulus, a crescent, a semicircle, an ellipse, a super ellipse, and a deltoid. Electromagnetic analysis can be performed for particular hole profiles to determine suitable hole dimensions for a particular shape. Preferably, the far field measurement for given hole 102 should result from the field incident on the hole 102 and not from edge currents. Holes 102 in this embodiment in all other disks described herein can be of uniform sizes and/or shapes or nonuniform sizes and/or shapes.

Preferably, the linear edge-to-edge distance between adjacent holes 102 is greater or equal to a wavelength of interest. For example, the edges of holes 102 can be separated by a linear distance ranging between about 1 times to about 5 times a wavelength of interest λ (e.g., about 1.0, about 1.5, about 2.0, about 2.5, about 3.0, about 3.5, about 4.0, about 4.5, about 5.0 times a wavelength of interest λ).

In some embodiments, the plurality of holes 102 have substantially equal diameters. In some embodiments, the radius of the holes 102 is proportional the wavelength of interest. For example, holes 102 can have radii ranging between about 0.2 to about 2.05 times a wavelength of interest λ (e.g., about 0.25, about 0.50, about 0.75, about 1.00, about 1.25, about 1.40, about 1.50, about 1.75, and about 2.00 times a wavelength of interest $\lambda$).

Embodiments of the invention described herein can be utilized to image radiation spanning a range of wavelengths. The electromagnetic analyses described herein are equally applicable for such applications and can be performed on the maximum wavelength in the range ($\lambda_{max}$). For example, holes capable of imaging a wavelength of 0.5 mm also can image wavelengths of 0.4 mm, 0.2 mm, and the like.

In some embodiments, disk 102 is fabricated from a material that is reflective or absorptive of the wavelength of interest. In further embodiments, disk 102 is fabricated from an electrically conductive material. For example, the disk can be solid piece of metal such as silver, gold, copper, aluminum, platinum, iron, and alloys thereof.

The disk 100 can have a substantially uniform thickness. In some embodiments, the thickness is defined relative to the wavelength of interest. For example, the disk 100 can have a thickness greater than or equal to about one wavelength of interest (e.g., between about 1 and about 3, between about 2 and about 3 times a wavelength of interest). In one example, used for analysis of the invention, the disk 100 had a thickness of 2.7112 times a wavelength of interest.

Imaging System

Figure 2:
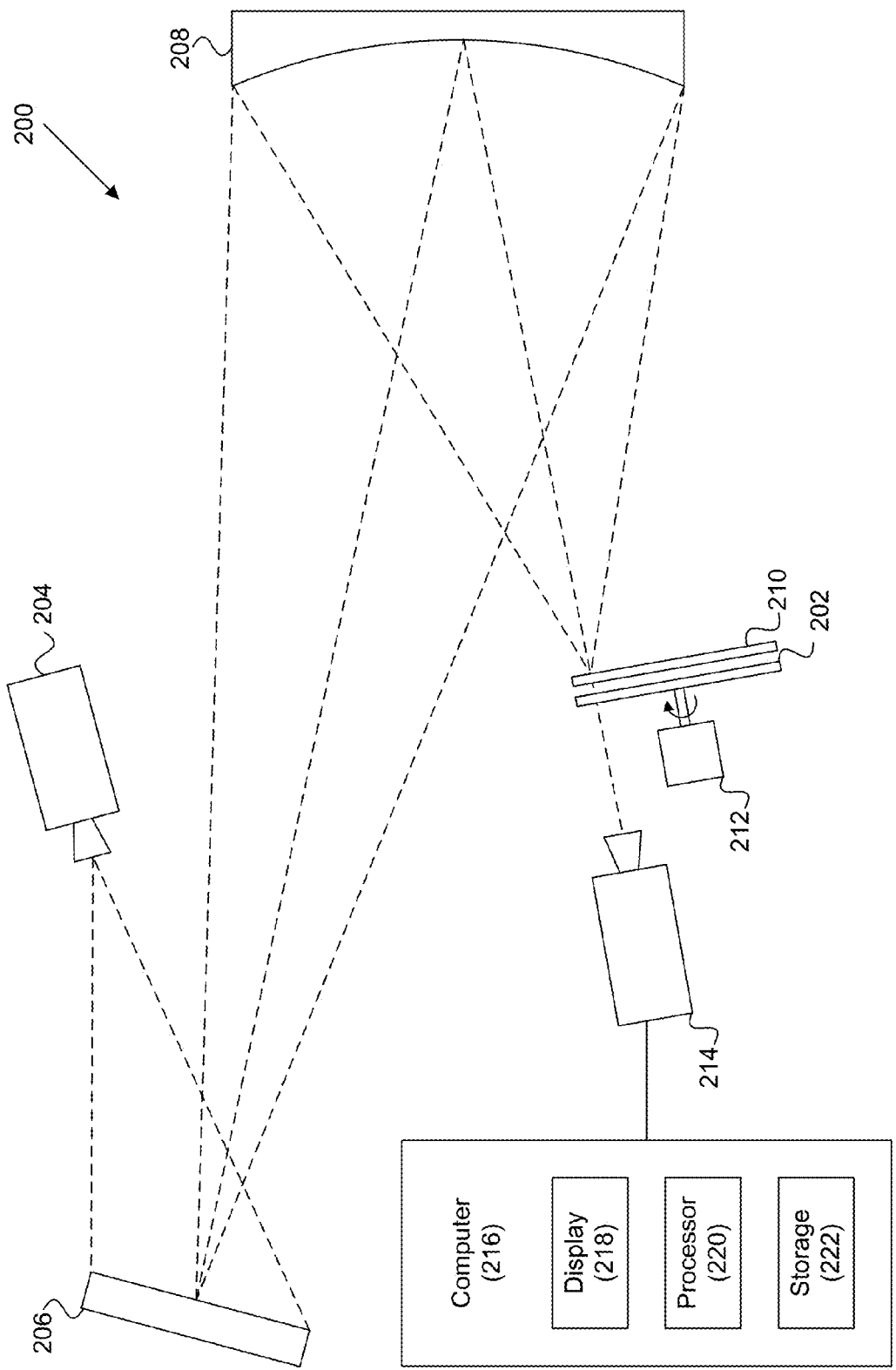
FIG. 2 depicts a system incorporating a spatially-selective disk according to an embodiment of the invention.

FIG. 2 depicts a system 200 incorporating a spatially-selective disk 202. A submillimeter wave source 204 emits radiation at a desired wavelength. Submillimeter wave source 204 exposes object of interest 206 with submillimeter waves, which are reflected to submillimeter optics 208. Submillimeter optics 208 direct the reflection to mask 210 that defines an imaging window through which portion of the waves reach the spatially-selective disk 202. As spatially-selective disk 202 is spun by motor 212, holes (not depicted) are individually brought into the focal plane of focusing mirror 208 and permit the submillimeter wave to reach submillimeter receiver 214.

Submillimeter radiation can be produced by devices such as gyrotrons, backward wave oscillators (BWOs), far infrared lasers (FIR lasers), quantum cascade lasers, free electron lasers (FELs), synchrotron light sources, and photomixing devices.

Gyrotrons are available from Communications & Power Industries of Palo Alto, Calif.; Gyrotron Technology, Inc. of Bensalem, Pa.; Thales Group of Neuilly-sur-Seine, France; and Toshiba Corporation of Tokyo, Japan. Backward wave oscillators are described in U.S. Pat. No. 2,880,355. Far infrared lasers are available from Zaubertek, Inc. of Oviedo, Fla., Laser 2000 GmbH of Munich, Germany, and Coherent, Inc. of Santa Clara, Calif. Quantum cascade lasers are described in U.S. Pat. Nos. 7,359,418 and 7,386,024 and U.S. Patent Application Publication Nos. 2008/0069164 and 2008/0219308. Free electron lasers are described in U.S. Pat. No. 7,342,230. Synchrotron light sources are available from Lyncean Technologies, Inc. of Palo Alto, Calif. Photomixing devices are described in U.S. Pat. Nos. 7,105,820 and 7,326,930 and U.S. Patent Application Publication Nos. 2005/0156110; 2006/0054824; and 2007/0229937. Integrated submillimeter generators and detectors are available under the PICOMETRIX® T-RAY™ trademark from Advanced Photonix, Inc. of Ann Arbor, Mich.

Submillimeter optics 208 can include one or more surfaces configured to reflect submillimeter radiation (e.g., curved reflective surfaces or flat reflective surfaces). Additionally or alternatively, submillimeter optics 208 can include one or more refractive elements. Refractive elements can be fabricated from a material that is substantially transparent to submillimeter radiation such as polymethylpentene (PMP) available under the TPX® trademark from Mitsui Chemicals America, Inc. of Rye Brook, N.Y. Submillimeter optics 208 can include one or more focusing mirrors (also known as "concave mirrors") are available from suppliers such as Edmund Optics Inc. of Barrington, N.J. Focusing mirrors can composed of glass, metal, or other materials capable of reflecting submillimeter radiation. Suitable mirrors (e.g. gold-coated aluminum substrates) are available from Radia-Beam Technologies, LLC of Marina Del Ray, Calif.

Motor 212 spins at a speed sufficient to produce a desired number of frames per minute. For example, if the receiver 214 is to capture images at a rate of 30 frames per second (the NTSC video standard), motor 212 can spin spatially-selective disk 202 at a rate of 1,800 revolutions per minute. Other capture rates can be achieved and by altering the speed of motor 212. Because one image is captured per revolution, the image capture rate per second is equal to the rotational speed of the disk 202 (in revolutions per minute) divided by 60. Motor 210 can, in some embodiments, be a servomechanical device capable of actuation to defined rotational positions and/or capable of self-correction of deviations from a desired rotational position and/or speed.

Motor 212 can, in some embodiments, be a DC motor that spins the disk 202 at a controlled, constant speed. The motor 212 can also be a brushless DC motor or a permanent magnet synchronous motor. The motor 212 can be any motor that can rotate the disk at a controlled constant speed with or without the help of external sensors such as positional encoders, hall sensors, and the like.

Mask 210 can, in some embodiments, be fabricated from a material configured to absorb submillimeter radiation. Suitable absorptive materials include ECCOSORB® materials (available from Emerson & Cummings of Randolph, Mass.) and radar absorbent materials (RAM). Alternatively, mask 210 can be fabricated from a material configured to reflect submillimeter radiation.

Imager 214 can be communicatively coupled with a computer 216 via communication standards such as via standards such as parallel or serial ports, Universal Serial Bus (USB), USB 2.0, Firewire, Ethernet, Gigabit Ethernet, and the like.

As understood by those of skill in the art, computer 216 can include various components such as a display device 218, a processor 220, and/or a storage device 222.

Display device 218 can be any device capable of displaying graphics and/or text. Examples of display devices 218 include a cathode ray tube (CRT), a plasma display, a liquid crystal display (LCD), an organic light-emitting diode display (OLED), a light-emitting diode (LED) display, an electroluminescent display (ELD), a surface-conduction electron-emitter display (SED), a field emission display (FED), a nano-emissive display (NED), an electrophoretic display, a bichromal ball display, an interferometric modulator display, a bistable nematic liquid crystal display, and the like.

Processor 220 is an electronic device (also known as a central processing unit or microprocessor) capable of executing instructions stored as hardware and/or software. Suitable processors are available from manufacturers such as Intel Corporation of Santa Clara, Calif. or Advanced Micro Devices (AMD) of Sunnyvale, Calif.

Storage device 222 can include persistent storage devices such as magnetic media (e.g. tapes, disks), optical media (e.g. CD-ROM, CD-R, CD-RW, DVD, HD DVD, BLU-RAY DISK®, Laserdisk), punch cards, and the like. Storage device 222 can also include temporary storage device known as memory (e.g., random access memory).

Figure 3A:
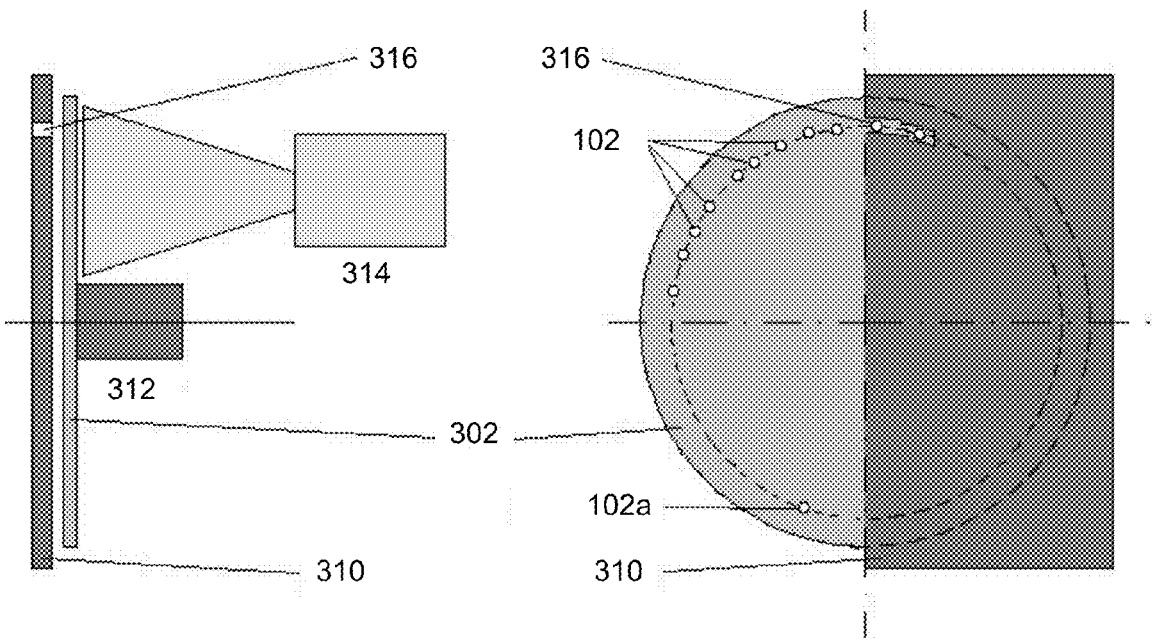
FIG. 3A depicts a conceptual sketch of a spatially-selective disk, a mask, and a coherent detector according to an embodiment of the invention.

Referring now to FIG. 3A, a conceptual sketch of a spatially-selective disk 302, a mask 310, and a coherent detector 314 is depicted. As discussed herein, the disk 302 is formed by making a sequence of holes 102 along a constant radius of a disk 302 (e.g., a disk 302 made from a conductive material such as metal). Mask 310 defines an imaging window 316 that permits radiation to reach a portion of the disk 302. (Half of the mask 310 and imaging window 316 is omitted from FIG. 3A in order to permit clearer visualization of disk 302.) Spinning the disk 302 (e.g., with a motor 312) scans the holes 102 through the image formed on disk 302. A detector 314 placed behind the spinning disk 302 collects radiation passing through the holes 102. The holes 102 can be arranged in a pseudo-random pattern.

Figure 3B:
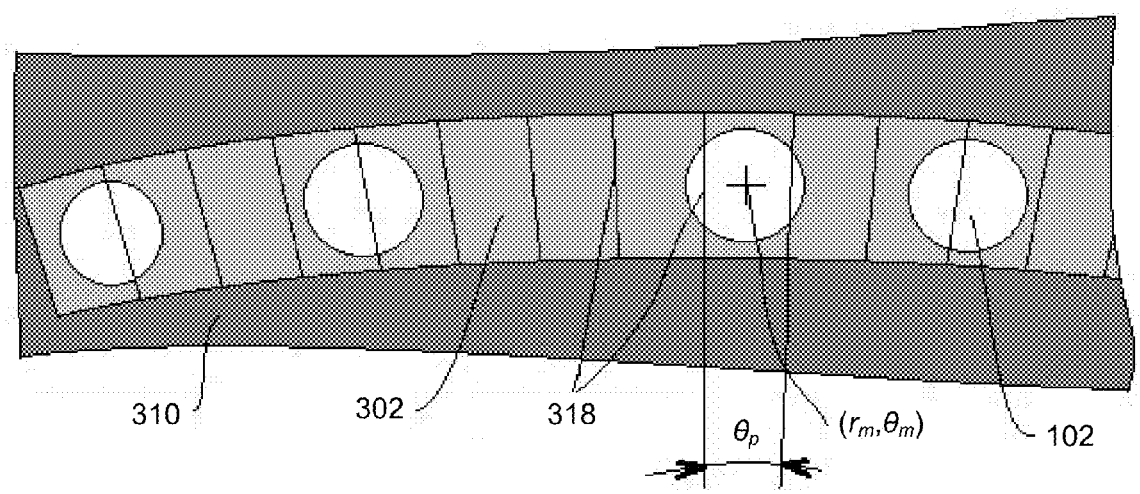
FIG. 3B depicts another view of the disk and mask from the perspective of radiation reflected by the optics according to an embodiment of the invention.

Referring now to FIG. 3B, another view of the disk 302 and mask 310 is provided from the perspective of radiation reflected by the optics. The imaging window of the mask 310 is divided by arbitrary pixel dividers 318 into a plurality of pixels, each spanning an angle $\theta_p$. The center of each hole 102 can be defined in terms of polar coordinates $(r_m, \theta_m)$ relative to the center C of disk 102.

At each detector sample time, energy from a different pattern of holes 102 is collected. These measurements constitute a linear measurement of the energy in the image formed on the disk 302. This process can be formalized mathematically and is expressed as $$\overline{m} = \overline{\overline{M}} \overline{p} \quad (1)$$

where $\overline{m}$ is a vector, the elements of which contain the values of the measurements, $\overline{\overline{M}}$ is a full rank matrix that encodes the pattern of the holes on the disk for each measurement, and $\overline{p}$ is the unknown vector that contains the pixel intensities. In compressive sensing terminology, $\overline{\overline{M}}$ is the measurement matrix and $\overline{m}$ is the measurement vector. The image is reconstructed by solving this equation for $\overline{p}$. Because $\overline{\overline{M}}$ is a full rank matrix, the solution is easy to compute. This device and the image measurement and reconstruction technique are described in more detail in Orges Furxhi & Eddie L. Jacobs, "A sub-millimeter wave line imaging device," 7670 Proc. SPIE 76700L (Apr. 27, 2010).

A regularized linear least squares solution for $\overline{p}$ can be computed to counter an ill-conditioned measurement matrix and/or a noisy measurement. Additionally or alternatively, the truncated singular value decomposition method can be utilized to solve Equation (1) for pixel values $\overline{p}$. Each of these methods is well known and described in standard linear algebra textbooks.

The imager is configured similarly to a system with a focal plane array and the image plane mask is positioned where the focal plane array would be. Because the system is still a scanning system, the available integration time per measurement per detector is much less than the integration time available to the focal plane array detectors. This is mitigated in part by the presence of many scanning holes per measurement allowing more energy to go through and be measured by the detector. In addition, if compressive imaging techniques are used, the image can be reconstructed by taking less measurements than desired image pixels as discussed in M. Duarte et al., "Single-pixel imaging via compressive sampling," 25 IEEE Signal Processing Magazine 83-91 (March 2008) and J. Romberg, "Imaging via compressive sampling," 25 IEEE Signal Processing Magazine 14-20 (March 2008). This increases the integration time available per measurement. The drawback of this technique is the slow reconstruction time associated with the iterative compressive sensing algorithms. This approach is not employed in this research; rather the number of measurements is made equal to the number of desired pixels allowing instantaneous reconstruction.

Design of Image Plane Mask

To design the image plane mask, three-dimensional electromagnetic analysis was utilized. The three-dimensional structure of interest is assumed to be a perfect electric conductor (PEC). The field incident on the structure is an elliptically polarized tapered Gaussian beam given by H. Braunisch et al., "Tapered wave with dominant polarization state for all angles of incidence," 48 IEEE Trans. on Antennas and Propagation 1086-96 (July 2000). The observables of interest are the power incident on the structure, the power reflected from the structure, and the power transmitted by the structure.

The powers are obtained once the far incident and scattered fields are known. The far incident field is derived using the stationary phase approximation as discussed in L. Mandel, "Optical Coherence and Quantum Optics" (1995). Using the incident field on the structure, the Electric Field Integral Equation (EFIE) can be solved for the currents using the Method of Moments (MoM) technique. The currents are used to find the far scattered fields with the help of the far field approximation.

The main equations used in the analysis are summarized below. The complete derivations of the equations and the numerical techniques used are available in O. Furxhi, "Spatially Selective Mirrors and Masks for Submillimeter Wave Imaging" (Doctoral Dissertation) (University of Memphis) (2010).

Figure 4:
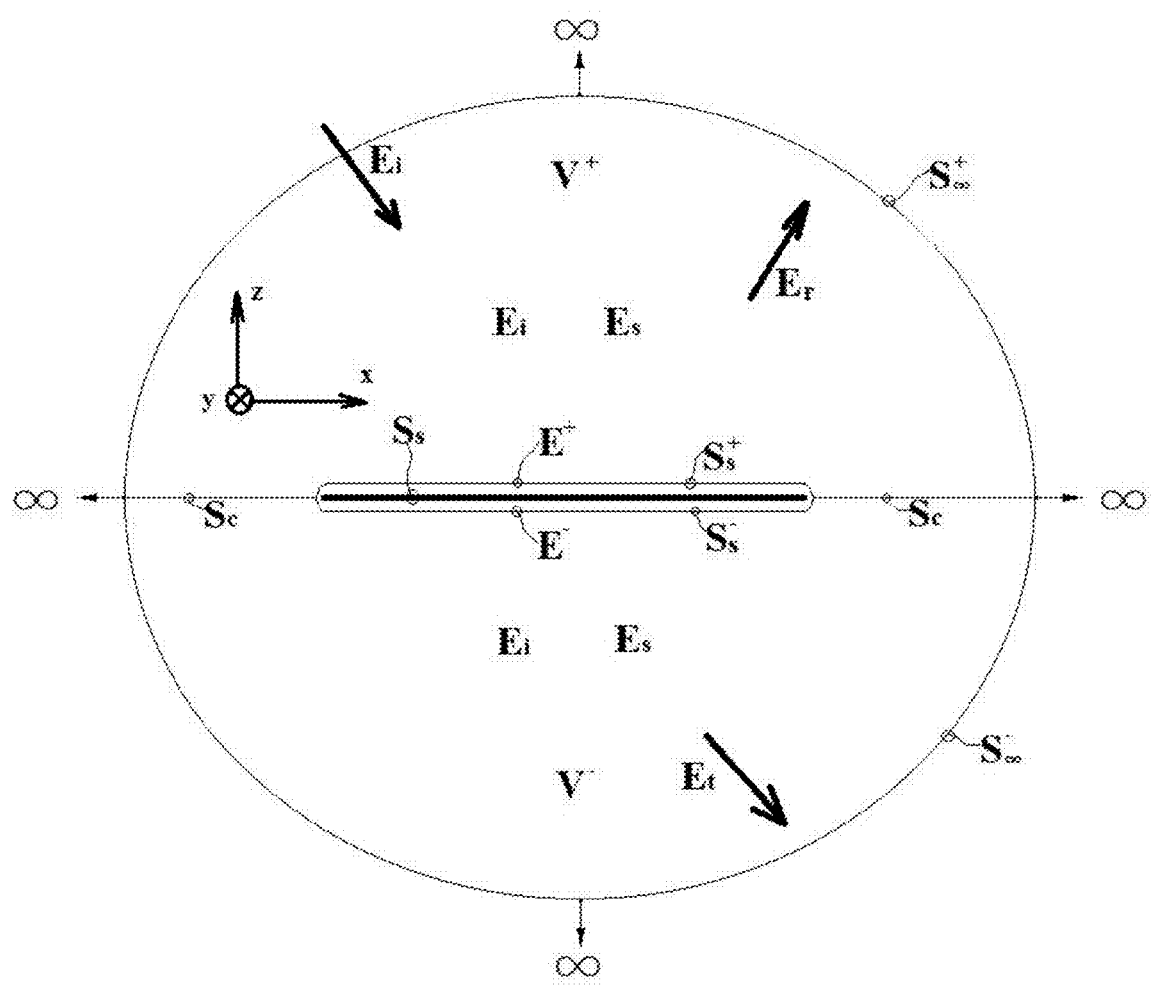
FIG. 4 depicts a cross-section of the scattering geometry according to an embodiment of the invention.

To formalize the problem, the scattering object is assumed to be an open scatterer. The open scatterer can be extended and deformed to adhere to the scattering structure of interest. A cross-section of the scattering geometry is depicted in FIG. 4. The scatterer is illuminated with the Gaussian tapered beam from above (z>0). The incident field induces currents on the scatterer which radiate. Therefore, the total field anywhere in space is composed of the incident field and the scattered field radiated by the scatterer $$\underline{E}(\underline{R}) = \underline{E}_i(\underline{R}) + \underline{E}_s(\underline{R}) \quad (2)$$

The EFIE for the structure is obtained in the following manner. The well-known vector wave equation is transformed into an integral equation using the well-known vector form of Green's theorem and the free space Green function dyad $\underline{\underline{G}}_0$ given by $$\underline{\underline{G}}_0(R, R') = \left(\underline{\underline{I}} + \frac{1}{k^2}\nabla\nabla\right)\frac{e^{ik|\underline{R}-\underline{R}'|}}{4\pi|\underline{R}-\underline{R}'|} \quad (3)$$

as described in C. Tai, "Dyadic Green's Functions in Electromagnetic Theory" (1971), where $\underline{\underline{I}} = \hat{x}\hat{x} + \hat{y}\hat{y} + \hat{z}\hat{z}$ is the unit dyad (or idem factor), $k^2 = \omega^2\epsilon_0\mu_0$ is the free space wave number, $\underline{R} = x\hat{x} + y\hat{y} + z\hat{z}$ is a vector in Cartesian space noting the observation point, $\underline{R}'$ is a vector noting the source point, and $$\nabla = \hat{x}\frac{\partial}{\partial_x} + \hat{y}\frac{\partial}{\partial_y} + \hat{z}\frac{\partial}{\partial_z}$$

is the gradient operator. The Green function dyad satisfies the wave and radiation equations as discussed by Tai. Using this fact and applying vector identities as discussed in J. Jackson, "Classical Electrodynamics" (1999), Equation (4) is obtained $$\underline{E}(\underline{R}) = \qquad (4)$$

$$-\oint_S [i\omega\mu_0(\hat{n}\times\underline{H}(\underline{R}'))\cdot\underline{\underline{G}}_0(\underline{R}',\underline{R}) + (\hat{n}\times\underline{E}(\underline{R}'))\cdot\nabla'\times\underline{\underline{G}}_0(\underline{R}',\underline{R})]ds$$

where $\underline{E}(\underline{R})$ is the electric field in a volume V enclosed by the surface S, $\hat{n}$ is the outward normal to S, and $\underline{H}(\underline{R}')$ is the magnetic field on the surface contour.

Referring to FIG. 4, Equation (4) is applied to the following fields in the respective regions: the scattered field in the volume $V^+$ enclosed by $S_s^+$, $S_c$, and $S_\infty^+$; and the incident field in the volume $V^-$ enclosed by $S_s^-$, $S_c$, and $S_\infty^-$. In all three cases, the integral over $S_\infty^{+/-}$ vanishes because the scattered and incident fields satisfy the radiation condition in the respective regions. Combining and adding the three resulting equations as the contours $S_s^+$ and $S_s^-$ approach $S_s$ and using Equation (2) results in $$\underline{E}_s(\underline{R}) = \int_{S_s}[i\omega\mu_0(\hat{n}\times(\underline{H}^+ - \underline{H}^-))\cdot\underline{\underline{G}}_0 + (\hat{n}\times(\underline{E}^+ - \underline{E}^-))\cdot\nabla'\times\underline{\underline{G}}_0]ds \qquad (5)$$

$$\underline{R}\in V^-\cup V^+$$

Equation (5) gives the scattered field in the volumes $V^+$ and $V^-$ in terms of the fields on the scatterer surface $S_s$. The superscripts + and − indicate fields above and below the scatterer in $\hat{n}'$ is the unit normal pointing into the unit normal pointing into $V^+$. This equation is made more specific by applying the well-known PEC boundary conditions of the scatterer discussed in J. Volakis, "Finite Element Method for Electromagnetics" (1998)

$$\underline{E}_s(\underline{R}) = i\omega\mu_0\left(\underline{\underline{I}} + \frac{1}{k^2}\nabla\nabla\right)\cdot\int_{S_s}\underline{J}_s(\underline{R}')\frac{e^{ik|\underline{R}-\underline{R}'|}}{4\pi|\underline{R}-\underline{R}'|}ds' \qquad (6)$$

$$\underline{R}\in V^-\cup V^+$$

where $\underline{J}_s$ is the surface current on the scatterer and the free space Green function dyad is written explicitly. Equation (6) is used to find the scattered field in the volume V once the surface currents are known. The final form of the EFIE is obtained using Equation (2) in Equation (6) and evaluation Equation (6) on the boundary of the PEC scatterer $$\hat{n}\times\underline{E}_i(\underline{R}) = -\hat{n}'\times\left\{i\omega\mu_0\left(\underline{\underline{I}} + \frac{1}{k^2}\nabla\nabla\right)\cdot\int_{S_s}\underline{J}_s(\underline{R}')\frac{e^{ik|\underline{R}-\underline{R}'|}}{4\pi|\underline{R}-\underline{R}'|}ds'\right\} \qquad (7)$$

$$\underline{R}\in S_s$$

The unknown currents are obtained by solving Equation (7) using the Method of Moments.

The incident field on the scatterer is given by Equation (8) as discussed in O. Furxhi, "Spatially Selective Mirrors and Masks for Submilimeter Wave Imaging" (Doctoral Dissertation) (University of Memphis) (2010).

$$\underline{E}_i(\underline{R}) = \int_0^{2\pi}d\phi\int_0^{\pi/2}d\theta k^2\sin\theta\cos\theta\times\exp \qquad (8)$$

$$\{ik[x\sin\theta\cos\phi + y\sin\theta\sin\phi - z\cos\theta]\}\times\psi(\theta,\phi)\underline{e}(\theta,\phi)$$

This is a Gaussian beam with spatial center at the origin of the coordinate system and $\underline{e}(\theta,\phi)$ and $\psi(\theta,\phi)$ are the polarization vector and Gaussian spectrum respectively, as given in H. Braunisch et al., "Tapered wave with dominant polarization state for all angles of incidence," 48 IEEE Trans. on Antennas & Propagation 1086-96 (July 2000).

The far incident field is calculated from Equation (8) using the method of stationary phase for double integrals as presented in Leonard Mandel & Emil Wolf, "Optical Coherence and Quantum Optics" (1995). For z>0 and, $$0 < \theta_s < \frac{\pi}{2},\ 0 < \phi_s < 2\pi$$

the far incident field is given by $$\underline{E}_i(\theta_s,\phi_s) \sim \frac{\exp[-ikr]}{r}\underline{F}_i(\theta_s,\phi_s) \qquad (9)$$

Similarly, the far incident field for z<0, and $$\frac{\pi}{2} < \theta_s < \pi,\ 0 < \phi_s < 2\pi,$$

the far incident field is given by $$\underline{E}_i(\theta_s,\phi_s) \sim \frac{\exp[-ikr]}{r}\underline{F}_i(\theta_s,\phi_s) \qquad (10)$$

where $$\underline{F}_i(\theta_s,\phi_s) = \qquad (11)$$

$$\begin{cases} \frac{2\pi i}{k}\cos(-\theta_s)k^2\psi(-\theta_s,\phi_s)\underline{e}(-\theta_s,\phi_s) & 0 < \theta_s < \frac{\pi}{2} \\ -\frac{2\pi i}{k}\cos(-\theta_s-\pi)k^2\psi(\theta_s-\pi,\phi_s-\pi)\underline{e}(\theta_s-\pi,\phi_s-\pi) & \frac{\pi}{2} < \theta_s < \pi \end{cases}$$

is the far incident field amplitude and it is assumed that $0<\phi_s<2\pi$.

The far field is obtained by approximating Equation (6) for the large argument $|\underline{R}-\underline{R}'|$ and making the far field approximation as discussed in A. Ishimaru, "Electromagnetic Wave Propagation, Radiation, and Scattering" (1991). The far scattered field is given by $$\underline{E}_s(r,\theta,\phi) = \frac{e^{ikr}}{r}\underline{F}_s(\theta,\phi) \qquad (12)$$

where $$E_s(\theta, \phi) = i\frac{\omega\mu_0}{4\pi}\int_{S_s}(\underline{J}_s(\underline{R}') - \hat{o}\hat{o}\cdot\underline{J}_s(\underline{R}'))e^{-ik(\underline{R}'\cdot\hat{o})}ds' \quad (13)$$

is the far scattering field amplitude. The unit vector $\hat{o}$ is in the direction of the observation and is given by $$\hat{o} = \hat{x}\sin\theta\cos\phi + \hat{y}\sin\theta\sin\phi + \hat{z}\cos\theta \quad (14)$$

Because of the conservation of energy, the power incident on the structure is equal to the sum of powers reflected by and transmitted through the structure. Because the structure is a perfect electric conductor (PEC), there is no absorbed power. Therefore, as discussed in O. Furxhi, "Spatially Selective Mirrors and Masks for Submillimeter Wave Imaging" (Doctoral Dissertation) (University of Memphis) (2010):

$$P_I = P_T + P_R \quad (15)$$

where $P_I$ is the incident power given by $$P_I = \frac{1}{\eta_0}\int_0^{\pi/2}d\theta\sin\theta\int_0^{2\pi}d\phi|E_i|^2 \quad (16)$$

$P_R$ is the reflected power given by $$P_R = \frac{1}{\eta_0}\int_0^{\pi/2}d\theta\sin\theta\int_0^{2\pi}d\phi|E_i|^2 \quad (17)$$

$P_T$ is the transmitted power given by $$P_T = \frac{1}{\eta_0}\int_{\pi/2}^{\pi}d\theta\sin\theta\int_0^{2\pi}d\phi|E_i + E_s|^2 \quad (18)$$

For the numerical solution of Equation (7), the structure of interest is modeled using triangular patches. The famous Rao-Wilton-Glisson (RWG) basis functions described in S. Rao et al., "Electromagnetic scattering by surfaces of arbitrary shape," 30 IEEE Trans. on Antennas & Propagation 409-18 (1982), are used as basis and testing functions for the MoM. The resulting matrix equation is solved using available software such as MATLAB® software (available from The Math-Works, Inc. of Natick, Mass.). Once the surface currents on the structure are found, the desired power quantities are calculated with the help of the equations presented above.

Detailed explanations of the equations presented above and the numerical methods associated with them are provided in O. Furxhi, "Spatially Selective Mirrors and Masks for Submillimeter Wave Imaging" (Doctoral Dissertation) (University of Memphis) (2010).

Electromagnetic Analysis Results and Design Parameters

The analysis method presented above can be used to design the parameters of the scanning holes, namely the radius, depth, and minimal proximity of the holes. As discussed in O. Furxhi, "Spatially Selective Mirrors and Masks for Submillimeter Wave Imaging" (Doctoral Dissertation) (University of Memphis) (2010), the depth of the holes does not have a noticeable effect on the transmission of the radiation through the holes as long as the radius of the hole is larger than the first cutoff radius of a circular waveguide and the depth is comparable to the diameter of the hole. For holes with radii less than the cutoff radius, transmission decreases exponentially with depth.

Various embodiments of the invention demonstrated herein utilize holes with large radii, i.e., radii greater than or equal to the largest wavelength of interest. Therefore, from a design perspective, the hole depth is a free parameter. In one embodiment, the thickness of the disks was approximately $2.7112\lambda$, where the wavelength $\lambda=468.43$ μm, corresponding to a frequency of 640 GHz. Because of this restriction, the hole depth parameter is fixed.

As discussed, embodiments of the invention described herein can be utilized to image radiation spanning a range of wavelengths. The electromagnetic analyses described herein are equally applicable for such applications and can be performed on the maximum wavelength in the range ($\lambda_{max}$).

Figure 5A:
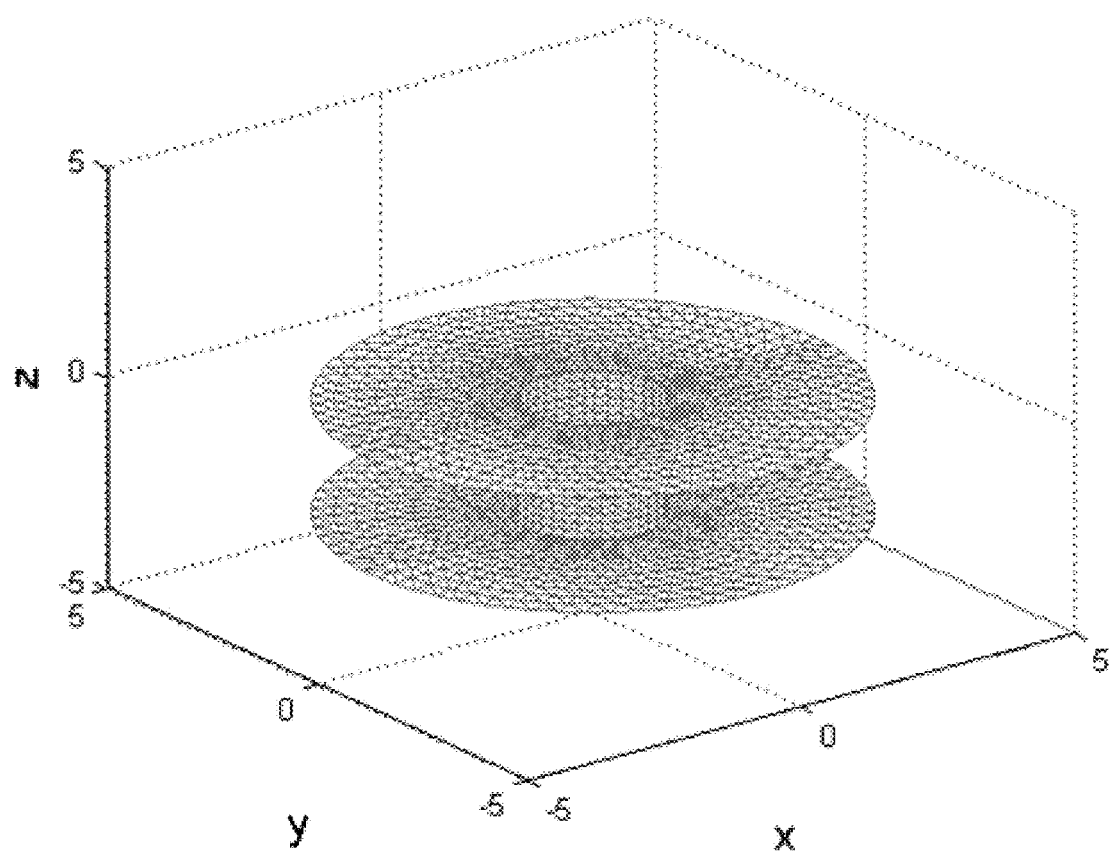
FIGS. 5A-5C depicts the three-dimensional geometry of the hole structure in accordance with an embodiment of the invention (units are in normalized $\lambda$)
Figure 5B:
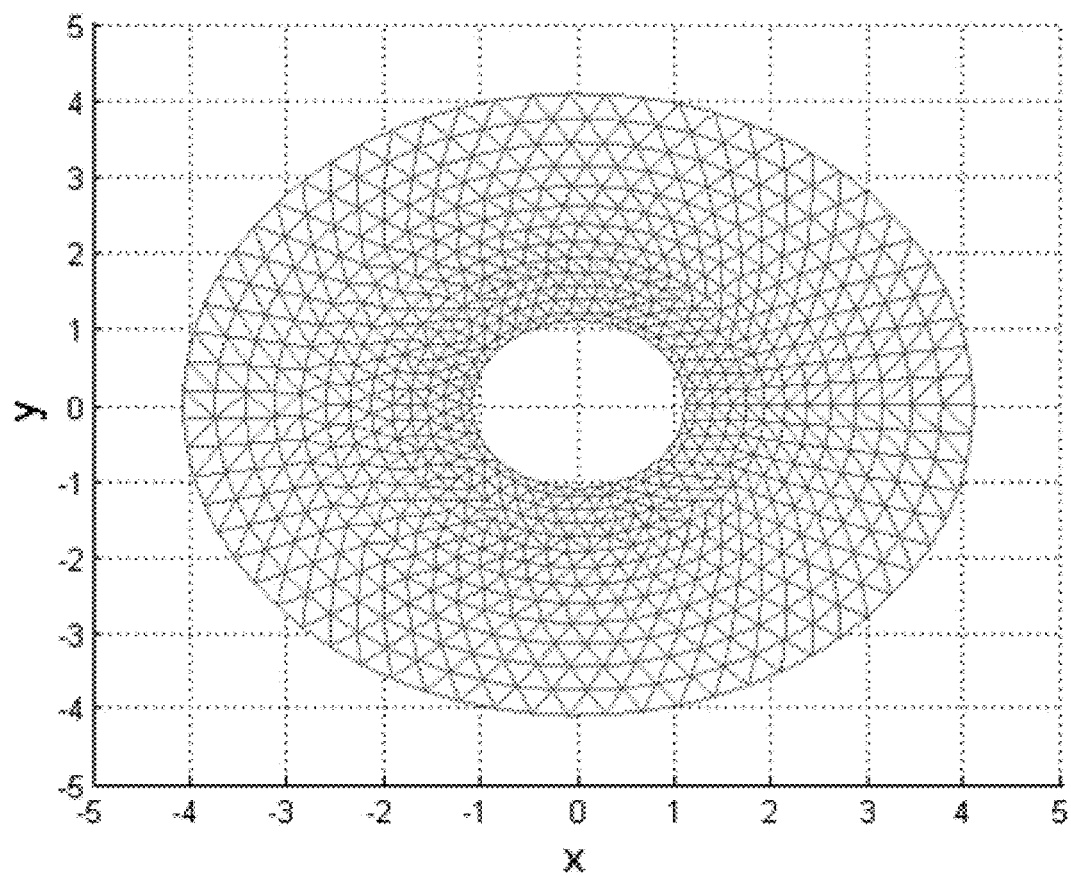
Figure 5C:
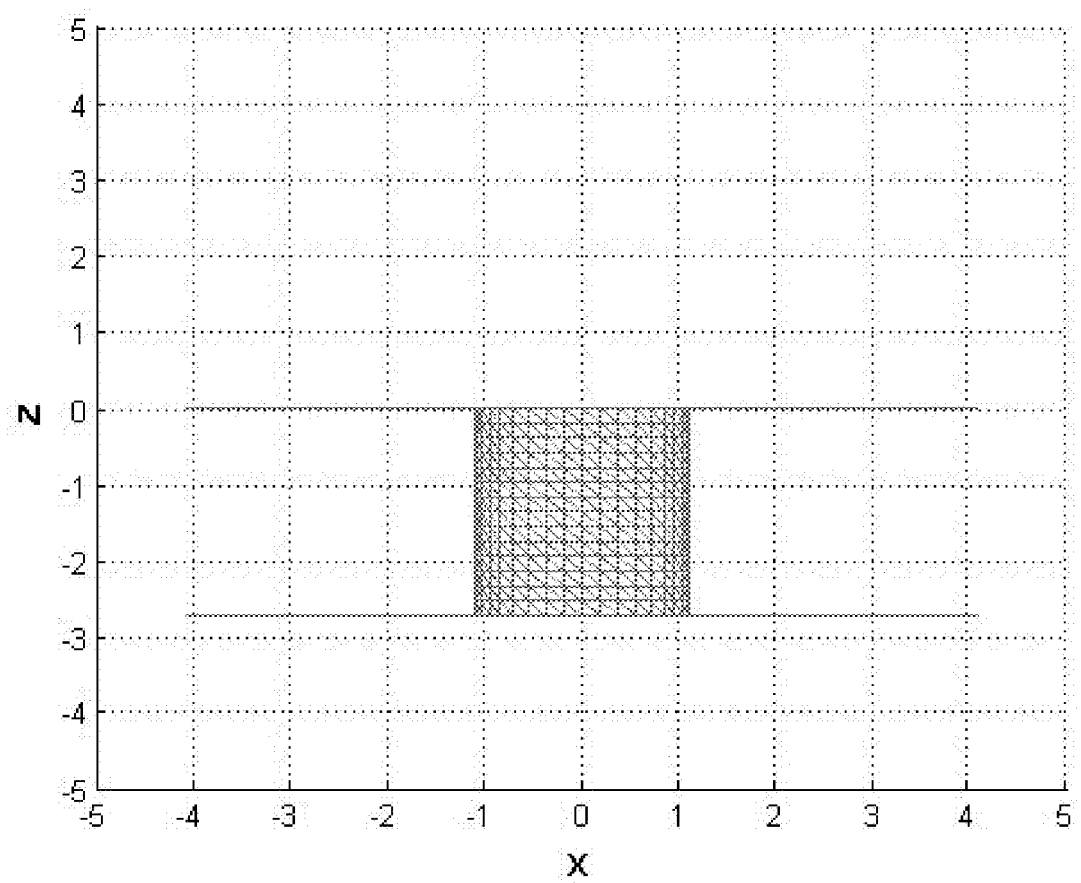
Figure 6:
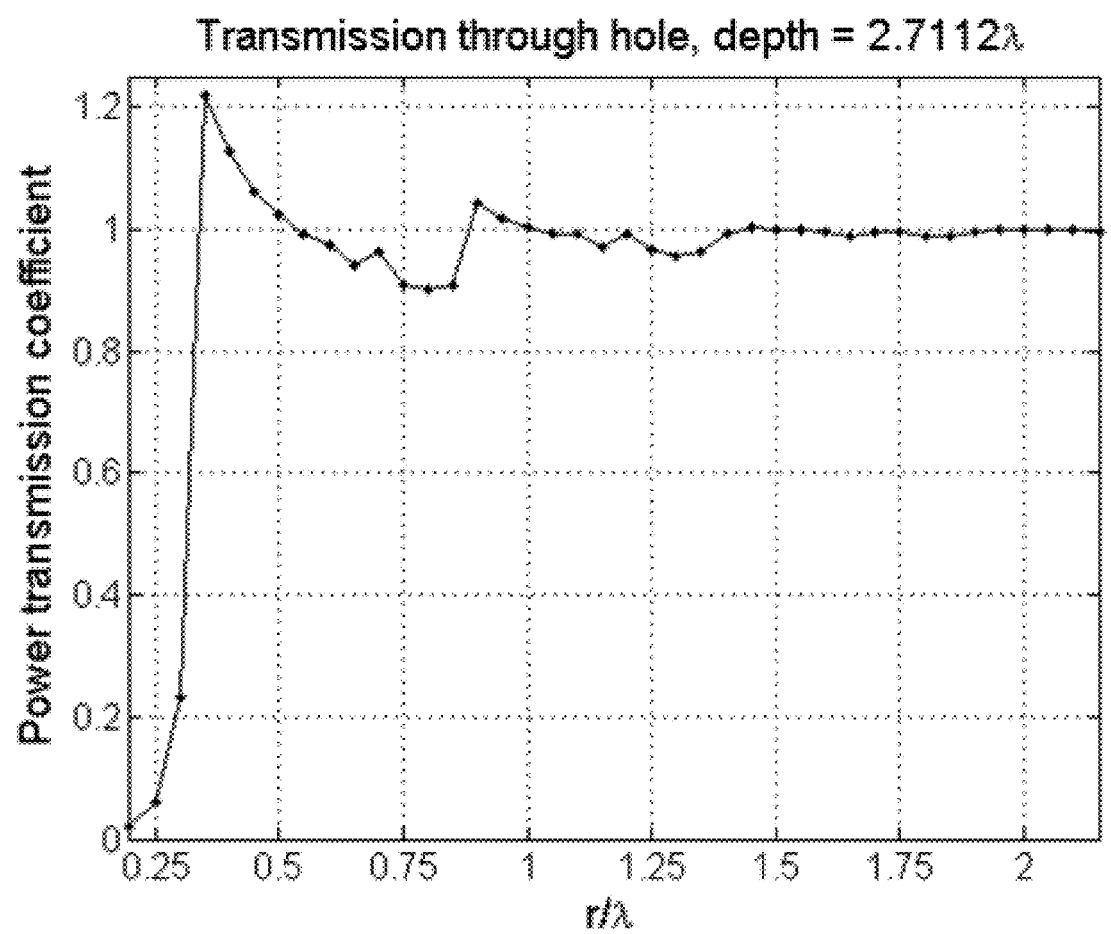
FIG. 6 depicts the power transmission coefficient as a function of hole radius for a hole depth of $2.7112\lambda$.

The power transmission coefficient of the holes with depth $2.7112\lambda$ is investigated as a function of the hole radius. The three-dimensional geometry of the structure used in this analysis is depicted in FIGS. 5A-5C. The geometry is finite and has a diameter of $8\lambda$. The incident field has a tapering of $1.5\lambda$ (the tapering parameters is related to the variance of the Gaussian taper), is normally incident, and is circularly polarized. The incident beam resembles a blur spot approximately $5\lambda$ in diameter. Because the incident field is tapered, the structure can be made finite and the transmission of the hole can be measured. The radius of the hole is varied from $0.2\lambda$ to $2.05\lambda$ in steps of $0.05\lambda$. The power transmission coefficient is calculated as the ratio of the incident power on the top aperture of the hole to the power transmitted in the lower hemisphere (z<0). The results are shown in FIG. 6.

The transmission coefficients for certain radii are greater than unity. The reason for this is that only the power incident on the hole aperture from above is used as the input power reference. The fields radiated by the edge currents at the hole apertures are not included in the input power reference but they are accounted for in the far field measurement. Hence, the calculated power transmission coefficient is greater than unity. The edge current effects become less evident as the radius increases. When the radius is larger than $1.4\lambda$, these effects are almost unnoticeable and therefore the far field measurement results only from the power incident on the hole aperture. In this case, the holes are said to scan the image formed on the image plane mask. This is the desired effect because the radiation associated with the part of the image formed on the hole should pass while the part of the image outside the hole is blocked.

Figure 7A:
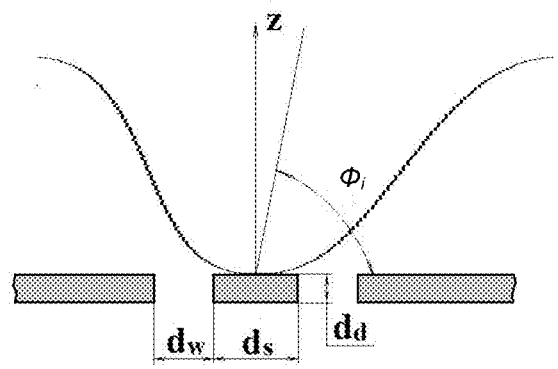
FIGS. 7A-7C depict the cross-sections of the geometries used to investigate the minimal proximity between holes (the depth of the holes is $2.7112\lambda$, the radius of the holes is $1\lambda$, and the incident field is the same as in the radius analysis)
Figure 7B:
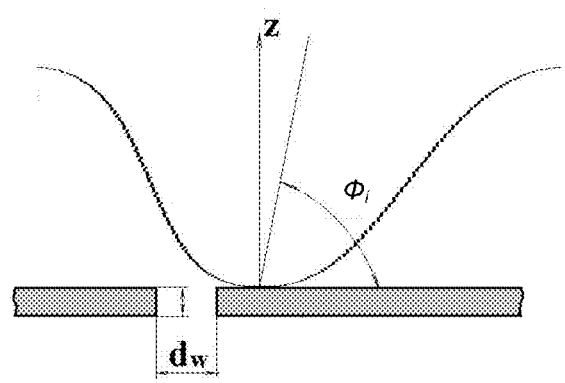
Figure 7C:
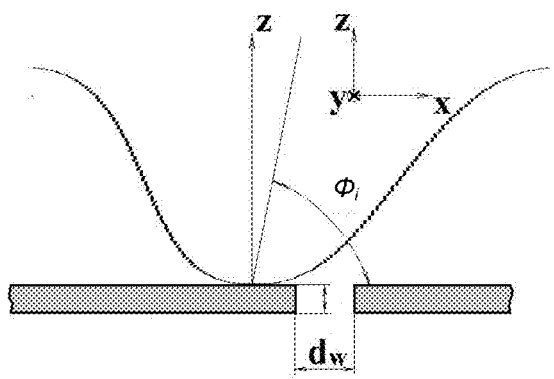

Another important parameter is the proximity between two holes. This affects the linearity of the structure. Cross-sections of the geometries used to investigate the minimal proximity are shown in FIGS. 7A-7C. The depth of the holes was $2.7112\lambda$ and the radius of the holes was $1\lambda$. For these hole parameters, the transmission coefficient is unity. For a linear structure, the measurement from the structure in FIG. 7A should be equal to the sum of the measurements from the structures of FIGS. 7B and 7C. Because the source and the detector are coherent, the power measurement is not expected to be linear.

Figure 8:
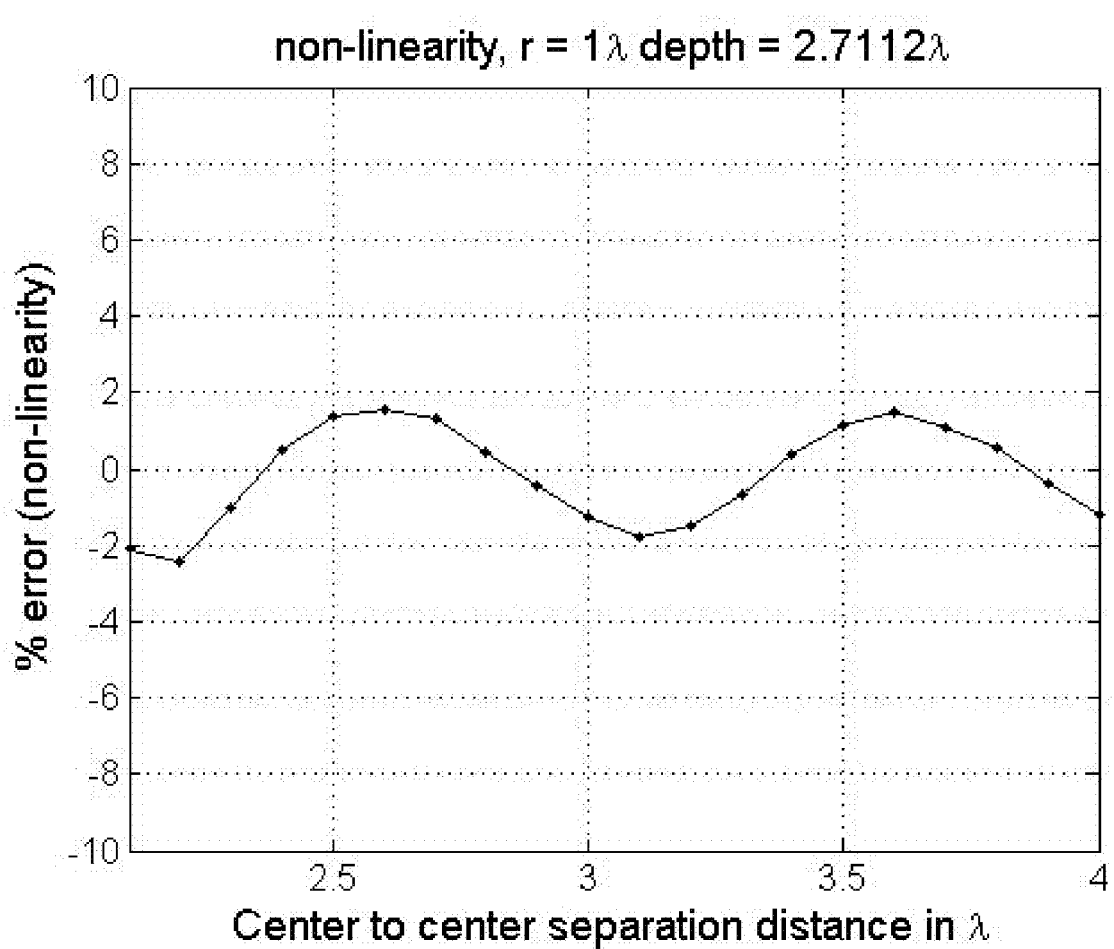
FIG. 8 depicts the percent linearity error as a function of the center to center separation of two identical holes.

To investigate the linearity of the structure as a function of the separation distance, the percent linearity error metric is introduced. The percent linearity error is calculated as the difference of the measurement from the structure in FIG. 7A with the sum of the measurements from the structures of FIGS. 7B and 7C. Then, the result is divided by the sum of the measurements from the structures of FIGS. 7B and 7C and multiplied by 100%. The results are depicted in FIG. 8.

Except when the holes are very close to each other (edge to edge separation<λ) the linearity error oscillates around zero with a period of 1λ. This error is predicted by the array factor of this structure because the structure resembles two identical radiating antennas separated by a distance as discussed in O. Furxhi, "Spatially Selective Mirrors and Masks for Submillimeter Wave Imaging" (Doctoral Dissertation) (University of Memphis) (2010) and C. Balanis, "Antenna Theory" (1997). The error can be eliminated if many holes are placed at random distances from each other. This is advantageous because it not only improves the linearity of the structure but it also does not require any modification of the scanning technique. The holes in the line imager are placed in random fashion as required by the reconstruction technique.

From the results of the electromagnetic analysis, design parameters for the holes in the image plane mask can be identified. The radii of the holes are preferably greater than about 1.4λ, but other radii are also possible such as about 1λ. In all these cases, the far field measurement results from the field incident on the hole, and not from the edge currents. In this case, the holes are effectively scanning the image formed on the mask.

The edge to edge separation of the holes is preferably greater than about 1λ. This separation assures that the only non-linearity is due to the array factor of the structure.

The depth of the holes was determined based on the available disk for the production of the mask. However, if the depth parameter is to be designed, it should preferably be comparable with the diameter of the holes and such that it does not introduce resonances (i.e., edge currents). In general, so long as the radius and the depth of the holes increase proportionally, transmission and linearity will be preserved.

Working Example #1

Implementation of Imaging System

Figure 9:
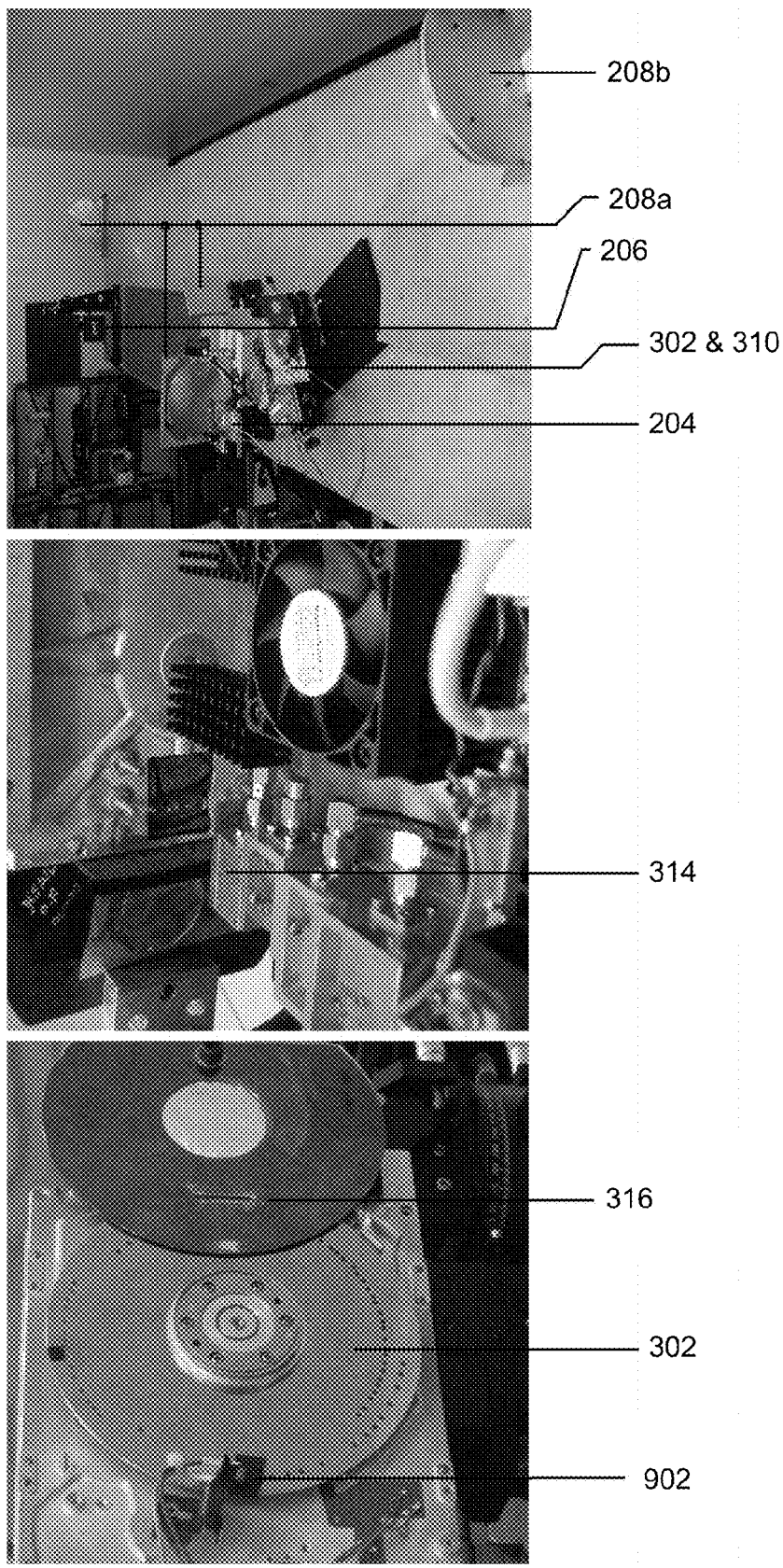
FIG. 9 is a grouping of photographs depicting an imaging system according to an embodiment of the invention.

A grouping of photographs depicting an embodiment of the imaging system described herein is provided in FIG. 9. A laboratory prototype of the image plane mask device was implemented using parts from a 5.25 inch hard drive. The hard drive platters were made of conducting materials and were advantageously balanced and flat. The platters were used as the disks 302 on which the scanning holes were drilled. The motor could be driven at a constant rate and the disk was already mounted on the motor. The motor was driven at three revolutions per second. The motor could rotate at speeds up to 90 rotations per second using other electronics.

The front cover of the hard drive was removed and an imaging window 316 was placed in front of the scanning disk 302. The optical system (comprised of folding mirrors 208a and elliptical mirror 208b) formed the image on the imaging window 316, which was approximately 22 millimeters long. An opening was made in the back of the case so that the radiation was allowed to pass onto the receiver 314. An optical sensor 902 was mounted in the vicinity of disk edge. This sensor 902 was used to trigger a measurement for each rotation of the disk 302 and facilitated the registration of the measurements with the position of the disk 302.

The receiver 314 and source 204 were obtained from Virginia Diodes, Inc. of Charlottesville, Va. and operate at 640 GHz. The signal was detected from the receiver 314 and down-converted to 4.8 GHz. The down-converted signal was measured using the AGILENT® SCA AN1996A spectrum analyzer available from Agilent Technologies, Inc. of Santa Clara, Calif. The measurement data was transferred remotely to a computer where it was stored and later post-processed to reconstruct the image. For each rotation of the disk 302, 1000 data points were collected.

The optical system consisted of a main elliptical reflective surface 208b with a focus at 1 meter and the other at 10 meters. The image was formed on the 1 meter side. The system had an effective diameter of 0.3048 meters (12 inch) and an effective focal length of 0.9091 meters, resulting in a F# of 2.9826. The magnification of the system was 0.1, the depth of focus for coherent radiation was 0.01062 meters, and the depth of field for incoherent radiation was 1.0162 meters. The diffraction spot diameter was 3.75 millimeters for a wavelength of 468.43 µm, corresponding to the illumination frequency of 640 GHz. The system was folded using two flat mirrors 208a. The source 204 was placed three meters away from the object 206 to flood illuminate it.

Holes were drilled on the disk 302 in a constant radius of 58 millimeters. This radius and the extent of the imaging window were chosen to minimize the curvature of the scan. A single hole of radius 0.5 millimeters (1:06λ) is drilled at a distance from other holes that have a radius of 1 millimeter (2.12λ) and are placed in the vicinity of each other at a random order respecting the design parameters presented above. The single hole was used to perform a raster scan of the image formed on the imaging window. The radius of half a millimeter allowed high transmission (over 98%) and high scan resolution. The disk 302 was 1.27 millimeters (2.7112λ) thick.

The imaging window 316 was placed over the disk 302 so that the image is scanned vertically. For demonstration purposes, the object 206 was placed on a translational stage and was scanned horizontally. Vertical lines of the image of the object were scanned by the image plane mask as the object was moved horizontally and an image of it was reconstructed when the measured data is post-processed.

Working Example #2

Experimental Results of Imaging System

Figure 10:
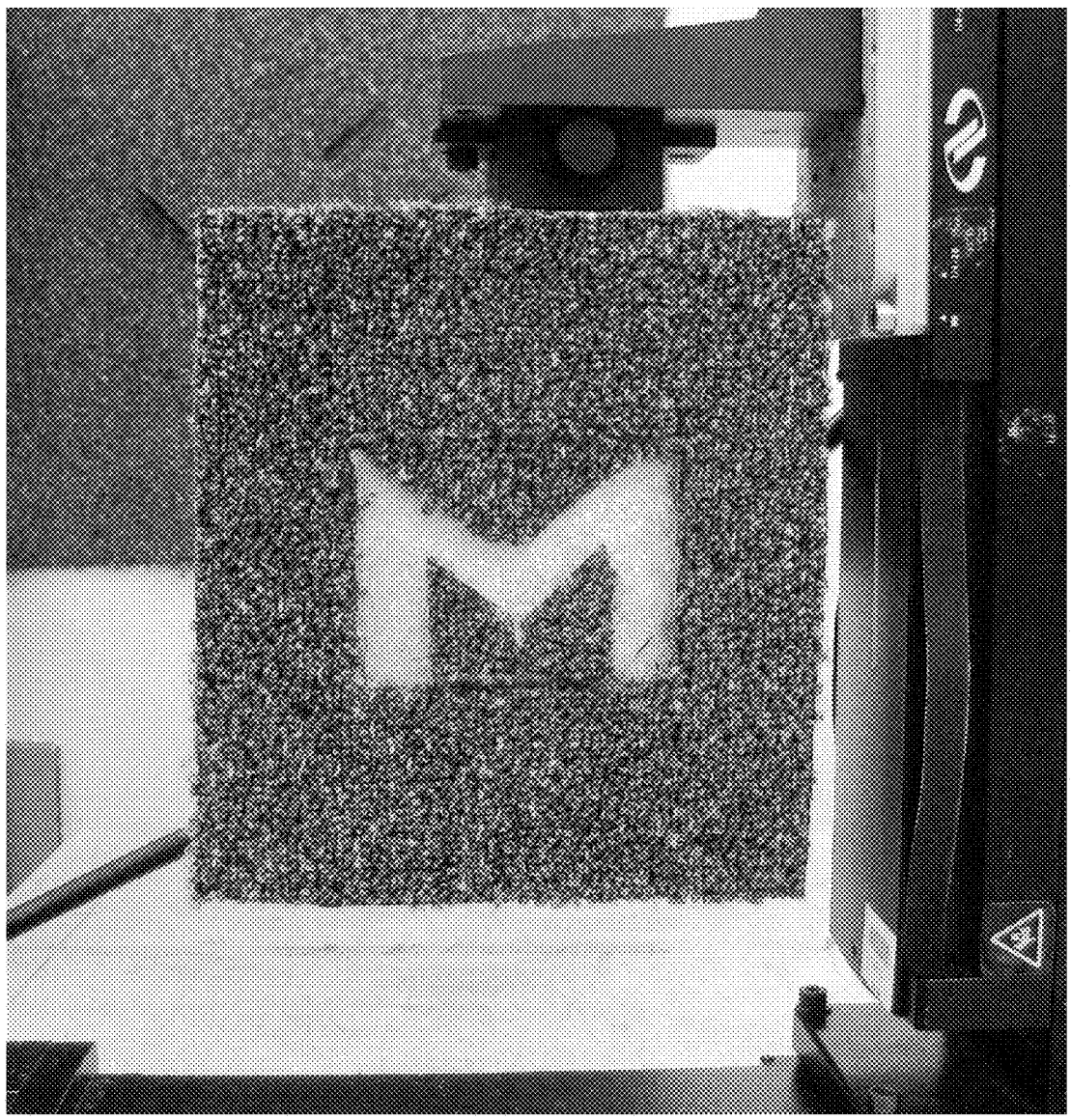
FIG. 10 is a photograph of the target mounted on the translational stage according to an embodiment of the invention.

The letter "M" was imaged to investigate the capabilities of the assembled imaging system. A photograph of the target mounted on the translational stage is provided as FIG. 10. The object letter was formed by placing a piece of carpet with a cutout of the letter "M" over a plate of aluminum. The plate of aluminum was made rough to minimize specular reflections. The contour of the letter "M" was approximately 15 to 20 millimeters wide. The height of the letter was 60 millimeters. Because of the characteristics of the optical system, the image was expected to be one tenth of the object in size and highly blurred. The target was made small to ensure that it was illuminated uniformly by the source. Illumination optics were not used; hence, the wavefront reaching the object was not planar and images of large objects were not formed properly.

Figure 11A:
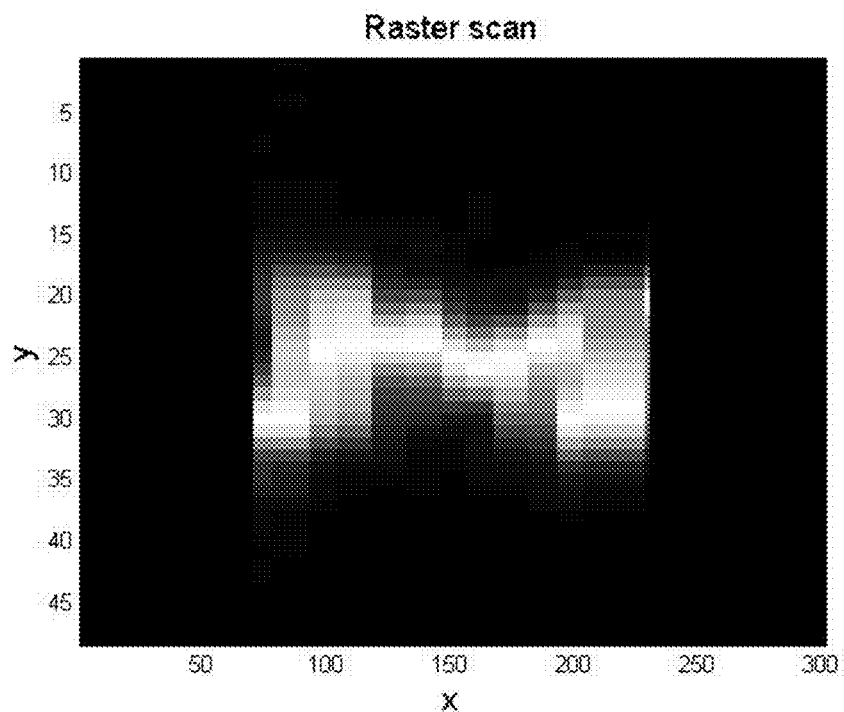
FIG. 11A is an image reconstructed from the raster scan using an imaging system according to an embodiment of the invention.
Figure 11B:
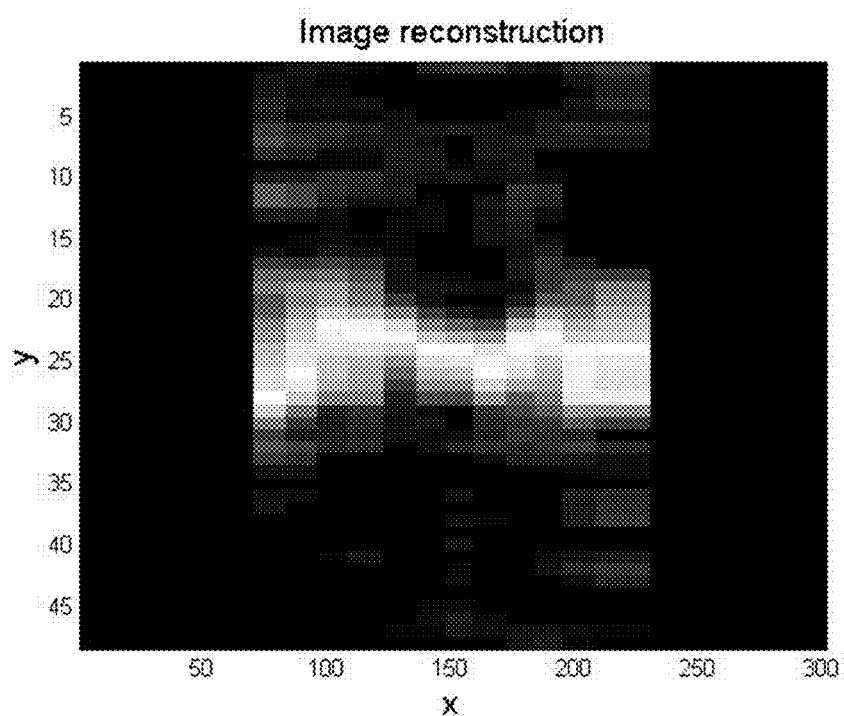
FIG. 11B is an image reconstructed from the linear measurement using an imaging system according to an embodiment of the invention.

The results of the raster scan (single hole) and linear measurement scan (plurality of holes) are depicted in FIGS. 11A and 11B, respectively. Referring to the raster scan image of FIG. 11A, which will be used as the reference, the image is severely blurred. However, the structure of the letter "M" can be identified. The blur was expected given the characteristics of the optics. From the measurements, the image has a height of 25 samples corresponding to 9.1 millimeters (the radius where the holes are placed is 58 millimeters and 1000 data points were collected per rotation). This is consistent with the calculation from the parameters of the optical system, resulting in an object size of approximately 60 millimeters.

FIG. 11B is the reconstructed image using the linear measurements made on the image plane. There is a clear resemblance between the reconstructed image and the raster scan image of FIG. 10A. The techniques used to reconstruct the image are described in detail in. Orges Furxhi & Eddie L. Jacobs, "A sub-millimeter wave line imaging device," 7670 Proc. SPIE 76700L (Apr. 27, 2010) and O. Furxhi, "Spatially Selective Mirrors and Masks for Submillimeter Wave Imaging" (Doctoral Dissertation) (University of Memphis) (2010). To reconstruct the image, regularization was used when inverting the measurement matrix because of the error in the knowledge of the exact positions of the holes on the disk for each data sample. The quality of the reconstruction will improve if all of the energy that goes through the holes is measured.

Additional Embodiments

Current embodiments of the invention can perform line scans at rates of three frames per second and post-process the data to reconstruct the images.

Imaging can be improved by driving the hard drive spindle motor so that the disk can be spun at least 30 revolutions per second. This will facilitate video rate imaging.

The use of additional down-converters and an analog to digital conversion card interfaced to a computer will facilitate the collection of the measurement data and the real time image reconstruction.

Additionally, refined optics for the imager and illumination systems will facilitate uniform plane wave illumination of the scene and the minimization of aberrations. To collect all the energy that passes through the holes, a lens can be placed behind the holes. The lens will focus the energy on the horn of the receiving antenna.

One of the factors that affect the quality of the reconstructed image is the uncertainty of the location of the holes. To mitigate this uncertainty, precision machining can be used to drill the holes at known locations.

The sensitivity of the imager can be improved if the image plane mask is shielded properly from stray radiation that makes its way into the receiver. This permits formation of images of objects that have low reflectivity coefficients. Also, increasing the size of the imaging window would allow for the formation of larger images. Because more randomly placed holes will be contributing to the measurement, the linearity of the measurement will improve. This will improve the quality of the reconstruction.

The imager can be extended to full two-dimensional imaging by replacing the slit imaging window with a rectangular imaging window and by adding more randomly-placed holes on the disk. The image reconstruction technique is the same as for the line image and has been described in detail in Orges Furxhi & Eddie L. Jacobs, "A sub-millimeter wave line imaging device," 7670 Proc. SPIE 76700L (Apr. 27, 2010) and O. Furxhi, "Spatially Selective Mirrors and Masks for Submillimeter Wave Imaging" (Doctoral Dissertation) (University of Memphis) (2010). Preliminary analysis provided in O. Furxhi, "Spatially Selective Mirrors and Masks for Submillimeter Wave Imaging" (Doctoral Dissertation) (University of Memphis) (2010) demonstrates the ability to generate enough random patterns in one revolution of the disk to reconstruct a 32 by 32 pixel image from linear measurements.

Two-Dimensional Imaging

Figure 12A:
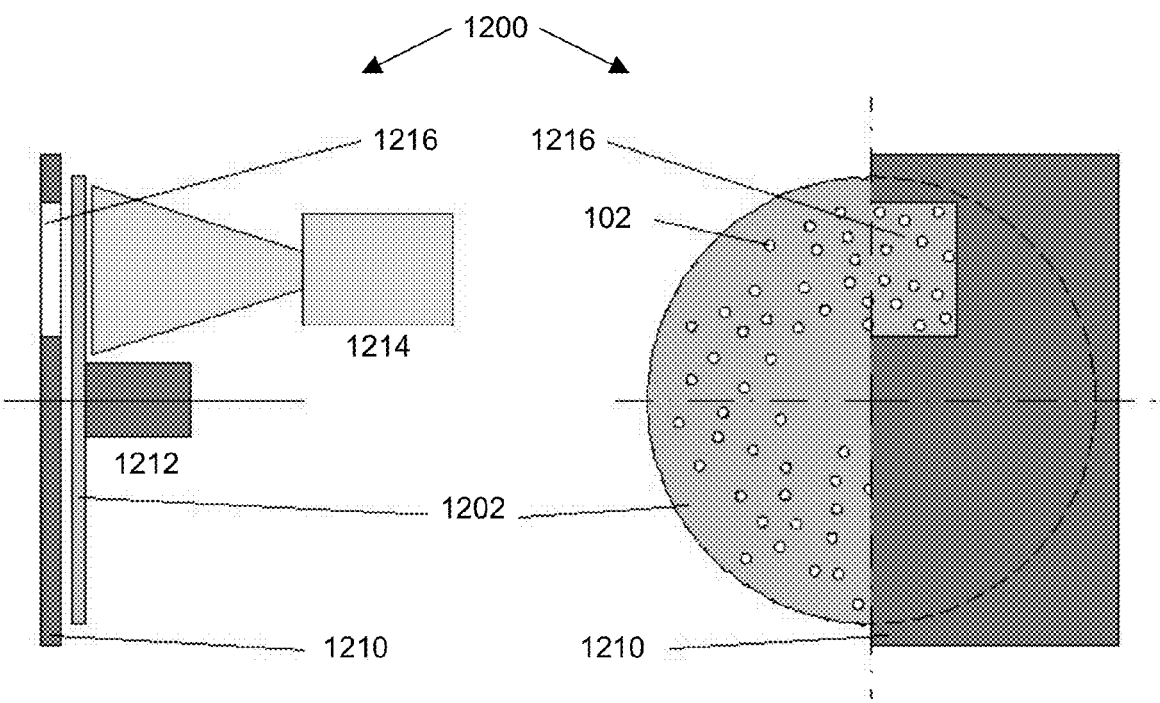
FIGS. 12A and 12B are schematics of a spatially-selective mask device for imaging in two dimensions according to an embodiment of the invention.
Figure 12B:
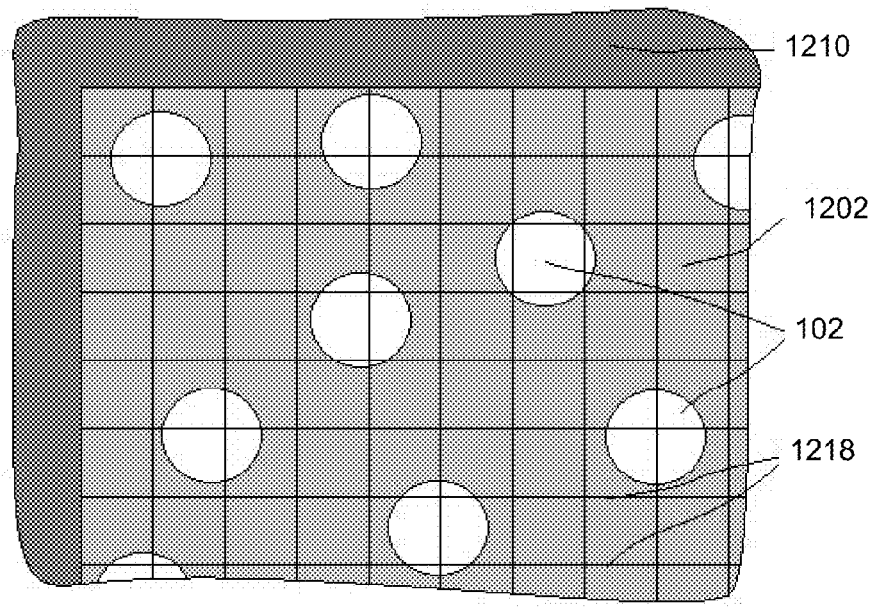

FIGS. 12A and 12B provide a schematic of a spatially-selective mask device 1200 for imaging in two dimensions. Device 1200 includes a disk 1202 having a plurality of holes 102 arranged in a random or pseudo-random two-dimensional pattern. Disk 1202 is positioned behind a mask 1210, which defines an imaging window 1216, and is spun by a motor 1212. Radiation selectively passes through holes 102 and is measured by receiver 1214.

Referring to FIG. 12B, the imaging window 1216 is divided into a plurality of pixels by pixel dividers 1218.

Equation (1) is valid for both the one-dimensional and two-dimensional imaging problems. For the two dimensional image, the two dimensional array of pixels are linearized and each row of the array is concatenated to the end of the previous row. Just like for the line imager, a full set of measurements can be collected during one full rotation of the disk. Therefore, if the disk is rotated at a constant rate of 1,800 rotations per minute the imager will produce images at a video rate of 30 frames per second.

In some embodiments as depicted in FIG. 12B, the pixel block is a square. In such an embodiment, the entries of the measurement matrix can be calculated by the following method. The imaging window is divided into conceptual square blocks as shown in FIG. 12B, each corresponding to an image pixel. Each pattern of holes in the imaging window 1216 corresponds to one row of the measurement matrix. Different patterns are obtained at different rotational positions of the disk. For each pixel, a Monte Carlo integration method is used to determine the area of intercept of that pixel with the holes 102 inside the imaging window 1216. The ratio of the area of intercept to the area of the pixel is the entry on the row of the measurement matrix corresponding to that pattern and pixel.

Additionally or alternatively, analytical solutions can be developed to determine the ratio of the area of intercept. The solution depends on the relative position of the circle with respect to the square and also on the radius of the circle with respect to the side of the side. Such analytical have been implemented in MATLAB® software.

Scanning Applications

Embodiments of the invention can be utilized for standoff scanning (e.g., at large gatherings such as sporting events, parades, rallies, and the like.)

Other embodiments of the invention can be utilized for profiling sensors that scan a single line of a moving object and form an image in time. Such an embodiment can be deployed in environment such as airports, office buildings, and the like where individuals are asked to move through portal. Advantageously, profiling scanners only require the imaging of a single line at any given moment. (The lines are then combined to form an image.) Thus, the reflector size and computation power for image acquisition can be minimized. Both multiple-modulation and raster scanning embodiments described herein can be used in profiling scanners.

Figure 13:
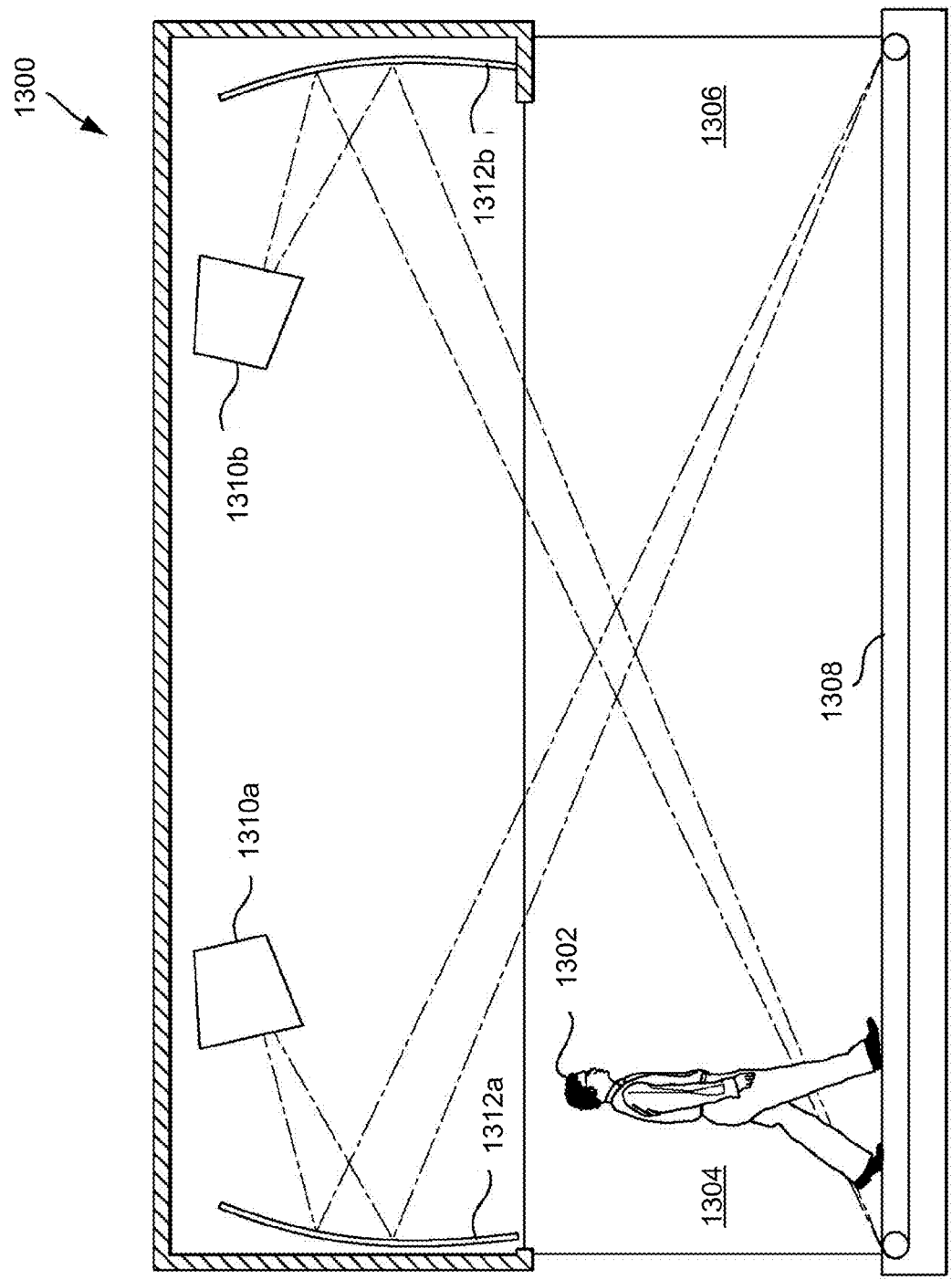
FIG. 13 depicts a profiling scanner incorporating the imaging devices described herein according to an embodiment of the invention.

Referring now to FIG. 13, a profiling scanner 1300 incorporating the imaging devices described herein is provided. An individual 1302 enters the scanner 1300 at a proximal end 1304 and exits at a distal end 1306. The individual can move through the scanner 1300 by walking or can stand on an optional moving walkway 1308. As the individual moves through the scanner 1300, one or more imaging devices 1310a, 1310b images a plurality of lines (e.g., substantially horizontal lines) of the individual's body.

In some embodiments one or more optics 1312a, 1312b are used to focus the imager. For example, the optics can 1312a, 1312b can focus on the floor of the distal end 1306 and proximal end 1304, respectively. As the individual 1302 moves through the scanner, the individual's entire body will be imaged without the need to adjust the optics 1312.

In some embodiments, the profiling scanner 1300 or other scanning device can be paired with or include a conventional optical camera. The submillimeter wave line profile can be superimposed over the visible image to provide more meaningful information (e.g., where contraband is located on an individual).

Imaging Methods

Figure 14:
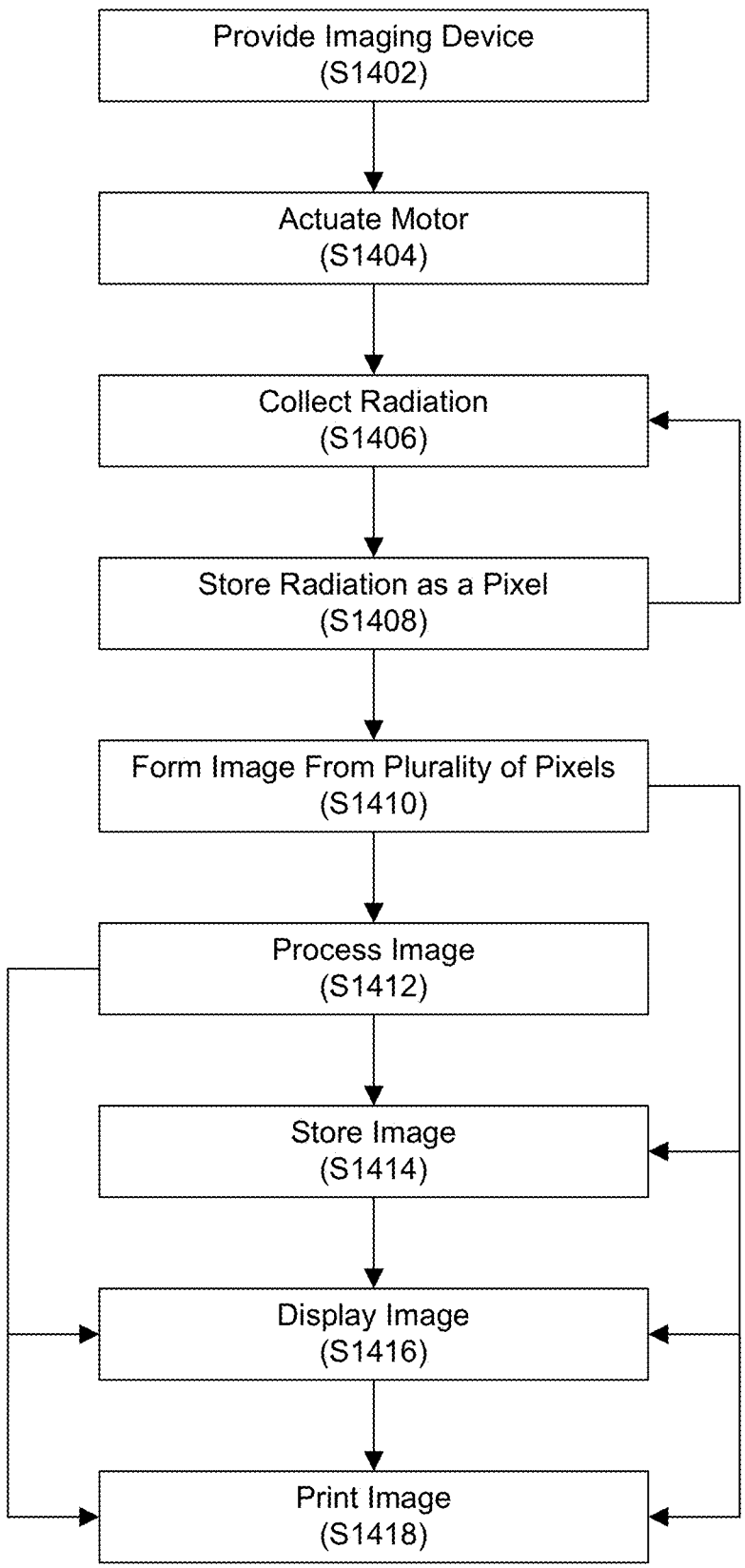
FIGS. 14 and 15 depict imaging methods according to embodiments of the invention.

FIG. 14 depicts an imaging method according to one embodiment of the invention. In step S1402, an imaging device is provided, for example an imaging device described herein. The imaging device can include submillimeter wave optics, a spatially-selective structure, a motor configured to rotate the spatially-selective structure, and a submillimeter wave receiver as described herein. In step S1404, the motor is actuated to rotate the spatially-selective disk. In step S1406, a plurality of reflections is captured by the submillimeter wave receiver. In step S1408, radiation is stored as a pixel. In step S1410, an image is formed from a plurality of pixels.

In step S1412, the image can be processed with an image recognition method capable of identifying suspicious items that could be a weapon or contraband. Various suitable methods are known to those of skill in the art and include edge detection algorithms and artificial intelligence algorithms (e.g. neural nets) such as those described in U.S. Pat. Nos. 7,310,442 and 7,417,440 and U.S. Patent Application Publication No. 2008/0212742 and in Mohamed-Adel Slamani et al., "Image Processing Tools for the Enhancement of Concealed Weapon Detection," 3 *Proc. Int'l Conf. on Image Processing* 518-22 (October 1999). One or more privacy algorithms can also be applied to the images to obscure sensitive regions such as faces and/or human genitalia.

In step S1414, the image can be stored either by dedicated hardware or software or by a general purpose computer programmed to acquire, store, display, and/or transmit the images.

The images can be stored in variety of formats including known and proprietary vector graphics formats such as vector graphics formats and raster graphics formats. Vector graphics (also called geometric modeling or object-oriented graphics) utilize geometrical primitives such as points, lines, curves, and polygons to represent images. Examples of vector graphics formats include the Scalable Vector Graphics (SVG) and Vector Markup Language (VML) formats. The SVG format is defined at W3C, *Scalable Vector Graphics* (*SVG*), http://www.w3.org/Graphics/SVG/. VML is described in Brian Matthews, et al., *Vector Markup Language* (*VML*), http://www.w3.org/TR/1998/NOTE-VML-19980513. Alternatively, the images can be converted to or maintained in a raster graphics format, which is a representation of images as a collection of pixels. Examples of raster graphics formats include JPEG, TIFF, RAW, PNG, GIF, and BMP.

The images can also be compiled into a video format such as BETAMAX®, BLU-RAY DISK®, DVD, D-VHS, Enhanced Versatile Disk (EVD), HD-DVD, Laserdisc, M-JPEG, MPEG-1, MPEG-2, MPEG-4, Ogg-Theora, VC-1, VHS, and the like.

Image and/or video files can be stored on media such as magnetic media (e.g. tapes, disks), optical media (e.g. CD-ROM, CD-R, CD-RW, DVD, HD DVD, BLU-RAY DISK®, Laserdisc), punch cards, and the like. Image and/or video files can also be transmitted to a remote storage device by a variety of standards such as parallel or serial ports, Universal Serial Bus (USB), USB 2.0, Firewire, Ethernet, Gigabit Ethernet, and the like.

In step S1416, the images or video can be displayed on a display device such as a cathode ray tube (CRT), a plasma display, a liquid crystal display (LCD), an organic light-emitting diode display (OLED), a light-emitting diode (LED) display, an electroluminescent display (ELD), a surface-conduction electron-emitter display (SED), a field emission display (FED), a nano-emissive display (NED), an electrophoretic display, a bichromal ball display, an interferometric modulator display, a bistable nematic liquid crystal display, and the like.

In step S1418, images can also be printed with devices such laser printers, ink jet printers, dot matrix printers and the like.

As one will appreciate, the steps of the methods described herein can be configured to place various steps in various orders and may include additional steps or omit steps listed in FIG. 14. Specifically, one of skill in the art will realize that image handling steps S1412, S1414, S1416, and S1418 can be practiced various orders and/or combinations.

Figure 15:
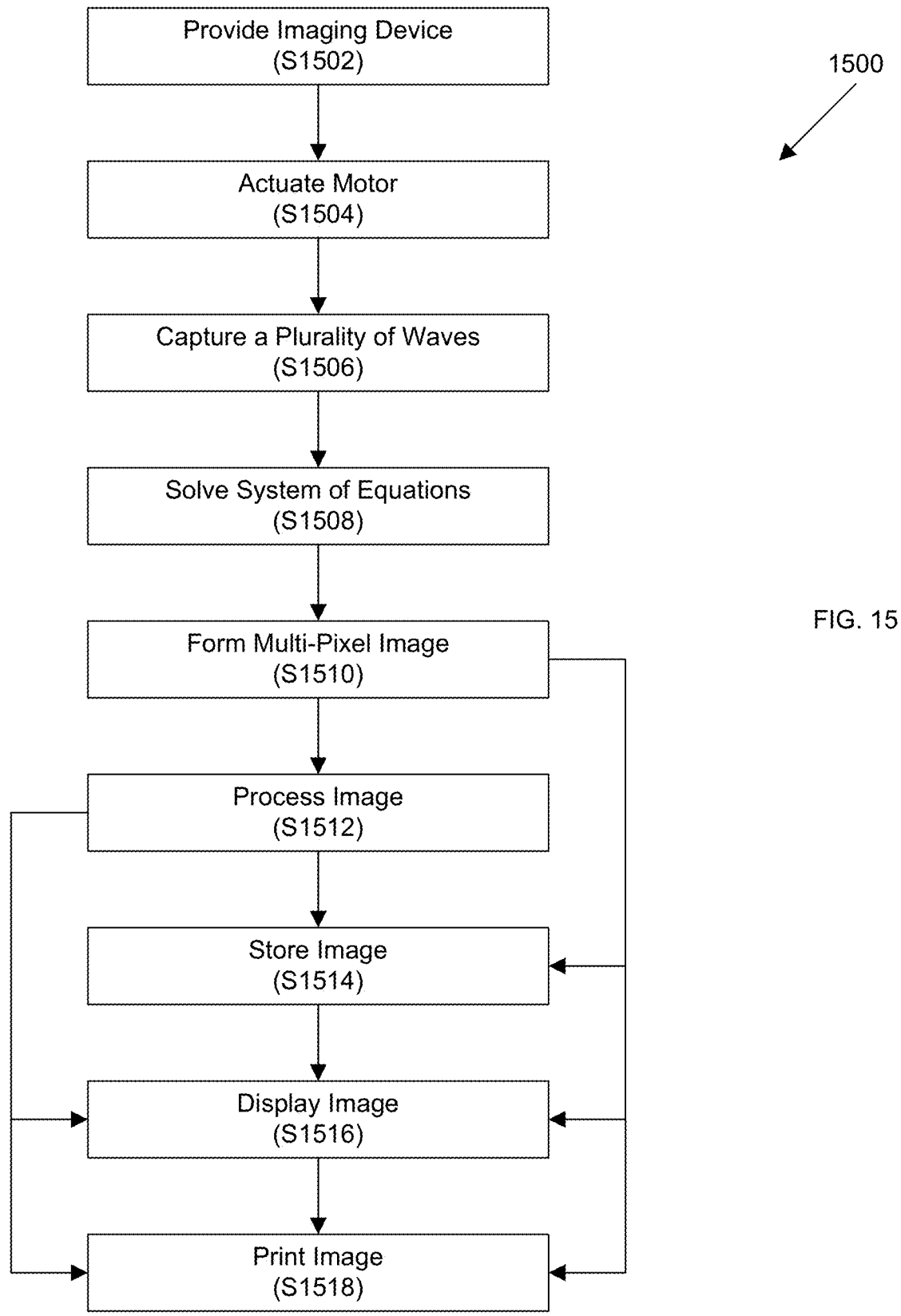

FIG. 15 depicts another imaging method 1500. In step S902, an imaging device is provided (e.g., an imaging device as described herein). As the disk 1202 is rotated (S1504), receiver 1214 takes a number of measurements equal to the number of arbitrary pixels in viewing window 1216 (S906). For example, in the nine-pixel embodiment, receiver 1214 can take a measurement at 40° increments of rotation of disk 1202.

Measurements need not occur at regular intervals and need not encompass a complete revolution of disk 1202. For example, in a nine-pixel embodiment, receiver 1214 can take measurements at 10° increments of rotation of disk 804 to obtain four 3×3 images. In such an embodiment, measurements at 0°, 10°, 20°, 30°, 40°, 50°, 60°, 70°, and 80° are used to produce a first image; measurements at 90°, 100°, 110°, 120°, 130°, 140°, 150°, 160°, and 170° are used to produce a second image; measurements at 180°, 190°, 200°, 210°, 220°, 230°, 240°, 250°, and 260° are used to produce a third image; and measurements at 270°, 280°, 290°, 300°, 310°, 320°, 330°, 340°, and 350° are used to produce a fourth image.

The measurements used to generate consecutive images can overlap. For example, if one seeks to obtain a plurality of 18×18 pixel images, 324 measurements are required for each image. If measurements are obtained at 1° increments, the first image can be obtained from measurements from 0° to 323°, the second image can be obtained from measurements from 324° of the first revolution to 286° of the second revolution, and so on.

Although it is possible to obtain series of images that are each captured at a unique set of rotational positions, it may be preferable in some embodiments to capture each image at the same set of rotational positions (e.g., 1° increments from 0° to 323° on each revolution) in order to minimize processing and storage requirements by only storing a single, pre-calculated measurement matrix and its inverse as discussed in U.S. Patent Application Publication No. 2010-0253783 and International Publication No. WO 2010/099328.

Figure 16:
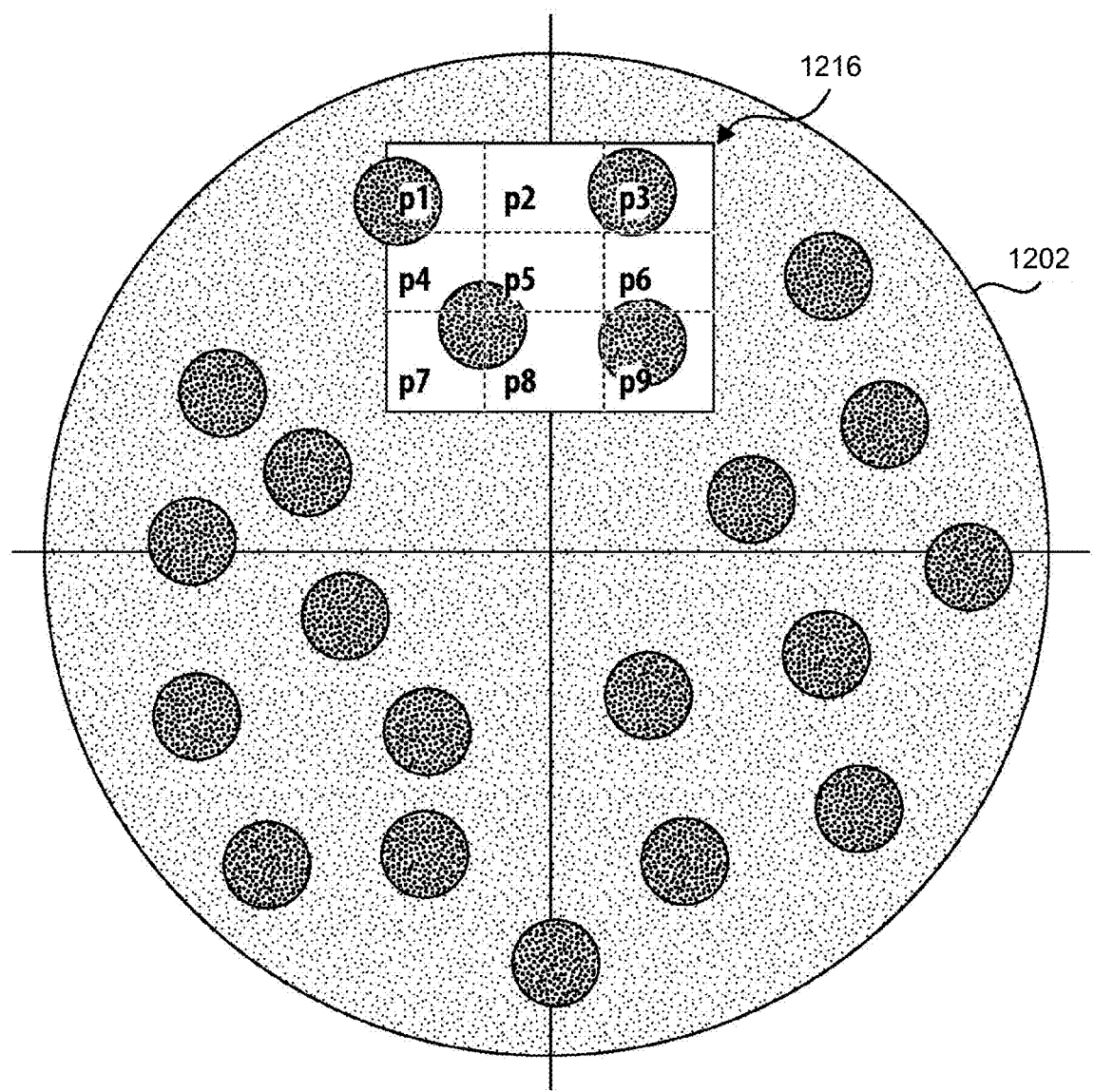
FIG. 16 depicts an exaggerated spatially-selective disk (wherein the dark circles represent holes) and a nine-pixel viewing window according to an embodiment of the invention.

In order to produce a multi-pixel image, the fraction of the each pixel area that is intersected by holes is calculated for each rotational position at which a measurement is measured. For example, at the rotational position depicted in FIG. 16, 40% of pixel $p_1$, 15% of pixel $p_2$, 55% of pixel $p_3$, 22% of pixel $p_4$, 20% of pixel $p_5$, 8% of pixel $p_6$, 43% of pixel $p_7$, 36% of pixel $p_8$, and 70% of pixel $p_9$ are backed by one or more holes 102. At this first position, a measurement $m_1$ is taken. This measurement $m_1$ will reflect the signal reflected onto receiver 1214 by the portion of viewing window 1216 that is backed by modulations as reflected in equation (19) below.

$$m_1 = 0.4p_1 + 0.15p_2 + 0.55p_3 + 0.22p_4 + 0.2p_5 + 0.08p_6 + 0.43p_7 + 0.36p_8 + 0.7p_9 \tag{19}$$

This equation can be solved as part of a system of linear equations along with the equations obtained at other rotational positions (S1508). These equations can be expressed in matrix form as shown in equation (20) below wherein dots (.)

represent the coefficients in front of pixels $p_1$-$p_9$ for the other positions of the disk 1202 and $m_1$-$m_9$ represent the corresponding measured signal for each position. As will be appreciated by one of skill in the art, the rows of the matrix are preferably independent of each other, so that the system of linear equations can be solved.

The 9×9 matrix in equation (20) is the measurement matrix mentioned previously. For an image with n pixels, the measurement matrix will have dimensions of n×n.

$$\begin{bmatrix} 0.4 & 0.15 & 0.55 & 0.22 & 0.2 & 0.08 & 0.43 & 0.36 & 0.7 \\ \vdots & \vdots & \vdots & \vdots & \vdots & \vdots & \vdots & \vdots & \vdots \\ \vdots & \vdots & \vdots & \vdots & \vdots & \vdots & \vdots & \vdots & \vdots \\ \vdots & \vdots & \vdots & \vdots & \vdots & \vdots & \vdots & \vdots & \vdots \\ \vdots & \vdots & \vdots & \vdots & \vdots & \vdots & \vdots & \vdots & \vdots \\ \vdots & \vdots & \vdots & \vdots & \vdots & \vdots & \vdots & \vdots & \vdots \\ \vdots & \vdots & \vdots & \vdots & \vdots & \vdots & \vdots & \vdots & \vdots \\ \vdots & \vdots & \vdots & \vdots & \vdots & \vdots & \vdots & \vdots & \vdots \\ \vdots & \vdots & \vdots & \vdots & \vdots & \vdots & \vdots & \vdots & \vdots \end{bmatrix} \times \begin{bmatrix} p_1 \\ p_2 \\ p_3 \\ p_4 \\ p_5 \\ p_6 \\ p_7 \\ p_8 \\ p_9 \end{bmatrix} = \begin{bmatrix} m_1 \\ m_2 \\ m_3 \\ m_4 \\ m_5 \\ m_6 \\ m_7 \\ m_8 \\ m_9 \end{bmatrix} \quad (20)$$

The matrix equation can be solved for values $p_1$-$p_9$ as shown in equation (21) below:

$$\begin{bmatrix} p_1 \\ p_2 \\ p_3 \\ p_4 \\ p_5 \\ p_6 \\ p_7 \\ p_8 \\ p_9 \end{bmatrix} = \begin{bmatrix} 0.4 & 0.15 & 0.55 & 0.22 & 0.2 & 0.08 & 0.43 & 0.36 & 0.7 \\ \vdots & \vdots & \vdots & \vdots & \vdots & \vdots & \vdots & \vdots & \vdots \\ \vdots & \vdots & \vdots & \vdots & \vdots & \vdots & \vdots & \vdots & \vdots \\ \vdots & \vdots & \vdots & \vdots & \vdots & \vdots & \vdots & \vdots & \vdots \\ \vdots & \vdots & \vdots & \vdots & \vdots & \vdots & \vdots & \vdots & \vdots \\ \vdots & \vdots & \vdots & \vdots & \vdots & \vdots & \vdots & \vdots & \vdots \\ \vdots & \vdots & \vdots & \vdots & \vdots & \vdots & \vdots & \vdots & \vdots \\ \vdots & \vdots & \vdots & \vdots & \vdots & \vdots & \vdots & \vdots & \vdots \\ \vdots & \vdots & \vdots & \vdots & \vdots & \vdots & \vdots & \vdots & \vdots \end{bmatrix}^{-1} \times \begin{bmatrix} m_1 \\ m_2 \\ m_3 \\ m_4 \\ m_5 \\ m_6 \\ m_7 \\ m_8 \\ m_9 \end{bmatrix} \quad (21)$$

The values $p_1$-$p_9$ can be used to generate a multi-pixel image (S1510). For example, values $p_1$-$p_9$ can be mapped to grayscale values to produce a grayscale image. Alternatively, values $p_1$-$p_9$ can be mapped to black or white to produce a black-and-white image.

The image can then be processed (S1512), stored (S1514), displayed (S1516), and/or printed (S1518) as discussed herein.

As will be appreciated by one of skill in the art, the systems and methods described herein can be scaled to produce images larger than the examples described herein. For example, to produce a 100×100 pixel image, 10,000 measurements are obtained (corresponding to 10,000 distinct modulation patterns). These measurements can be obtained by taking a measurement every 0.036° (360°/10000).

Spectrometry Devices

Figure 17:
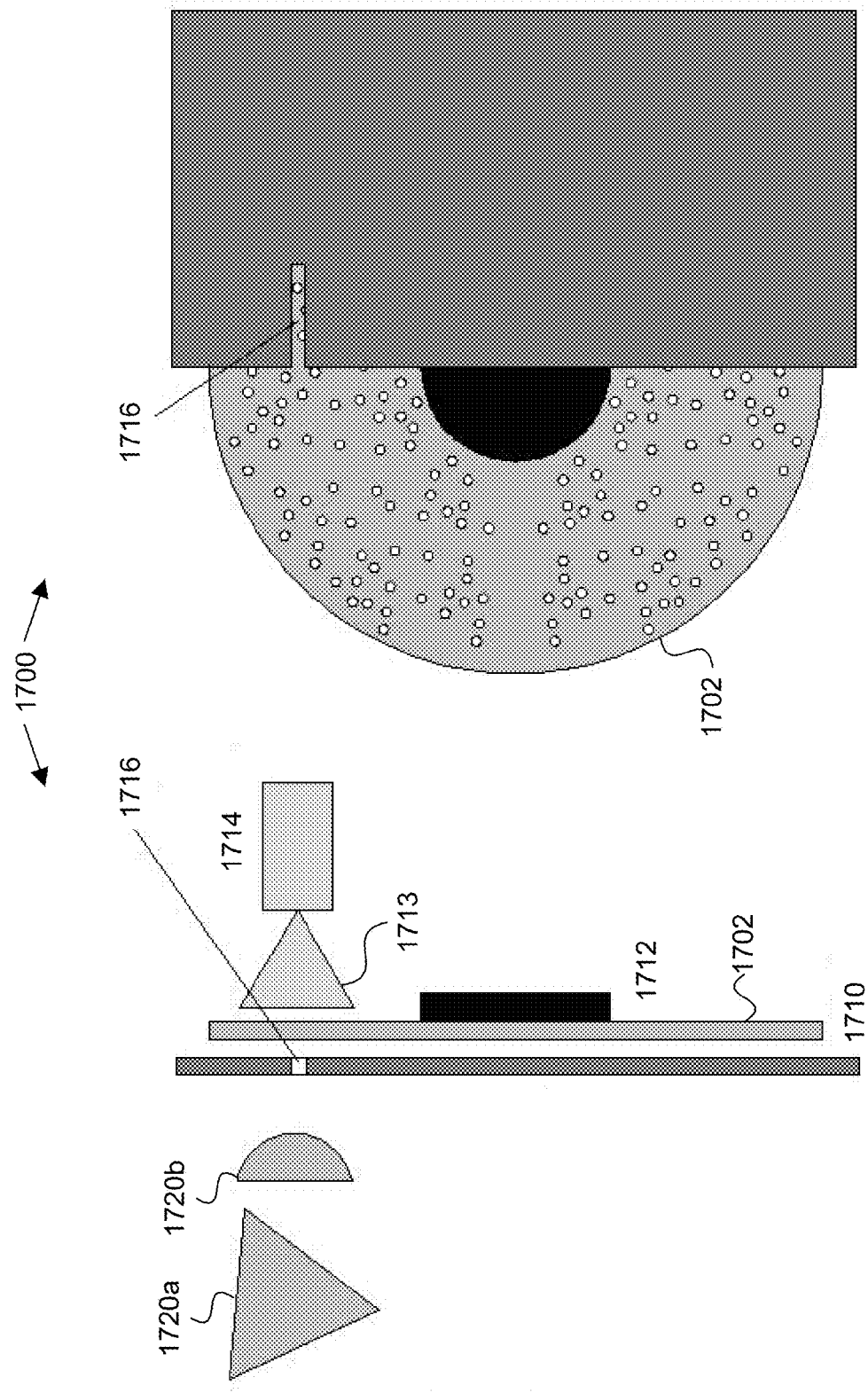
FIG. 17 depicts a spectrometry device according to an embodiment of the invention.

Referring now to FIG. 17A, a spectrometry device 1700 is provided. Spectrometry device 1700 includes a spatially-selective disk 1702 having a plurality of holes 102 and spun by a motor 1712. Spectrometry device 1700 can also include a mask 1710 defining a viewing window 1716, a receiver 1714, and/or one more beam-shaping optics 1720 arranged to map one or more spectral components of radiation onto a plurality of locations on the disk 1702. Optionally, optics 1713 such as a horn and/or a lens can be positioned between disk 1702 and receiver 1714 to focus radiation passing from disk 2002 on receiver 2014.

Spectrometry device 1700 can be constructed and operated in accordance with the principles described herein. Receiver 1714 and beam-shaping optics 1720 can be selected for a particular spectrum of interest (e.g., optical light). For example, suitable beam-shaping optics 1720 for optical light can include prisms 1720a and cylinders 1720b.

Figure 18:
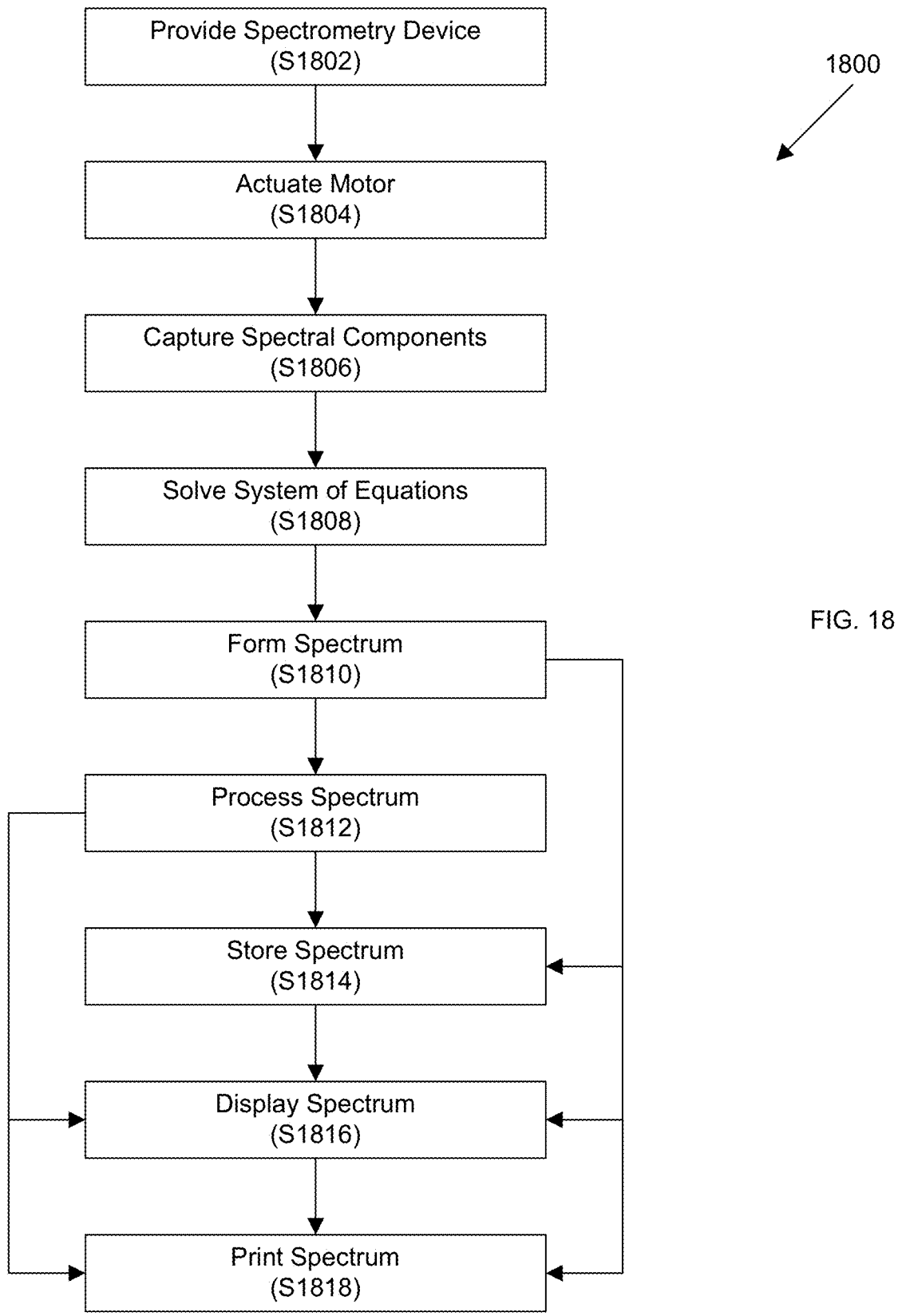
FIG. 18 depicts a spectrometry method according to an embodiment of the invention.
Figure 19:
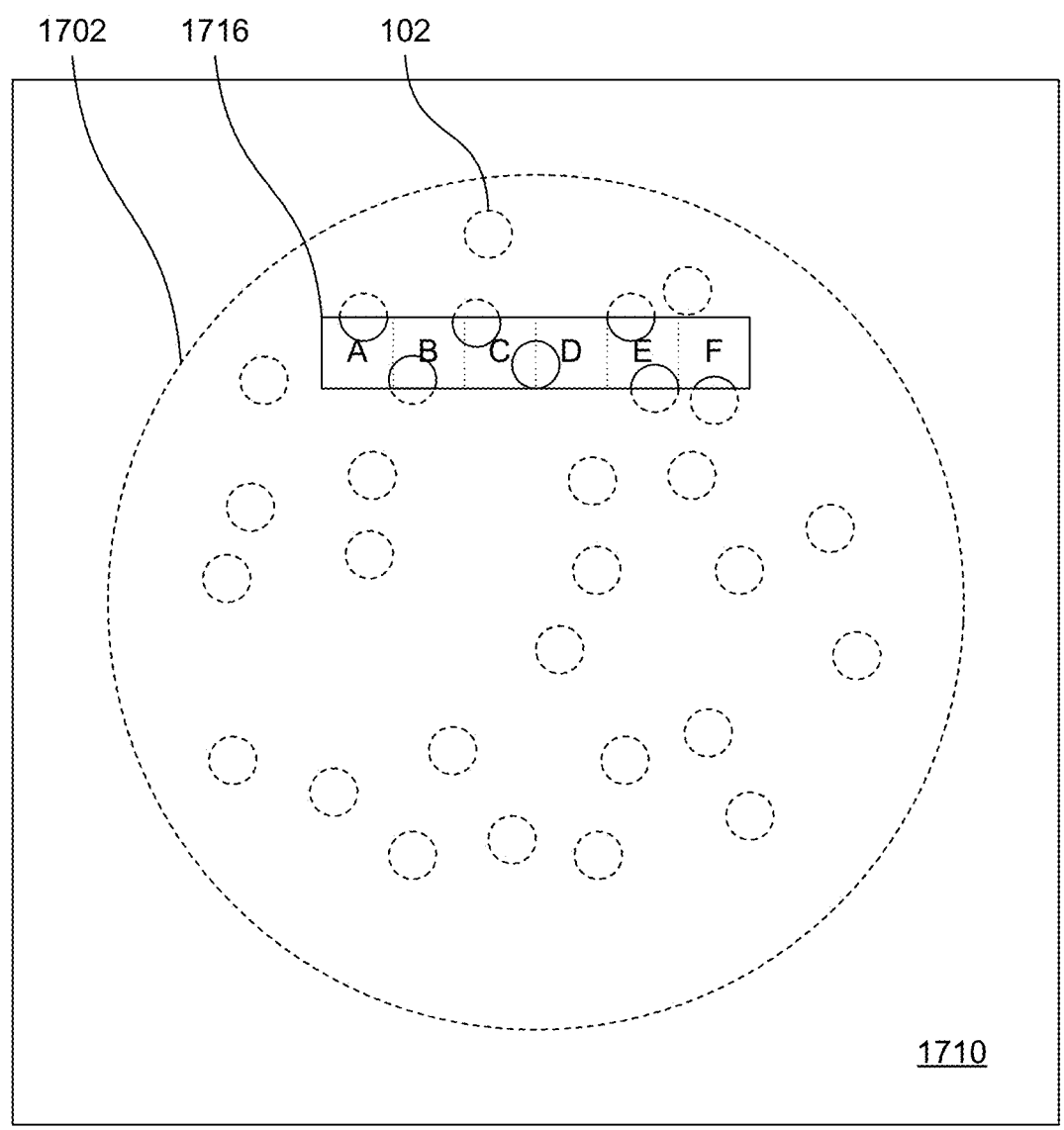
FIG. 19 depicts an exaggerated spectrometry device and a six-pixel viewing window according to an embodiment of the invention.

Spectrometry device 1700 can be operated in accordance with spectrometry method 1800 as depicted in FIG. 18 and further illustrated in the context of FIG. 19.

In step S1702, a spectrometry device is provided (e.g., the spectrometry devices 1700 described herein).

In step S1704, the disk is rotated (e.g., by actuating a motor 1712). As the disk is rotated, beam-shaping optics project one or more spectral components of radiation onto a plurality of locations on the disk within a viewing window. For example, as depicted in FIG. 19, optical light can be projected onto pixels A-F corresponding to the monochromatic colors red, orange, yellow, green, blue, and violet, respectively.

In step S1706, a plurality of spectral components passing through the plurality of holes are captured. As discussed below, the receiver does not need to be able to discern between the spectral components (e.g., distinguish whether the radiation is red light vs. orange light); the receiver merely needs to be measure the relative intensity of the radiation received at a given point in time.

In step S1708, a system of equations is solved as discussed above in the context of FIG. 15 to compute a spectrum in step S1710. The spectrum can then be processed (S1712), stored (S1714), displayed (S1716), and/or printed (S1718) as discussed herein.

As will be readily appreciated by one of ordinary skill in the art, the example depicted in FIG. 18 is highly simplified for ease of illustration. Higher spectral resolution can be readily achieved by sampling at higher rates in order to support an increased number of pixels as discussed herein. The number of pixels in the image can be increased since the pixels are non-physical; however a 64×64 pixel image is sufficient for most stand-off applications of interest. Assuming an F/1 optical system with one meter aperture and a Rayleigh wavelength product 1.22λ=0.5 mm, the angular resolution of the imager is 0.5 milliradian. In an object space 100 meters away, this translates to a 5 cm resolution spot.

Assuming one pixel sampling for resolution spot (two per airy disk), a 64×64 pixel imager would image an object space area of 3.2×3.2 meters square. This object space area is sufficient to scan a highway lane, a few human targets, the trunk of a tree, or a helicopter landing site.

Imaging Spectrometer

Referring now to FIGS. 20A-20C, an imaging spectrometer 2000 is provided. When the imaging spectrometer 2000 operates in "imaging mode" as discussed below, the imaging spectrometer 2000 forms an image of the object of interest. When the imaging spectrometer 2000 operates in "spectrometer mode" as discussed below, the imaging spectrometer 2000 constructs a spectrum of the object of interest.

The imaging spectrometer 2000 includes a disk 2002 having a plurality of holes 102 positioned in a first region of the disk 2002 and a larger aperture 2022 positioned on a second region of the disk 2002. Imaging spectrometer also includes a motor 2012 configured to spin disk 2002, a mask 2010 defining an imaging window 2016 and a spectrometer window 2024, and beam-shaping optics 2020 configured to guide radiation from imaging window 2016 to spectrometer window 2024. Beam shaping optics 2020 can include, for example, prisms 2020a, cylinders 2020b, and mirrors 2020c, 2020d.

FIGS. 20A and 20B depict the operation of imaging spectrometer 2000 in spectrometry mode. Radiation from an object of interest (not depicted) passes through the large aperture 2022 of disk 2002 and imaging window 2016, is directed by beam-shaping optics 2020, passes through one or more holes 102 and spectrometer window 2024, and is measured by receiver 2014. Optionally, optics 2013 such as a horn and/or a lens can be positioned between disk 2002 and receiver 2014 to focus radiation passing from disk 2002 on receiver 2014.

FIG. 20C depicts the operation of the imaging spectrometer 2000 in imaging mode. Radiation from an object of interest (not depicted) passes through one or more holes of disk 2002 and imaging window 2016, is directed by beam-shaping optics 2020, passes through large aperture 2022 of disk 2002 and spectrometer window 2024, and is measured by receiver 2014.

In both spectrometry and imaging modes, the images are reconstructed according to the methods described herein (i.e., obtaining a plurality of measurements at a plurality of rotational positions and solving a system of equations.

Figure 21A:
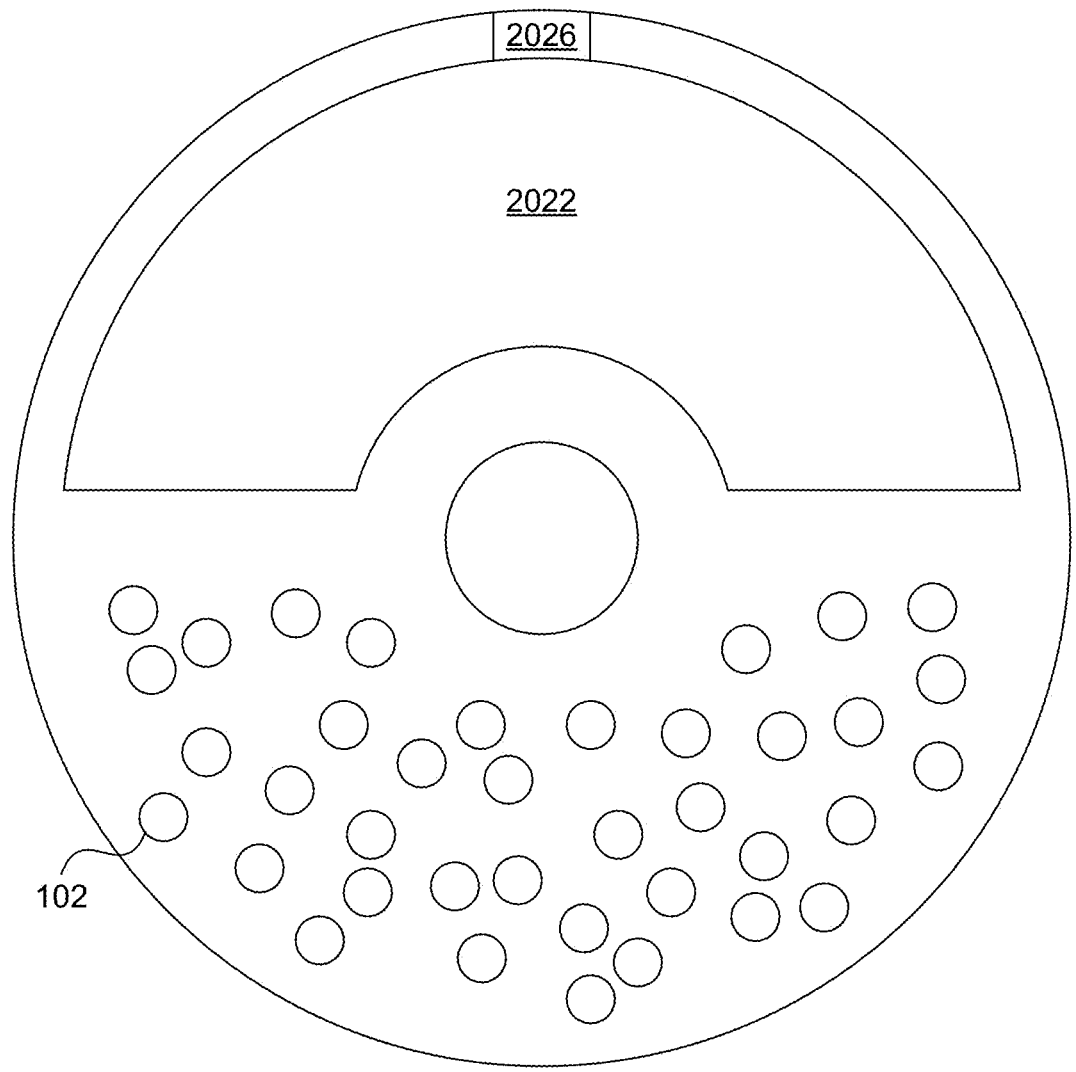
FIGS. 21A and 21B depict disks for use in an imaging spectrometer according to embodiments of the invention.

FIG. 21A provides another depiction of the disk 2002 in imaging spectrometer 2000. As depicted, aperture 2022 can be substantially semi-circular and can be bounded by the outer perimeter of disk 2002. Optionally, disk 2002 can include one or more weights 2026 positioned adjacent to aperture 2022 to balance disk 2002 and promote uniform rotation.

Figure 21B:
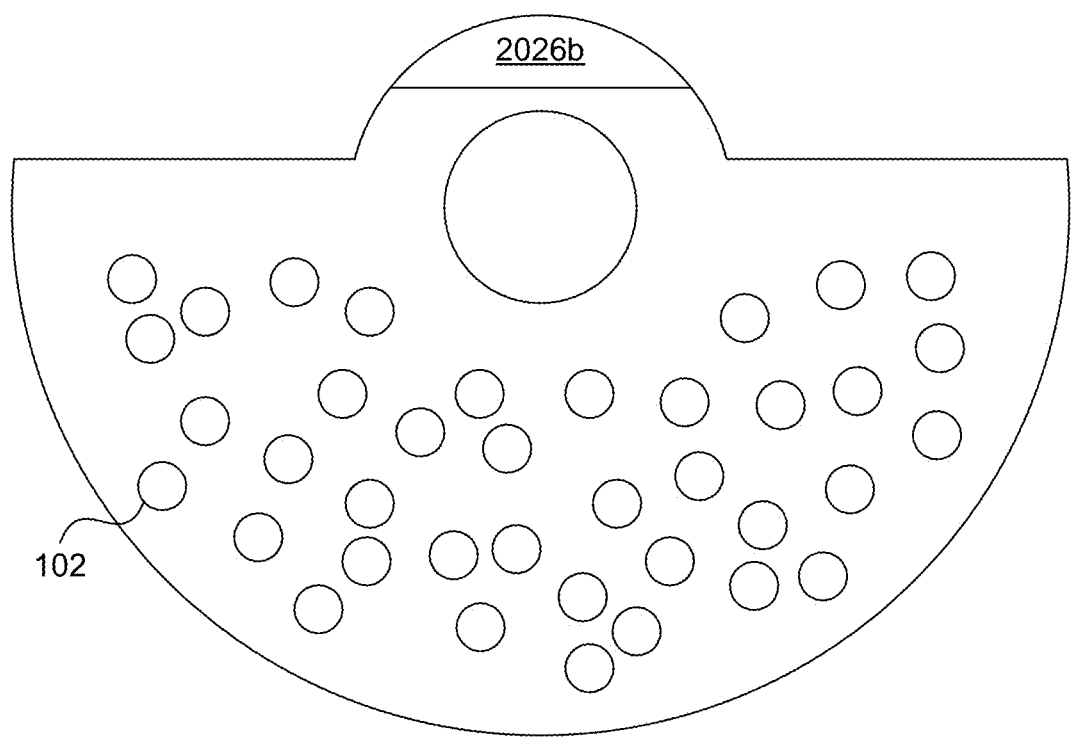

FIG. 21B depicts another embodiments of a disk 2002b. Instead of an aperture 2022 defined within the perimeter of disk 2002b, disk 2002 is generally semicircular, while still allows for attachment at is center for rotation. Again, one or more weights 2026b can be used to counterbalance the disk 2002. These weights 2026b can have a larger mass than weights 2026 as they are mounted closer to the axis of rotation.

Working Example #3

Further Implementations and Results of Imaging System

Referring now to FIGS. 22A-C, another embodiment of a spatially-selective device 2200 was implemented using parts of a 5.25 inch hard drive. One of the platters of the hard drive was used as the spinning disk 2202. The radius of the holes 102 and their minimal separation were designed for operation at 640 GHz. A hole radius of 1 mm and a minimal separation of 2 mm were chosen to guarantee unity transmission, linearity, and the structural integrity of the disk, and to utilize readily-available tools. With these parameters as restrictions, a random pattern of 431 holes 102 was generated and the holes were drilled in disk 2202 using a CNC mill.

The case 2220 of the hard drive was cut and modified for access to the disk 2202 and for easy mounting on the optical stages. The electronics of the motor driver were also modified so that the disk 2202 could be rotated at 3,000 rotations per minute. An emitter diode and phototransistor pair 2222 were placed in the proximity of the disk 2202 to register the measurement samples with the corresponding hole patterns in the imaging window 2216. The imaging window aperture was machined on two slabs of aluminum 2210a, 2210b that were mounted to sandwich the disk 2202.

Although the device 2200 was designed for operation at terahertz frequencies, it was paired with a visible light detector 2222 to form a visible light imager. This establishes the proof of concept and the frequency independence of the device. A picture of the setup for visible light is shown in FIG. 22. A red laser source 2224 (400 nm-700 nm) was collimated by collimating lens 2226 and was masked by object masks 2206 to form images over the imaging window 2216. An additional lens 2228 was placed behind the disk 2202 and the imaging window 2216 to focus the energy into an N-Type Silicon PIN Photodetector 2222. The optical path from the collecting lens 2228 to the photodetector 2222 was enclosed by a dark tube 2230 to eliminate stray light reaching the detector 2222. The detector signal was sampled using a 16-bit data acquisition card from Measurement Computing of Norton, Mass.

Three object masks 2206 were imaged and the reconstructed images for two pixel resolutions are shown in FIGS. 23 and 24. For each revolution of the disk 2202, 5,000 samples were recorded and filtered in MATLAB® software using a low pass filter. For the 32×32 image, 1,024 staggered measurements were chosen and used to solve Equation (1) for the unknown pixel values. For the 64×64 image, 4,096 consecutive measurements were used. Equation (1) was solved by regularized matrix inversion which effectively acts as a low pass filter.

When displaying the images, the negative values are truncated (dark spots in the images). The negative values in the reconstruction and the low spatial frequency noise are attributed to signal noise, filtering (and regularization), and error in the manufacturing of the disk that is manifested in an incorrect measurement matrix. Minimizing noise and manufacturing errors relaxes filtering and regularization and improves reconstruction.

As the pixel resolution increases, image reconstruction improves. This is expected because the finer sampling of the image decreases the pixel-image ambiguity. It should be noted that the images are acquired, reconstructed and displayed at video rates. The images can also be reconstructed using compressive sensing methods and a portion of the measurements. This is currently being investigated.

Working Example #4

Further Implementations and Results of Imaging System

Referring now to FIG. 25, another embodiment of an imaging system 2500 incorporating a spatially-selective device 2200 as described in the context of Working Example #3 was implemented using parts of a 5.25 inch hard drive. One of the platters of the hard drive was used as the spinning disk. The radius of the holes and their minimal separation were designed for operation at 640 GHz. A hole radius of 1 mm and a minimal separation of 2 mm were chosen to guarantee unity transmission, linearity, and the structural integrity of the disk, and to utilize readily-available tools. With these parameters as restrictions, a random pattern of 431 holes was generated and the holes were drilled in the disk using a CNC mill.

The case of the hard drive was cut and modified for access to the disk and for easy mounting on the optical stages. The electronics of the motor driver were also modified so that the disk could be rotated at 3,000 rotations per minute. An emitter diode and phototransistor pair were placed in the proximity of the disk to register the measurement samples with the corresponding hole patterns in the imaging window. The imaging window aperture was machined on two slabs of aluminum that were mounted to sandwich the disk.

The spatially-selective device was inserted in the imaging plane of submillimeter wave receiver 2514 and the submillimeter wave receiver 2514 was placed behind the spatially-selective device 2200. The imager setup is depicted in FIG. 25. A 640 GHz submillimeter wave source 2504 from Virginia Diodes, Inc. of Charlottesville, Va. flood illuminates the object of interest 2506. The object of interest 2506 reflects the radiation toward a first folding mirror 2508a. The first folding mirror 2508a and the second folding mirror 2508b direct the radiation to an elliptical mirror 2508c. The elliptical mirror 2508c focuses the radiation onto the spatially-selective device 2200 to form an image of the target on the spatially-selective device 2200. The spatially-selective device 2200 scans the image and the radiation that goes through the spatially-selective device 2200 is measured by the 640 GHz submillimeter wave receiver 2514. The receiver 2514 has an IF (Intermediate Frequency) output at 4.8 GHz. The 4.8 GHz output is down converted to another IF of 2.2 GHz and is fed into a spectrum analyzer (model E4403B 9 KHz-3 GHz) from Agilent Technologies, Inc. of Santa Clara, Calif. The spectrum analyzer applies a band pass filter and amplifies the signal. The video output of the spectrum analyzer is then sampled and digitized by a 16-bit data acquisition card from Measurement Computing of Norton, Mass. (model: USB-2537). The spectrum analyzer and the data acquisition card are triggered for each revolution of the disk.

The sampling rate of the data acquisition card was 250 KHz. The disk was rotated at a constant speed of 3,000 rotations per minute (50 rotations per second). Accordingly, 5,000 measurements were recorded for each rotation (or triggering event). The data acquisition card was interfaced to a computer and the MATLAB® data acquisition toolbox was used to retrieve the sampled data. The data was then low-pass filtered in MATLAB® software and 4,096 consecutive samples were chosen and used to solve Equation (1) for the unknown pixel values. Equation (1) was solved using a regularized least squares solution of Equation $$\underline{p} = \left( \underline{M}^T \underline{M} + \alpha \underline{I} + \sum_i \beta_i \underline{H}_i^T \underline{H}_i \right)^{-1} \underline{M}^T \underline{m} \quad (22)$$

In Equation (22), $\alpha$ and $\beta_i$ are regularization parameters. The matrices $H_i$ are linear operations on the solution p. The regularized least squares solution minimizes the norm of the solution p and the norm of the matrix vector products $H_i$p. Optimal values for the regularization parameters exist and methods for finding them are described in detail in inverse imaging and linear algebra literature such as M. Bertero & P. Boccacci, "Introduction to Inverse Problems in Imaging (1998). The linear operators $H_i$ depend on the available prior information on the solution p. For instance, if the solution (pixel values) is expected to be smooth (which is the case for sub-millimeter wave images), the operators $H_i$ can be the Sobel or Prewitt (first order derivatives) and the Laplacian (second order derivative) matrices as described in image processing texts such as Rafael C. Gonzalez & Richard E. Woods, "Digital Image Processing" (2007).

Figure 27C:
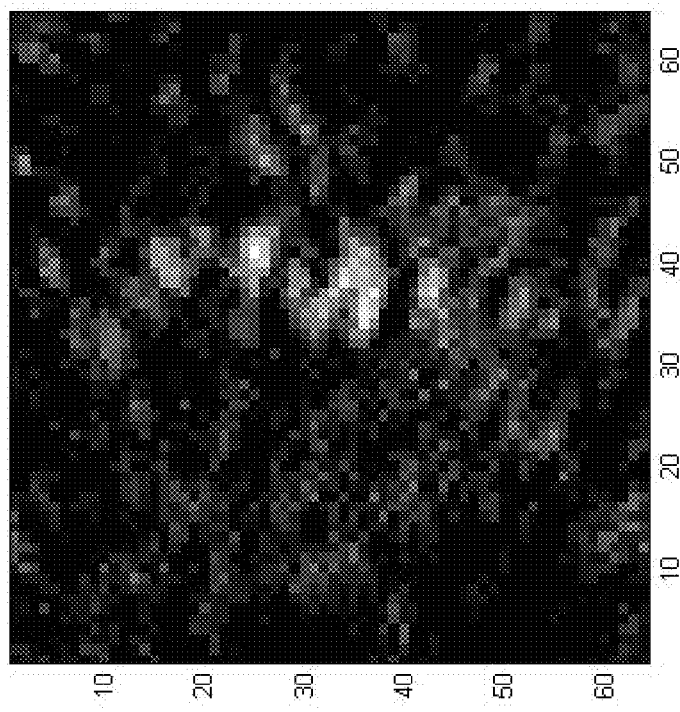
Figure 27B:
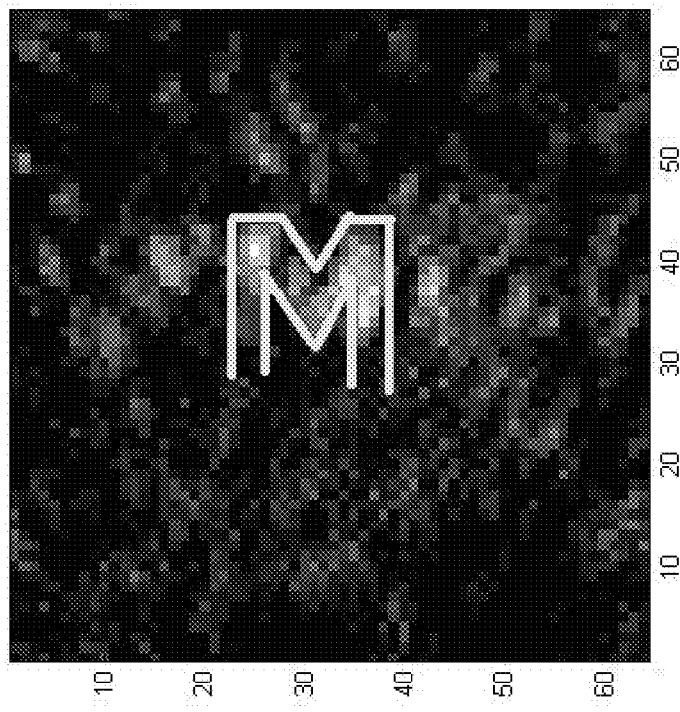

Images of two targets were formed on the spatially-selective mask, measurements were taken and the images were reconstructed at video rates. FIGS. 26A and 27A depict the targets, which consist of a plate of aluminum covered by a gun mask and a mask of the letter 'M', respectively. The masks were cut out of carpet, which scatters the radiation so that very little of the radiation incident on the carpet reaches the receiver 2514. The reconstructed images of the target depicted in FIG. 26A are shown in FIGS. 26B and 26C and the reconstructed images of the target depicted in FIG. 27A are shown in FIGS. 27B and 27C. The regularized least squares solution was used. The minimized quantities are the norm, the norm of the first derivative, and the norm of the second derivative, the regularization parameters are 0.0001, 0.001, and 0.001, respectively.

There are several reasons for the low image quality. The optical/elliptical mirror 2508c used is not optimal for this imaging configuration. This contributes to the non-uniformity of the image, i.e. the intensity of one part of the image is less than the intensity of another part of the image. This can be observed in the image of the letter 'M' in FIGS. 27B and 27C, in which the legs of the letter 'M' do not appear in the image.

Another factor that contributes to the non-uniformity of the image is the nature of active imaging; parts of the object perpendicular to the optical axis reflect more than the parts that are not. The non-uniformity due to the optical system can be remediated by weighting the measured values prior to the image reconstruction. The weighting function will depend on the characteristic of the optics. For example, the values from the center of the image will be attenuated and the values from the edges of the images will be amplified.

Another reason for the observed non-uniformity is the absence of an energy collection mechanism. In the implementation shown in FIG. 25, the receiver 2514 is placed quite far behind the mask 2200. This was done so that the receiver 2514 could "see" the entire mask aperture. Preferably, a matched horn, a lens, or an integrating sphere would couple the receiver 2514 with the mask 2200. This increases the amount of signal received and also allows the collection of all the energy, an assumption inherent in the image reconstruction equations.

In addition to the reasons above, the regularization parameters in the reconstruction were not optimal. The image reconstruction quality can be improved by using optimal parameters.

Multi-Mode Imaging Devices

As discussed above in the context of Working Example #3 and Working Example #4, the same spatially-selective deice is utilized to image objects of interest with radiation of different wavelengths. This demonstrates the frequency independence of the device. A multi-mode imager can capitalize on this property. For example, several submillimeter wave images (at different submillimeter wave frequencies), far-infrared images, long wave infrared images, short wave infrared images, visible light infrared images, and ultraviolet images can be captured simultaneously or substantially-simultaneously by the imager. As discussed herein, the spatially-selective disk should be configured to accommodate the largest wavelength of interest.

Referring now to FIG. 28, another embodiment of the invention provided a multi-mode imaging device 2800 for imaging an object of interest 2806. Multi-mode imaging device 2800 includes many of the same or similar elements (e.g., spatially-selective disk 2802, motor 2812, horn 2813, receiver 2814, imaging window 2816, and reflective optics 2820) as other devices described herein.

In some embodiments, the spatially-selective disk 2802 is actively cooled (e.g., by cryogenic cooling, thermoelectric cooling, adiabatic cooling, and the like) to permit imaging at certain wavelengths (e.g., infrared wavelengths).

Referring now to FIG. 29, an exemplary arrangement of horn 2813 and multiple receivers 2814 is provided, which can be incorporated in the multi-mode imaging device 2800 of FIG. 28. A reflective cone 2813 focuses radiation on a matched waveguide 2902. A plurality of receivers 2814 are positioned along the wave guide. Radiation of desired wavelengths is permitted to exit the waveguide 2902 and enter individual receivers 2814 through the use of band-pass coatings 2904 at the interface between waveguide 2814 and individual receivers 2814.

Referring now to FIG. 30, another horn 2813 can optionally be replaced by an integrating sphere 3002 configured to diffuse radiation received from imaging window 2816 via holes 102 in spatially-selective disk 2802 for detection by multiple detectors 2814.

Exemplary Imaging Window and Pixel Shapes

Referring now to FIG. 31, the imaging window can have any shape. In addition to the rectangular-shaped imaging windows depicted in FIGS. 12A, 17, 19-20C, 22A, and 28, the imaging window can, for example, have a circular, semicircular, wide rectangular (i.e., width>height), tall rectangular (height>width), square (width=height) shape. Additionally, the imaging window can be a horizontal or vertical slit (a slit being a substantially rectangular opening having a dimension substantially equal to a single pixel in one direction). In some embodiments, a vertical slit can be positioned radially with respect to the rotational axis of the disk such that the long axis of the vertical slit is colinear with a radial line from the center of the disk to the perimeter of the disk. Examples of various imaging window geometries are depicted in FIGS. 31A-F. FIG. 31A depicts a square imaging window. FIG. 31B depicts a vertical slit imaging window. FIG. 31C depicts a horizontal slit imaging window. FIG. 31D depicts a tall rectangular imaging window. FIG. 31E depicts a wide rectangular imaging window. FIG. 31F depicts a circular imaging window.

Figure 32A:
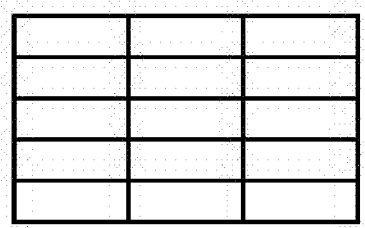
Figure 32B:
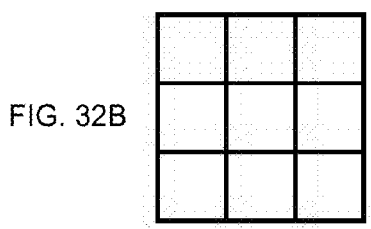
Figure 32C:
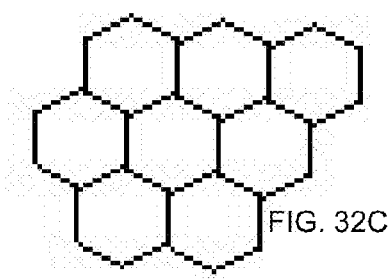
Figure 32D:
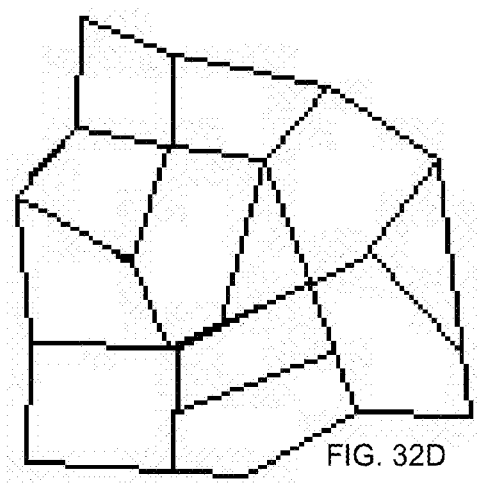
Figure 32E:
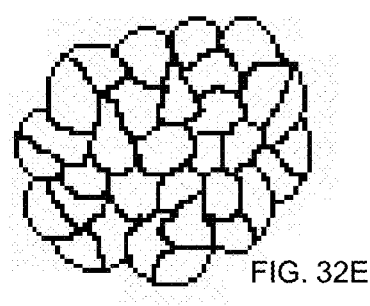

In a similar manner, pixels can have a variety of shapes such as polygonal (regular or irregular), circular, semicircular, random, pseudorandom, and the like. Examples of suitable polygons include triangles, rectangles, squares, rhombuses, parallelograms, pentagons, n-gons, and the like. Examples of various pixel geometries are depicted in FIGS. 32A-E. FIG. 32A depicts rectangular pixels. FIG. 32B depicts square pixels. FIG. 32C depicts hexagonal pixels. FIG. 32D depicts randomly-shaped pixels having generally-linear boundaries. FIG. 32E depicts randomly-shaped pixels having curvilinear boundaries.

Working Example #5

Further Results of Imaging System

Referring now to FIGS. 33A and 33B, a spatially-selective device similar to device 2200 described in Working Example #3 was further evaluated.

In this configuration, the spatially-selective device was paired with the sub-millimeter wave receiver to form images in transmission mode. A schematic and photograph of this setup are shown in FIGS. 33A and 33B, respectively. A heterodyne source and receiver pair from Virginia Diodes was used. The source and receiver operated at 640 GHz. In this configuration, the 640 GHz source was placed one meter in front of the device and was flood illuminating the imaging window. An object mask was placed right before the imaging window and the projected image was scanned by the spinning disk. The 640 GHz receiver was placed behind the disk and measures the energy passing through the holes. The intermediate frequency (IF) of the receiver was down converted from 4.8 GHz to 2.2 GHz and this new IF was supplied to a spectrum analyzer. The spectrum analyzer was used to bandpass filter and amplify the signal. A time sweep of the signal triggered for each rotation was generated and the video output of the spectrum analyzer was sampled at a rate of 250 KHz using a 16-bit data acquisition card from Measurement Computing. The disk rotated at 50 rotations per second and 5,000 samples were recorded per rotation. The sampled signal was low-pass filtered using MATLAB® software and 4,096 consecutive samples were used to reconstruct a 64×64 pixel image. One of the imaged masks and the corresponding reconstructed image are shown in FIGS. 34A and 34B, respectively.

Working Example #6

Use of Image Plane Coding for Submillimeter Imaging

Image plane coding is the process of encoding the information in the image into a series of linear measurements over time, which is processed to reconstruct the image. Each measurement is a linear combination of many pixels in the image. Mathematically, the process is described by $$y = Mx + \eta \quad (23)$$

where x is a vector representing the image, M is a matrix representing the measurement process, $\eta$ is a vector representing the noise in the measurement process, and y is a vector of observed measurements. If N is the number of pixels in the image x and M is the number of measurements in y then M is a M×N matrix. For M<N, the solution to Equation (23) involves iteration and hence is not suited for real time operation. However, images of most objects of interest in the sub-millimeter wave range will be limited in size due to the resolution restrictions of diffraction. Accordingly, the case of M=N is suitable.

Engineering an imaging system from Equation (23) requires the co-design of the measurement matrix M and an algorithm for reconstructing the image $\hat{x}$ from the measurements y. Because of measurement noise, the reconstructed image will only be an approximation of the real image x. Ill-conditioning in the measurement matrix amplifies the noise in most reconstruction algorithms and hence also increases the uncertainty in the estimate of image. These considerations are addressed in inverse methods employing regularization. A generalized form of Tikhonov regularization defined by Equation (23) has thus far proved most successful with the methods of generating measurements and is described further in Bertero & Boccacci.

$$\hat{x} = \left[ M^T M + \sum_i \mu_i H_i^T H_i \right]^{-1} M^T y = Ry \qquad (24)$$

In Equation (24), the parameters $\mu_i$ are Lagrangian multipliers or the regularization parameters and the matrices $H_i$ define linear operations performed on the results. By appropriate choice of these matrices and multipliers the effects of noise can be minimized in the reconstruction. Two linear operators have proved successful thus fare: the linear operator and the Laplacian operator. Note that once the measurement matrix has been designed and the linear operators selected, the matrix R is known so that image reconstruction is simply a matrix multiplication.

Tilting-Optics Imaging Systems

The analysis presented above indicates that low condition number measurement matrices are desired. For the coded aperture described herein, the condition of the measurement matrix is strongly related to the size of the disk and the number of measurements that are recorded for each rotation of the disk. High pixel count images require an equally high number of measurements. As the number of measurements increases, the patterns used to form the linear equations become similar or correlated and the equations become less independent. This results in an ill-conditioned measurement matrix. Three approaches can be used to mitigate this effect while keeping the resulting image pixel count reasonable.

The first approach involves changing the size of the disk. The disk size can be increased while holding the imaging window size constant and positioned towards the perimeter of the disk. This will increase the arc separation between measurements resulting in more variation in pattern between measurements.

A second approach is turning the imager into a line imager and coupling it with tilting optics (e.g., a tilting mirror) to form two-dimensional images. For this purpose, the imaging window can be made into a vertical slit. In this case, fewer measurements are acquired per rotation and non-similar patterns are more abundant, thereby facilitating linear independence between measurements and therefore good reconstruction. The tilting mirror would have a small form factor and would be placed immediately before the coded aperture. This approach also increases the mechanical complexity of the system but keeps the form factor of the system unchanged. In addition, a line imager is useful in and of itself. For example, it can be used in conjunction with an optical camera in a hallway to scan personnel for concealed objects using self motion of the person to form the submillimeter image. The system could then superimpose the submillimeter image on optical images as personnel pass through the hallway.

A third approach is the use of Compressing Sampling (CS) reconstruction methods as described in R. Baraniuk, "Compressive sensing [lecture notes],"_24 IEEE Signal Processing Magazine, 118-21 (2007). In the CS approach, the number of measurement in one rotation of the disk can be less than the number of pixels or $k<n^2$. This allows larger spacing between measurements and hence less correlation between measurement matrix entries.

Although all three solutions are viable, the second solution is particularly desirable due to the minimal modifications required to the device and the simplification of the required computations. The condition number of the line imager can be lowered even further if a different pattern is implemented on the disk. A pattern that implements a Simplex Code Mask (SCM) is possible with the line configuration. The measurement matrix that results from an SCM consists of 1's and 0's. According to M. Harwit and J. Sloane, "Hadamard Transform Optics" (1979), the SCM measurement matrix is the matrix with the lowest condition number when only entries of 0 and 1 can be used. The condition of the two-dimensional imager can also be lowered using a different disk pattern.

EQUIVALENTS

The functions of several elements may, in alternative embodiments, be carried out by fewer elements, or a single element. Similarly, in some embodiments, any functional element may perform fewer, or different, operations than those described with respect to the illustrated embodiment. Also, functional elements (e.g., modules, databases, computers, clients, servers and the like) shown as distinct for purposes of illustration may be incorporated within other functional elements, separated in different hardware, or distributed in a particular implementation.

While certain embodiments according to the invention have been described, the invention is not limited to just the described embodiments. Various changes and/or modifications can be made to any of the described embodiments without departing from the spirit or scope of the invention. Also, various combinations of elements, steps, features, and/or aspects of the described embodiments are possible and contemplated even if such combinations are not expressly identified herein.

INCORPORATION BY REFERENCE

The entire contents of all patents, published patent applications, and other references cited herein are hereby expressly incorporated herein in their entireties by reference.

The invention claimed is:

1. A method of spectrometry, the method comprising:
providing a spectrometry device including:
a disk having one or more holes;
a motor configured to rotate the disk;
one or more beam-shaping optics selected from the group consisting of: prisms and cylinders, the one or more beam-shaping optics arranged to map one or more spectral components of radiation of interest onto a plurality of locations on the disk; and
a receiver positioned to capture the one or more spectral components passing through the one or more holes as the disk is rotated;
actuating the motor to rotate the disk;
capturing a plurality of spectral components passing through the plurality of holes as the disk rotates; and
computing a spectrum by solving a system of equations wherein a magnitude of one of the plurality of spectral components is equal to a sum of a product of the spectral component in each of a plurality of pixels and the fraction of pixel area backed by the plurality of holes.

2. A spectrometry device comprising:
a disk having a plurality of holes and a contiguous aperture substantially opposite the plurality of holes;
a motor configured to rotate the disk;
a mask defining an imaging window and a spectrometry window;
one or more beam-shaping optics arranged to map one or more spectral components of radiation of interest received through the imaging window and the holes and aperture of the disk onto a plurality of locations on the disk; and a receiver positioned to capture the one or more spectral components passing through the plurality of holes and the aperture of the disk and the spectrometry window as the disk is rotated.

3. A method of spectrometry, the method comprising:
providing the spectrometry device of claim 2;
actuating the motor to rotate the disk;
capturing a plurality of spectral components passing through the plurality of holes as the disk rotates; and
computing a spectrum by solving a system of equations wherein a magnitude of one of the plurality of spectral components is equal to a sum of a product of the spectral component in each of a plurality of pixels and the fraction of pixel area backed by the plurality of holes.

4. The spectrometry device of claim 2, wherein the one or more beam-shaping optics are selected from the group consisting of: prisms, cylinders, and minors.

5. The spectrometry device of claim 2, wherein the mask includes a radiation-absorbing material.

6. The spectrometry device of claim 2, wherein the mask includes a radiation-reflecting material.

7. The spectrometry device of claim 2, further comprising: a storage device.

8. The spectrometry device of claim 7, wherein the storage device includes memory.

9. The spectrometry device of claim 7, wherein the storage device includes one or more storage disks.

10. The spectrometry device of claim 2, further comprising:
a processing device configured to reconstruct the one or more spectral components captured by the receiver to determine the spectral content of the radiation.

11. The spectrometry device of claim 10, wherein the processing device is a computer.

12. The spectrometry device of claim 11, wherein the computer is a general-purpose computer that has been specially-programmed with software.

13. The spectrometry device of claim 2, wherein the aperture is internal to the disk.

14. The spectrometry device of claim 2, wherein the aperture is external to the disk.

15. The method of claim 3, further comprising:
displaying the spectrum.

16. The method of claim 15, wherein the spectrum is displayed on a display device selected from the group consisting of: a cathode ray tube (CRT), a plasma display, a liquid crystal display (LCD), an organic light-emitting diode display (OLED), a light-emitting diode (LED) display, an electroluminescent display (ELD), a surface-conduction electron-emitter display (SED), a field emission display (FED), a nano-emissive display (NED), an electrophoretic display, a bichromal ball display, an interferometric modulator display, and a bistable nematic liquid crystal display.

17. The method of claim 3, wherein the computing step is performed on a computer.

18. The method of claim 17, wherein the computer is a general-purpose computer that has been specially-programmed with software instructions for executing the storing and forming steps.

19. The method of claim 3, wherein the aperture is internal to the disk.

20. The method of claim 3, wherein the aperture is external to the disk.

* * * * *